(12) United States Patent  
Shakhnovich

(10) Patent No.: US 11,449,815 B2  
(45) Date of Patent: Sep. 20, 2022

(54) AUTOMATED ELECTRONIC DOCUMENT WORKFLOWS

(71) Applicant: airSlate inc., Brookline, MA (US)

(72) Inventor: Boris Shakhnovich, Tuftonboro, NH (US)

(73) Assignee: airSlate, Inc., Brookline, MA (US)

( * ) Notice: Subject to any disclaimer, the term of this patent is extended or adjusted under 35 U.S.C. 154(b) by 84 days.

(21) Appl. No.: 16/678,541

(22) Filed: Nov. 8, 2019

(65) Prior Publication Data

US 2020/0151630 A1 May 14, 2020

Related U.S. Application Data

(60) Provisional application No. 62/757,230, filed on Nov. 8, 2018.

(51) Int. Cl.
| | | |
|---|---|---|
| *G06F 40/00* | (2020.01) |
| *G06Q 10/06* | (2012.01) |
| *G06F 40/174* | (2020.01) |
| *G06F 40/18* | (2020.01) |
| *G06F 3/0484* | (2022.01) |

(52) U.S. Cl.
CPC ....... *G06Q 10/0633* (2013.01); *G06F 3/0484* (2013.01); *G06F 40/174* (2020.01); *G06F 40/18* (2020.01)

(58) Field of Classification Search
None
See application file for complete search history.

(56) References Cited

U.S. PATENT DOCUMENTS

| | | |
|---|---|---|
| 9,251,114 B1 | 2/2016 | Ancin et al. |
| 10,212,562 B2 | 2/2019 | Clark et al. |
| 2005/0043982 A1* | 2/2005 | Nguyen ........... G06Q 10/06316 705/7.26 |
| 2006/0069605 A1* | 3/2006 | Hatoun ............ G06Q 10/06316 705/7.15 |
| 2008/0043696 A1 | 2/2008 | Yang et al. |
| 2013/0268999 A1 | 10/2013 | Kiang et al. |
| 2014/0108793 A1 | 4/2014 | Barton et al. |
| 2014/0165176 A1 | 6/2014 | Ow |
| 2015/0067811 A1 | 3/2015 | Agnew et al. |
| 2015/0269499 A1 | 9/2015 | B et al. |
| 2017/0048211 A1* | 2/2017 | Avi-Dan ............... H04L 63/102 |

OTHER PUBLICATIONS

Halle et al., "Decentralized Enforcement of Artifact Lifecycles" copyright 2016 IEEE, pp. 1-10. (Year: 2016).*
Written Opinion cited in PCT/US2019/060559 dated Feb. 18, 2020.
International Search Report cited in PCT/US2019/060559 dated Feb. 18, 2020.

* cited by examiner

*Primary Examiner* — Amelia L Tapp
(74) *Attorney, Agent, or Firm* — DLA Piper LLP (US)

(57) ABSTRACT

Methods and systems for creating workflows are disclosed. A request to create a workflow can be received. One or more documents for the workflow can be received. Each of the one or more documents can be analyzed to determine one or more fillable fields for the one or more documents. Workflow permission information can be received. The workflow can be provided in accordance with the workflow permission information.

43 Claims, 77 Drawing Sheets

| airSlate ⌄ | TEAM MANAGEMENT | | | ADD NEW USER | 🔍 SEARCH |
|---|---|---|---|---|---|
| ⌂ HOME | ⊟ SORT BY: NAME ⌄  #MANAGE TAGS  🗑 DELETE SELECTED  ⤓ BLOCK SELECTED  2 CONTACT(S) OF 8 ARE SELECTED | | | | |
| ⓢ SMART TEMPLATES ○ | ☐ (RC) ISAAC BERRY | RICHARD_CLARK@DOMAIN.COM | 552-295-3913 | OWNER | ⋯ |
| ⁂ CHANNELS | ☐ (LD) LOLA DUNN<br>SALES MANAGER | LOLA_DUNN@DOMAIN.COM | 552-295-3913 | $ & ⟲ 🗎 | ⋯ |
| ◇ APPLICATIONS ╲1502a | ☑ (MC) MATTIE CROSS<br>PROJECT MANAGER | MATTIE_CROSS@DOMAIN.COM | 552-295-3913 | & ⟲ | ⋯ |
| 🗎 FLOW LIBRARY ╲1502b | ☑ (BW) RICHARD CLARK<br>FRANK CLARK | FRANK_CLARK@DOMAIN.COM | 552-295-3913 | 🗎 | ⋯ |
| ⚙ TEAM MANAGEMENT | ☐ (EA) ESTHER ANDREWS | ESTHER_ANDREWS@DOMAIN.COM | 552-295-3913 | | ⋯ |
| | ☐ (JD) WESLEY HARPER<br>BLOCKED | WESLEY_HARPER@DOMAIN.COM | 552-295-3913 | | ⋯ |
| | ☐ (HC) HAN SOLO<br>DESIGNER | HAN_SOLO@DOMAIN.COM | 552-295-3913 | | ⋯ |
| | ☐ (⊠) INVITED USER<br>PENDING FOR CONFIRMATION | ROBYN@DOMAIN.COM | | | ⋯ |
| 🔍 🗎 ⊙ (JD) | $ - FINANCE ADMIN   🗎 - ORG ADMIN   & - TEAM ADMIN   ⟲ - DOCUMENTARY | | | | |

MY ACCOUNT

- COMPANY INFORMATION
- PAYMENT INFORMATION
- PERSONAL INFORMATION
- CUSTOM BRANDING
- SETTINGS
- ADDRESS BOOK

ALL CONTACTS     [Q SEARCH]

SORT BY: ORGANIZATION ▼     [ADD CONTACTS]     CREATE NEW CONTACT

[MATTIE CROSS]    [MATTIE_CROSS@DOMAIN.COM]    [552-295-3913]    [CREATE] — 2602

| | Name | Email | Phone |
|---|---|---|---|
| ☐ (PW) | PHILIP WALSH / PRODUCT MANAGER | PROHASKA.LENNY@THIEL.BIZ | 579-415-5049 |
| ☐ (MC) | MATTIE CROSS / PROJECT MANAGER | MATTIE_CROSS@DOMAIN.COM | 552-295-3913 |
| ☐ (MS) | MAY STEVENS | CONCEPCION_SIMONIS@BERNHAR... | 919-408-7802 |
| ☐ (CC) | CHARLOTTE COPELAND | FADEL_LELAH@DICKINSON.NET | 812-559-7814 |
| ☐ (NR) | NANCY REEVES / DESIGNER | ROBYN_DUBUQUE@BERGE.ORG | 733-500-6329 |
| ☐ (RG) | RONALD GONZALEZ | BRANT_RIPPIN@YAHOO.COM | 812-559-7814 |
| ☐ (OC) | OLIVIA CHAMBERS | EBERT.PIERRE@HOTMAIL.COM | 923-733-9226 |

2600

2700

MY ACCOUNT

- COMPANY INFORMATION
- PAYMENT INFORMATION
- PERSONAL INFORMATION
- CUSTOM BRANDING
- SETTINGS
- ADDRESS BOOK

ALL CONTACTS      ADD CONTACTS     Q SEARCH   ×

SORT BY: ORGANIZATION ˅      EDIT SELECTED CONTACT

| ☐ | (RC) | RICHARD CLARK | RICHARD_CLARK@DOMAIN.COM | 919-408-7802 | ⋯ |
| ☐ | (PW) | PHILIP WALSH<br>PRODUCT MANAGER | PROHASKA.LENNY@THIEL.BIZ | 579-415-5049 | ⋯ |
| ☑ | | MATTIE CROSS | MATTIE_CROSS@DOMAIN.COM | 552-295-3913   SAVE | × |
| ☐ | (MS) | MAY STEVENS | CONCEPCION_SIMONIS@BERNHAR... | 919-408-7802 | ⋯ |
| ☐ | (CC) | CHARLOTTE COPELAND | FADEL_LELAH@DICKINSON.NET | 812-559-7814 | ⋯ |
| ☐ | (NR) | NANCY REEVES<br>DESIGNER | ROBYN_DUBUQUE@BERGE.ORG | 733-500-6329 | ⋯ |
| ☐ | (RG) | RONALD GONZALEZ | BRANT_RIPPIN@YAHOO.COM | 812-559-7814 | ⋯ |
| ☐ | (OC) | OLIVIA CHAMBERS | EBERT.PIERRE@HOTMAIL.COM | 923-733-9226 | ⋯ |

SETUP A SLATE

TELL US A LITTLE BIT ABOUT YOUR SLATE BEFORE WE SET IT UP. YOU CAN ALWAYS CHANGE THE NAME OF YOUR SLATE AND ITS DESCRIPTION. YOU WON'T BE ABLE TO ADD OR REMOVE DOCUMENTS FROM THE SLATE ONCE A PERSON SUBMITS A COMPLETED PACKET.

SLATE NAME

COMPANY INVOICE

DESCRIPTION

LOREM IPSUM IS SIMPLY DUMMY TEXT OF THE PRINTING AND TYPESETTING INDUSTRY. LOREM IPSUM HAS BEEN THE INDUSTRY'S STANDARD DUMMY TEXT.

ADD AT LEAST ONE DOCUMENT TO YOUR SLATE          ADD COLLABORATES

1. DOCUMENT NAME ONE
   10 PAGES / 2 FILLABLE FIELDS          [EDIT FILLABLE FIELDS]

2. DOCUMENT NAME TWO
   1 PAGE / 0 FILLABLE FIELDS            [ADD FILLABLE FIELDS]

3. DOCUMENT NAME THREE
   UPLOADING...

⊕ ADD DOCUMENT

[PREVIEW DOCUMENTS]          [SHARE SLATE]

SLATE CREATOR
- SETUP SLATE
- SHARE SLATE
- FILL A PACKET
- LIST OF PACKETS
- ADD-ONS
- SETUP SLATE

SLATE CREATOR

SETUP SLATE

SHARE SLATE

FILL A PACKET

LIST OF PACKETS

ADD-ONS

AUDIT TRAIL

SETUP A SLATE

SHARE YOUR SLATE WITH TEAMMATES AND CHANGE THE NAME AND DESCRIPTION IF NEEDED. BECAUSE YOU HAVE ALREADY STARTED RECEIVING FILLED PACKETS FOR THIS SLATE, YOU ARE NOT ABLE TO ADD OR REMOVE DOCUMENTS INSIDE THE SLATE.

SLATE NAME
COMPANY INVOICE

DESCRIPTION
LOREM IPSUM IS SIMPLY DUMMY TEXT OF THE PRINTING AND TYPESETTING INDUSTRY. LOREM IPSUM HAS BEEN THE INDUSTRY'S STANDARD DUMMY TEXT.

LIST OF DOCUMENTS                                    ADD COLLABORATES

1. DOCUMENT NAME ONE
   10 PAGES / 2 FILLABLE FIELDS

2. DOCUMENT NAME TWO
   1 PAGE / 0 FILLABLE FIELDS

3. DOCUMENT NAME THREE
   10 PAGES / 2 FILLABLE FIELDS

PREVIEW DOCUMENTS — 3502

SHARE SLATE — 3504

TEXT
IS EQUAL TO
IS NOT EQUAL TO
IS EMPTY
IS NOT EMPTY
BEGINS WITH
ENDS WITH
CONTAINS
DOES NOT CONTAINS

NUMBER
IS EQUAL TO
IS NOT EQUAL TO
IS LOWER THAN
IS LOWER THAN OR EQUAL TO
IS GREATER THAN
IS GREATER THAN OR EQUAL TO

DATE
IS ON
IS NOT ON
IS BEFORE
IS BEFORE OR ON
IS AFTER
IS AFTER OR ON

CHECKBOX
IS CHECKED
IS NOT CHECKED

RADIOGROUP
IN
NOT IN

FIG. 50

CONFIGURE ADD-ON                                                              ×

1. SET CONDITIONS

IF [TEXTFIELD ▾] [IS EQUAL TO ▾] [ENTER VALUE]                                 ×

IF [NUMFIELD ▾] [IS GREATER THAN OR EQUAL TO ▾] [ENTER VALUE]                  ×

IF [DATE ▾] [IS BEFORE OR ON ▾] [ENTER VALUE]                                  ×

IF [CHECKBOX ▾] [NOT CHECKED ▾]                                                ×

IF [RADIO GROUP ▾] [NOT IN ▾] [SELECT VALUE ▾]                                 ×

⊕ ADD ANOTHER CONDITION

2. ADD EMAIL(S)
[NAME@EXAMPLE.COM]                                                             🔳

3. SET ADD-ON STATUS
ADD-ON STATUS ⦿ THIS ADD-ON IS ENABLED

🗑                                                          [CANCEL]  [APPLY]

CREATE NEW CHANNEL

LOREM IPSUM IS SIMPLY DUMMY TEXT OF THE PRINTING AND TYPESETTING INDUSTRY.
LOREM IPSUM HAS BEEN THE INDUSTRY'S STANDARD DUMMY TEXT EVER SINCE THE 1500S

◯ PRIVATE ANYONE IN YOUR WORKSPACE CAN VIEW AND JOIN YOUR CHANNEL.

CHANNEL NAME

[ ONBOARDING ]

DESCRIPTION

[ LOREM IPSUM IS SIMPLY DUMMY TEXT OF THE PRINTING AND TYPESETTING INDUSTRY.
LOREM IPSUM HAS BEEN THE INDUSTRY'S STANDARD DUMMY TEXT EVER SINCE THE 1500S ]

ADD TEAMMATES TO CHANNEL

[ ROMA.SCHUSTER@GMAIL.COM × ] [ FUNK_PRESLEY@YAHOO.COM × ] [ FUNK_PRESLEY@YAHOO.COM × ] [ 👥 ]
[ NAME@EXAMPLE.COM ]

ADD SLATES

[ 🖼 SLATE NAME          CAN SHARE ⌄   🗑 ]
[    NOV 07, 2017 AT 9:00PM                ]

[ 🖼 SLATE NAME          CAN FILL ⌄    🗑 ]
[    NOV 07, 2017 AT 9:00PM                ]

[ ⊕ ADD SLATES ]

[ CANCEL ]   [ CREATE ]

AIRSLATE

YOU NEED PERMISSION

YOU DO NOT HAVE ACCESS TO THIS DOCUMENT. ASK THE OWNER FOR ACCESS.
YOU ARE SIGNED IN AS JANE.DORN@GMAIL.COM

REQUEST ACCESS

5900

AIRSLATE

YOU NEED PERMISSION

YOUR REQUEST FOR ACCESS HAS BEEN SENT.
YOU WILL RECEIVE AN EMAIL IF AND WHEN YOUR REQUEST IS APPROVED.

◁ REQUEST SEND

6100

PRE-FILL A SLATE WITH DATA FROM A GOOGLE SHEET

IF  SET CONDITIONS

- CONTRACT.PDF  ✕
  - SIGNATURE FIELD: SIGNATURE ▼    IS NOT SIGNED ▼

⊕ ADD ANOTHER CONDITION ▼

THEN  SET SLATE BOT USAGE (OPTIONAL)

( ONLY ONCE    AFTER EACH REVISION )

CONNECT TO GOOGLE ACCOUNT

G  CONNECT TO GOOGLE ACCOUNT
   NOT CONNECTED                [ CONNECT ]

CHOOSE SPREADSHEET FROM LIST

[ SELECT AN OPTION... ▼ ]

CHOOSE SHEET FROM LIST

[ SELECT AN OPTION... ▼ ]

USE DATA FROM

◉─────    [ BACK ]    [ APPLY ]

MATCH FIELDS IN A DOCUMENT WITH VALUES FROM A GOOGLE SPREADSHEET

CONTRACT.PDF ✕

└ TEXT FIELD: NAME  |  IS EQUAL TO  |  FREELANCER'S NAME

≡+ MATCH ANOTHER FIELD

PRE-FILL A DOCUMENT SLATE WITH DATA TAKEN FROM A GOOGLE SPREADSHEET

| FROM SPREADSHEET COLUMNS | TO DOCUMENT FIELDS |
|---|---|
| FREELANCER'S NAME → | W9 FORM.PDF ✕ └ TEXT FIELD: NAME |
| BUSINESS NAME → | W9 FORM.PDF ✕ └ TEXT FIELD: BUSINESS NA... |
| ADDRESS → | W9 FORM.PDF ✕ └ TEXT FIELD: ADDRESS |
| CITY, STATE AND ZIP → | W9 FORM.PDF ✕ └ TEXT FIELD: CITY, STATE AN... |

≡+ MAP ANOTHER FIELD

BACK | APPLY

BOT LIBRARY

| SELECT PRE-FILL BOT | |
|---|---|
| CATEGORIES | 🔍 \|SEARCH ✕ |
| ‡ ALL BOTS | ✉ EMAIL NOTIFICATION BOT<br>CONFIGURE AND SEND OUT EMAIL NOTIFICATIONS<br>◉ INSTALL BOT |
| ★ POPULAR BOTS | |
| ⚙ AUTOMATION BOTS ⌃ | |
|    REMINDER<br>   EMAIL<br>   SMS | 📄 PRE-FILL FROM DOCUMENT BOT<br>PRE-FILL DOC WITH DATA TAKEN FROM ANOTHER DOC<br>◉ INSTALL BOT |
|    WEBHOOK<br>   ACCESS CONTROL<br>   SLATE CREATION | 📄 PRE-FILL FROM GOOGLE SHEETS BOT<br>PRE-FILL A SLATE WITH DATA FROM A GOOGLE SHEET<br>◉ INSTALL BOT |
|    SLATE METADATA<br>   SCHEDULING | ☁ PRE-FILL FROM SALESFORCE RECORD BOT<br>PRE-FILL SLATE FROM SALESFORCE RECORD<br>◉ INSTALL BOT |
| ⊛ INTEGRATION BOTS ⌃ | |
|    GOOGLE INTEGRATIONS<br>   CRM<br>   MICROSOFT INTEGRATIONS | 👥 ASSIGN ROLES TO RECIPIENTS BOT<br>ASSIGN PRE-SET ROLES TO RECIPIENTS<br>◉ INSTALL BOT |
|    SPREADSHEETS<br>   DATABASES | 👥 ROLES REMINDER BOT<br>REMIND ROLES TO FILL OUT A SLATE<br>◉ INSTALL BOT |

FIG. 72

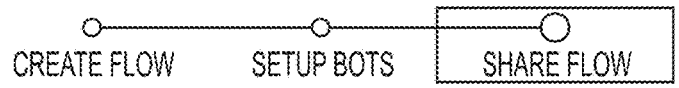

7400

CREATE FLOW — SETUP BOTS — [SHARE FLOW]

SHARE FLOW
MY NEW FLOW

SHARE A FLOW WITH YOUR TEAMMATES OR ANYONE OUTSIDE YOUR ORGANIZATION. COPY AND SEND A PUBLIC LINK OR ADJUST SHARING PERMISSIONS AND SEND AN EMAIL INVITATION THAT GRANTS ACCESS TO A FLOW.

FLOW ACCESS WITHIN YOUR WORKSPACE (PRIVATE)  ONLY THE FLOW OWNER, ADMINISTRATORS AND RECIPIENTS CAN ACCESS THIS FLOW.

SHARE YOUR FLOW VIA PUBLIC LINK (X)  YOUR FLOW IS NOW PRIVATE AND WON'T BE ACCESSIBLE UNLESS EXPLICITLY SHARED.

HTTP://ARSL.AT/XGN62N    [COPY]

INVITE RECIPIENTS TO ACCESS A FLOW AND ASSIGN FLOW ADMINS

THIS FLOW HAS ALREADY BEEN SHARED WITH THE FOLLOWING PEOPLE

NO ONE CAN ACCESS THIS FLOW

[GO TO LIST OF SLATES]

FIG. 74

AUTOMATED ELECTRONIC DOCUMENT WORKFLOWS

CROSS-REFERENCE TO RELATED APPLICATIONS

This application claims the benefit of U.S. Provisional Patent Application No. 62/757,230, filed Nov. 8, 2018, which is incorporated by reference in its entirety.

BACKGROUND

Organizations increasingly rely on electronic documents to collect, share, and retain mission critical information. Businesses, government agencies, and other organizations may routinely collect and store information about customers and employees using electronic documents such as Portable Document Format (PDF) documents and Word documents (e.g., DOC and DOCX). Many businesses use ad-hoc document workflows that can require employees/customers to scan paper documents into electronic form, email documents back and forth, manually transfer documents into a document management system, and/or manually copy data from electronic documents into customer relationship management (CRM) systems. For example, an organization may require that all new employees complete a standardized tax form (e.g., a W2 form). An existing document workflow may involve: (1) human resource (HR) personnel locating the current version of the W2 form and emailing it to the employee; (2) the employee completing the form using a PDF editor and emailing the form back to HR; (3) HR opening the completed form and manually copying the employee's name, social security number (SSN), tax withholding information, and other personal information from the form into a human resource management system (HRMS); and (4) HR archiving the completed form in the organization's document management system. While existing services may allow certain portions of such workflows to be automated, there is a need for a service that allows an organization to easily create and distribute end-to-end automated electronic document workflows.

SUMMARY

In accordance with some embodiments of the present disclosure, there is provided a computer-implemented method for creating electronic document workflows. The method comprises receiving, by a computer system comprising at least one processor, from a client device operated by a first user, a request to create a workflow, the request comprising a workflow name. The method also comprises receiving, by the computer system, one or more documents for the workflow, and analyzing, by the computer system, each of the one or more documents to determine one or more fillable fields for the document. The method further comprises receiving, by the computer system, permission information for the workflow, the permission information indicating at least one of: users who are permitted to fill in the one or more fillable fields, users who are permitted to edit the one or more documents of the workflow, users who are permitted to share the workflow, or users who are permitted to distribute the workflow. The method also comprises creating, by the computer system, the workflow, the workflow comprising the workflow name, the one or more documents, the one or more fillable fields, and the permission information for the workflow. The method further comprises storing, by the computer system, the workflow, and providing, by the computer system, the workflow in accordance with the permission information for the workflow.

In accordance with aspects of the disclosure, the method further comprises creating a workspace for an organization, and inviting a plurality of users to join the workspace by sending a first universal resource locator (URL) link associated with the workspace via email. The method also comprises assigning each of the plurality of users with a respective role.

In accordance with further aspects of the disclosure, the method further comprises generating a second URL link associated with the workflow, sending the second URL link to a second user via an email of the second user based on the workflow permission information, and generating a first notification that the one or more documents of the workflow are signed by the second user.

In accordance with still further aspects of the disclosure, the method further comprises, upon receiving a confirmation of the first notification by the first user, sending a third URL link associated with the workflow to a third user via an email of the third user based on the workflow permission information. The method also comprises generating a second notification that the one or more documents of the workflow are signed by the third user, and archiving the signed documents of the workflow, wherein the workflow is assigned with a role and an order of the second user and the third user.

In accordance with aspects of the disclosure, the one or more documents for the workflow comprises a workflow template loaded from a stored template library.

In accordance with further aspects of the disclosure, the one or more documents for the workflow comprises a workflow template created by a workflow application.

In accordance with still further aspects of the disclosure, the method further comprises executing an application associated with the workflow to present a plurality of graphical user interfaces (GUIs) within a user interface of a client device operated by the first user.

In accordance with aspects of the disclosure, the application is configured to define a plurality of fillable fields in a document with a plurality of functions in a GUI, the plurality of functions comprising a text field, a signature field, a number field, and a date field.

In accordance with further aspects of the disclosure, the computer system includes an application programming interface (API) via which one or more add-ons are used to read and write information for the workflow.

In accordance with still further aspects of the disclosure, the method further comprises accessing a bot library to install one or more bots to automate the workflow, the one or more bots being indicative of one or more add-on apps. The method also comprises linking the one or more add-ons to the application and the workflow by invoking associated callback URLs.

In accordance with aspects of the disclosure, the method further comprises prefilling a document with data from a stored spreadsheet via an add-on. The prefilling comprises setting up one or more conditions for one or more fillable fields, and determining whether the one or more fillable fields in the document match values of one or more columns in the spreadsheet. The prefilling also comprises, in response to determining that the one or more fillable fields in the document match values of one or more columns in the spreadsheet, populating data from the columns in the spreadsheet into corresponding fillable fields in the document.

In accordance with further aspects of the disclosure, the method further comprises exporting data from a document to a spreadsheet for storage in a cloud storage. The exporting comprises setting up one or more conditions for one or more fillable fields of a document, and connecting a user account associated with the cloud storage to locate a spreadsheet for updating. The exporting also comprises determining whether the one or more fillable fields in the document match values of one or more columns in the spreadsheet. The exporting further comprises, in response to determining a match between the one or more fillable fields and the one or more columns in the spreadsheet, populating data from the one or more fillable fields into corresponding columns of the spreadsheet.

In accordance with still further aspects of the disclosure, the workflow is shared to a group of users each having an email address within a verified domain.

Furthermore, in accordance with some embodiments, there is provided a computer system for creating electronic documents workflows. The computer system comprises one or more memories storing instructions, and one or more processors that execute the instructions. The one or more processors, when executing the instructions, are configured to receive, from a client device operated by a first user, a request to create a workflow, the request comprising a workflow name. The one or more processors, when executing the instructions, are also configured to receive one or more documents for the workflow, and to analyze each of the one or more documents to determine one or more fillable fields for each of the one or more documents. The one or more processors, when executing the instructions, are further configured to receive permission information for the workflow, the permission information indicating at least one of: users who are permitted to fill in the one or more fillable fields, users who are permitted to edit the one or more documents of the workflow, users who are permitted to share the workflow, or users who are permitted to distribute the workflow. The one or more processors, when executing the instructions, are also configured to create the workflow, the workflow comprising the workflow name, the one or more documents, the one or more fillable fields, and the workflow permission information for the workflow. The one or more processors, when executing the instructions, are further configured to store the workflow, and to provide the workflow in accordance with the permission information for the workflow.

In accordance with aspects of the disclosure, the one or more processors, when executing the instructions, are further configured to create a workspace for an organization, and to invite a plurality of users to join the workspace by sending a first universal resource locator (URL) link associated with the workspace via email. The one or more processors, when executing the instructions, are also configured to assign each of the plurality of users with a respective role.

In accordance with further aspects of the disclosure, the one or more processors, when executing the instructions, are further configured to generate a second URL link associated with the workflow, and to send the second URL link to a second user via an email of the second user based on the workflow permission information. The one or more processors, when executing the instructions, are also configured to generate a first notification that the one or more documents of the workflow are signed by the second user.

In accordance with still further aspects of the disclosure, the one more processors, when executing the instructions, are further configured to, upon a confirmation of the first notification, send a third URL link associated with the workflow to a third user via an email of the third user based on the workflow permission information. The one or more processors, when executing the instructions, are also configured to generate a second notification that the one or more documents of the workflow are signed by the user, and to archive the signed documents of the workflow, wherein the workflow is assigned with a role and an order of the second user and the third user.

In accordance with aspects of the disclosure, the one or more documents for the workflow comprise a workflow template created by a workflow application.

In accordance with further aspects of the disclosure, the one or more processors, when executing the instructions, are further configured to execute the workflow application to cause presentation of a plurality of graphical user interfaces (GUIs) within a user interface of the client device operated by the first user.

In accordance with still further aspects of the disclosure, the workflow application is configured to define a plurality of fillable fields in a document with a plurality of functions in a GUI, the plurality of functions comprising a text field, a signature field, a number field, and a date field.

It is to be understood that the disclosure is not limited in its application to the details of constructions and to the arrangements set forth in the following description or illustrated in the drawings. The disclosure is capable of embodiments in addition to those described and is capable of being practiced and carried out in various ways. Also, it is to be understood that the phraseology and terminology employed herein, as well as in the abstract, are for the purpose of description and should not be regarded as limiting.

It is to be understood that both the foregoing general description and the following detailed description are explanatory only and are not restrictive of the claimed subject matter.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

FIGS. 4-74 show example graphical user interfaces (GUIs) (e.g., screens of a user interface) according to some embodiments of the present disclosure.

The drawings are not necessarily to scale, or inclusive of all elements of a system, emphasis instead generally being placed upon illustrating the concepts, structures, and techniques sought to be protected herein.

DETAILED DESCRIPTION

Embodiments of the present disclosure relate to systems and methods for enabling organizations and/or users to create fully automated and arbitrarily complex electronic document workflows without the need for coding. Workflows can be shared within an organization according to a flexible set of permissions, and instances of the workflow (referred to as "packets", or "flow slates") can be readily distributed to persons inside and outside of the organization.

Figure 1:
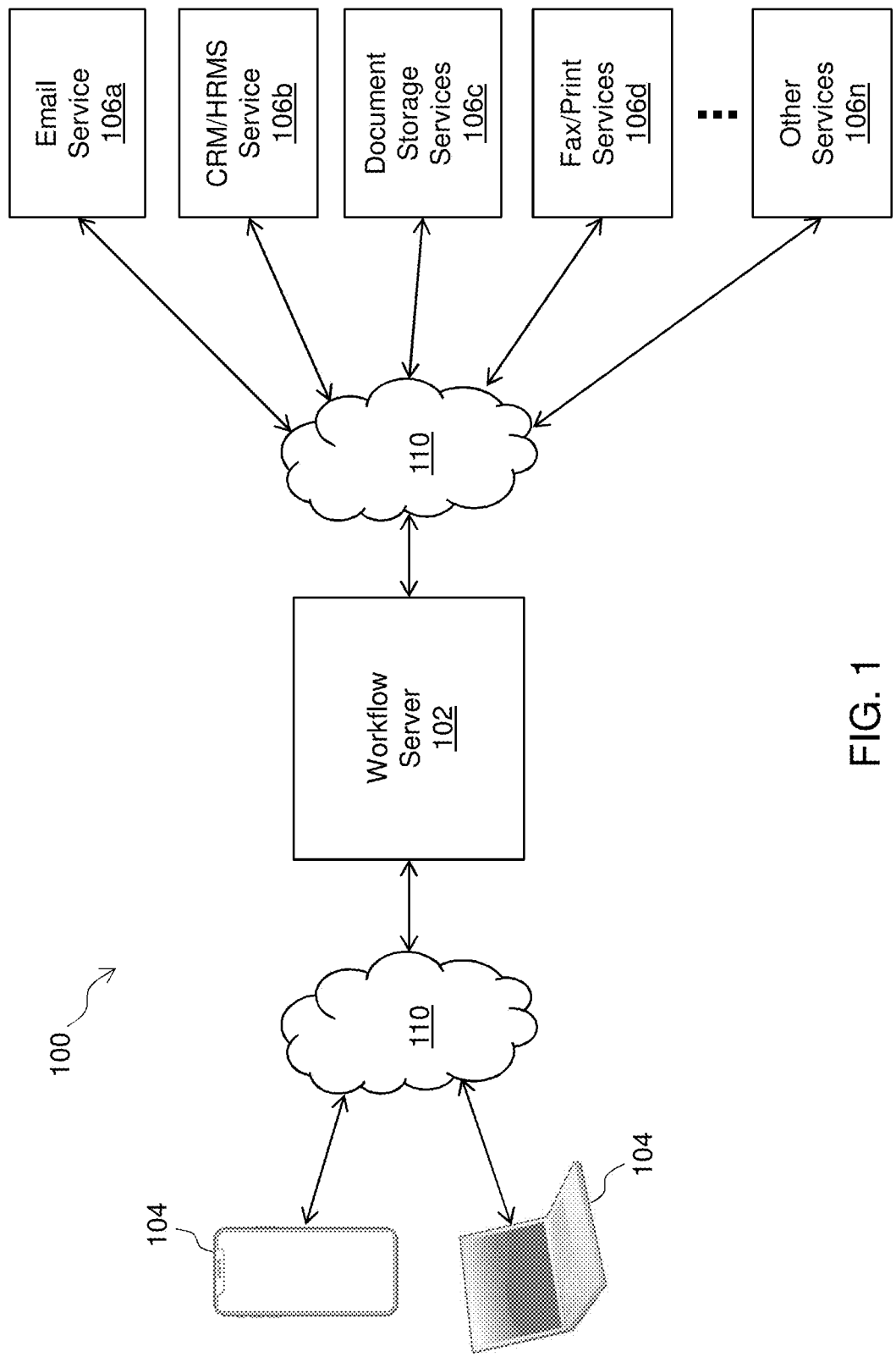
FIG. 1 is a diagram of an example computing environment for automated electronic document workflows, according to some embodiments of the present disclosure.

FIG. 1 shows an example computing environment 100 for automated electronic document workflows, according to some embodiments of the present disclosure. The illustrative computing environment 100 can include a computer system (e.g., workflow server 102), one or more client devices 104, and one or more application services 106a-106n (106 generally). The various components of system 100 may be coupled via one more computer networks 110, including wireless and/or wired computer networks.

Workflow server 102 may enable organizations to create, share, and distribute electronic document workflows using structures and techniques disclosed herein. Workflow server 102 may include one or more physical and/or virtual machines configured to perform processing disclosed herein. In some embodiments, workflow server 102 may be hosted in a cloud computing environment. In some embodiments, the functionality of the workflow server 102 described herein may be provided to one or more organizations using a software-as-a-service (SaaS) distribution and/or pricing model.

Workflow server 102 may support an arbitrary number of organizations, each having an arbitrary number of users and workflows. A user can be assigned a particular role within an organization. Roles can include, for example, owners, administrators (or "admins"), and regular or non-privileged users. Non-privileged users may be granted permissions related to an organization's workflows, such as permission to create new workflows, edit particular workflows, share particular workflows with other users, and distribute workflow packets to one or more recipients. As used herein, the term "recipient" can refer to any person or entity to whom a particular workflow document is distributed or shared. A recipient may be invited (or required) to modify, review, sign, or otherwise interact with the packet. Non-limiting examples of recipients for a workflow include an organization's employees, customers, business partners, as well as persons outside the organization.

Client devices 104 can include, for example, desktop computers, laptop computers, tablet computers, and smartphones. A client device 104 can be configured to execute a client application that communicates with workflow server 102. For example, a web browser installed on a client device 104 can send Hypertext Transfer Protocol (HTTP) requests to, and receive HTTP responses from, an HTTP server within the workflow server 102. A user registered with the workflow server 102 can use a client device 104 to create, modify, share, and distribute workflows and packets. A recipient of a packet can use a client device 104 to, for example, fill out one or more documents (or fill out one or more HTML forms, watch one or more videos, etc.) associated with the workflow, sign the documents, and submit the documents. The computing environment 100 may provide integration with one or more third-party applications which the user can use to fill out, sign, and submit a packet.

A workflow can be associated with a particular organization. A workflow can include one or more documents and one or more fillable fields defined for each of those documents. The workflow's documents and fillable fields may be collectively referred to herein as its "template." The computing environment 100 can support different types of workflow document formats, such as PDF files, DOCX files, JPEG files, and other types of image files. A workflow can be distributed to an arbitrary number of recipients, with each recipient receiving a distinct packet (i.e., workflow instance) into which they can enter data. Each recipient's data may be stored in a database (e.g., as a collection of text values). Packets can be exported from the server 102 in one or more file formats. When a packet is exported, the server 102 may dynamically merge the stored recipient data with the workflow template documents to generate completed or filled-out documents.

A workflow may be associated with one or more "add-ons" that can perform automated tasks related to individual workflow packets. An add-on may be implemented within the workflow server 102 (e.g., as a software module stored on the server) or by one or more external application services 106. For example, an "Import to CRM" add-on may be configured to import data fields for a completed workflow document into customer relationship management (CRM) service 106b using an Application Programming Interface (API) provided by both the workflow server 102 and the CRM service 106b. As another example, an "Archive Document" add-on may be configured to export completed workflow documents to a document storage service 106c. As yet another example, a "Signature" add-on may collect an electronic signature for a workflow document and submit an image of the signature back to the workflow server 102. As another example, an add-on may automatically upload filled-out documents to a designated cloud storage folder after a packet is submitted by the recipient. When an add-on is executed, it may be given access to the workflow configuration (including its documents and fillable fields), along with access to recipient data for the instant packet. In some embodiments, an add-on can be given both read and write access to the recipient data.

Add-ons may be executed based on triggers defined for a particular workflow. For example, an add-on may be triggered to run for a given workflow based on a current date or time stored in server 102 or a client device 104. As another example, an add-on may be triggered to run based on specific form values entered by the recipient.

As illustrated in FIG. 1, non-limiting examples of application services 106 include: email services 106a, CRM and human resources management system (HRMS) services 106b, document storage services 106c, and faxing and printing services 106d. Email services 106a can include, for example, on-site email servers and cloud-based email services. CRM and HRMS services 106b can include, for example, widely used SaaS-based CRM and HRMS applications. Document storage services 106c can include, for example, cloud-based storage services such as Google Drive, Dropbox, Box, Amazon S3, etc. Faxing and printing services 106d can include, for example, cloud-based faxing/printing services.

In some embodiments, add-ons can be dynamically added to the workflow server 102 and invoked using a callback uniform resource locator (URL) mechanism. An organization or a third-party developer can configure a new add-on within the server 102 and specify the URL of a remote server where the add-on is hosted. When the workflow server 102 determines that the add-on should be run for a particular packet, it can send a request (or "callback") to the specified URL allowing the remotely-hosted add-on to perform arbitrary processing on the packet (e.g., on the recipient data associated with the packet). The workflow server 102 may append a unique identifier onto the callback URL which the add-on can use to read information about the packet from the workflow server 102 and write updated packet information back to the server 102. The workflow server 102 may include an API via which add-ons can read and write information for workflows and/or packets.

Figure 2:
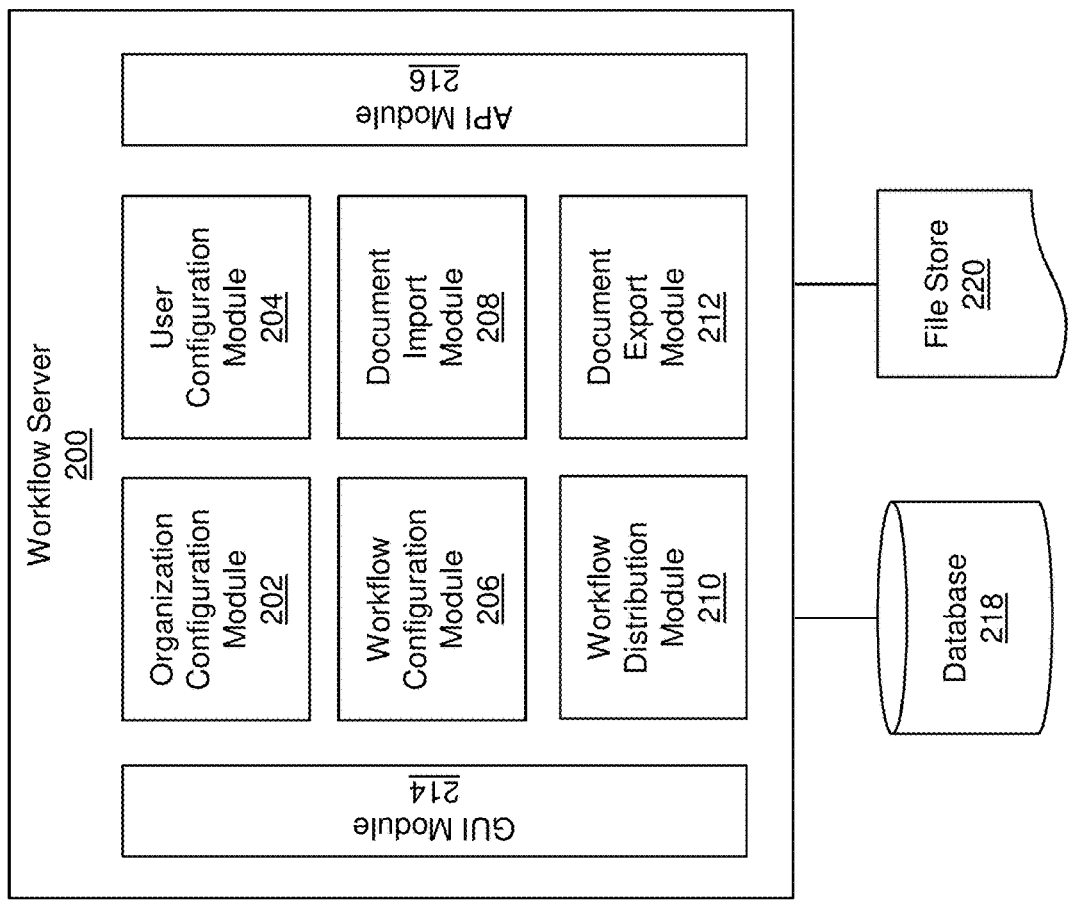
FIG. 2 is a diagram of a computer system (e.g., workflow server), according to some embodiments of the present disclosure.

FIG. 2 shows an example computer system (e.g., workflow server 200), according to some embodiments of the present disclosure. The illustrative server 200 (which may be the same as or similar to server 102 of FIG. 1) can include an organization configuration module 202, a user configuration module 204, a workflow configuration module 206, a document import module 208, a workflow distribution module 210, a document export module 212, a GUI module 214, and an API module 216. Each of the illustrative modules 202-216 may include hardware and/or software configured to perform the processing described herein. The server 200 can also include, or otherwise be coupled to other systems, such as a database 218 and a file store 220.

Figure 4:
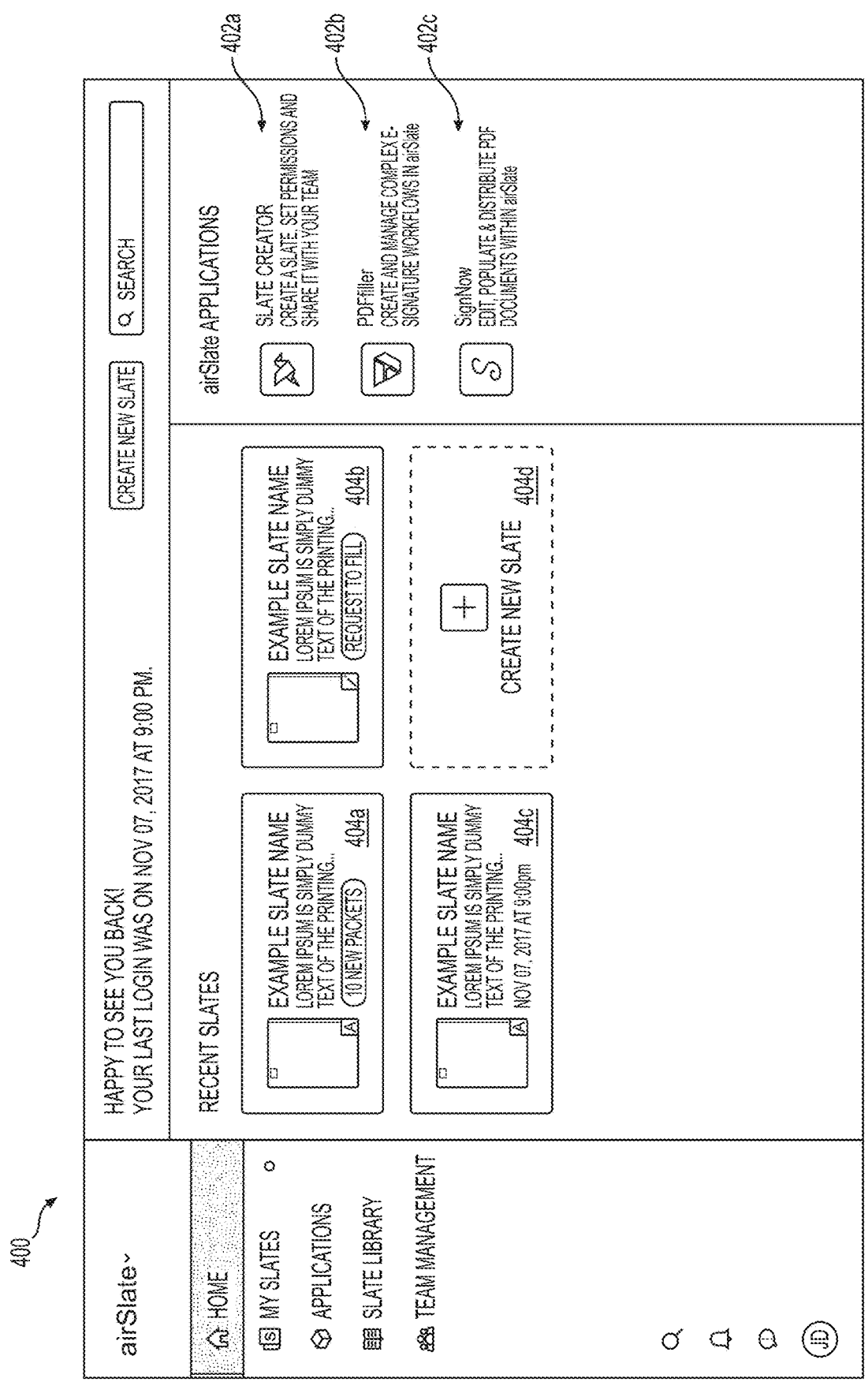

GUI module 214 may be configured to generate a plurality of GUIs having suitable controls (e.g., selectable user interface objects) which allow users to interact with the various modules 202-212 executed on workflow server 200. As described below, FIGS. 4-74 illustrate graphical user interfaces (GUIs) that may be used within a system for automated electronic document workflows, such as within computing environment 100 of FIG. 1. In some embodiments, the GUIs may be implemented within a server device (e.g., workflow server 102 of FIG. 1) and/or within client devices (e.g., client devices 104 of FIG. 1).

Organization configuration module 202 can manage information stored about organizations within the workflow server 200. For example, module 202 can be configured to create, update, and delete organizations, and users associated with a particular organization, within the server 200. Information stored for a particular organization may include the organization's name, one or more domain names for the organization, a set of users that belong to the organization, and which permissions or roles each of those users have with respect to the organization. Organization configuration module 202 may be configured to present one or more GUIs for creating, updating, and deleting organizations or users associated with a particular organization within the server 200. Organization configuration module 202 may be executed to perform respective operations based on user interactions with one or more GUIs via a user interface of the client device 104. The corresponding illustrative GUIs for managing organization information are discussed below.

The user that creates an organization within the workflow server 200 may be designated as "owner" of the organization. An owner may have full control over the organization's data within the workflow server 200, including the ability to view, modify, and delete any of the organization's workflows or users; add and remove domain names for the organization; change the organization's payment plan or method; and to fully delete the organization from the server 200. The organization's owner can designate one or more users to be administrators ("admins") for the organization. An admin has certain privileges not given to regular users, as discussed below.

User configuration module 204 can manage information stored about users of the workflow server 200. For example, module 204 can be configured to create, update, and delete user accounts within the server 200. Information stored for a particular user may include, for example, first and last name, username or nickname, email address, phone number, password, the user's organization, the user's role, and one or more user permissions. User roles may include owners, admins, and regular or non-privileged users. User permissions can include, for example, a permission to create workflows, a permission to install apps, and a permission indicating whether the user is required to use 2-factor authentication. User configuration module 204 may be configured to present one or more GUIs for creating, updating, and deleting users within the server 200. User configuration module 204 may be executed to perform respective operations based on user interactions with one or more GUIs via a user interface of the client device 104. The corresponding illustrative GUIs for managing user information are discussed below.

A user can update certain information associated with their own user account, such as their first and last name, and their password. Other user information, such as the user's role and permissions may be updated only by an admin (or owner). Admins can control which users have access to the organization's workflows and apps within the server 200. Admins can invite users to the organization, and delete users from the organization. An admin can view workflows created by any user of the organization. In some embodiments, the server 200 may include a federated search feature allowing the admin to search for workflows created by any user of the organization.

In some embodiments, a user may be automatically added to an organization if they register with the server 200 using an email address that is associated with the organization. For example, when a new user registers with the server 200, the domain name in their email address may be matched against a verified domain configured within the system in order to automatically associate the user with their company or other organization.

Workflow configuration module 206 can manage workflow information stored by the server 200. For example, module 206 can be configured to create, update, and delete workflows within the server 206. Information stored for a particular workflow can include: a name for the workflow, one or more template documents, one or more fillable fields associated with each document, and/or a set of permissions. Workflow permissions can include: permissions to edit the workflow, permissions to share the workflow, permissions to distribute the workflow, and/or permissions to view completed documents for the workflow. Workflow permissions can be specified on a per-user basis and/or on a group basis. Permission to distribute a particular workflow can be granted to an individual user, to the entire organization, or to a predefined subset (or "team") of the organization's users. Workflow configuration module 206 may be configured to present one or more GUIs for creating, updating, and deleting workflows within the server 200. Workflow configuration module 206 may be executed to perform respective operations based on user interactions with one or more GUIs via a user interface of the client device 104. The corresponding illustrative GUIs for creating and modifying workflows are discussed below.

Document import module 208 may be configured to receive, analyze, and store template documents for particular workflows. Documents can be uploaded by a user, for example, as part of creating or modifying a workflow. Workflow template documents may be uploaded as PDF files, DOCX files, JPEG files, or in any other suitable format or a combination of different formats. In some embodiments, an uploaded document may be analyzed by the document import module 208 to automatically identify fillable fields within the document. For example, document import module 208 may detect that a template is a PDF file and then analyze the PDF file to identify form fields, such as radio buttons or text input fields, using metadata within the PDF file. These automatically identified fillable fields may correspond to the default set of fillable fields for the document which can be overridden by a user as part of the workflow creation/modification process. An imported template document may be stored in the file store 220 and fillable field information may be stored in the database 218. Document import module 210 may be executed to perform workflow generation operations based on user interactions with one or more GUIs via a user interface of the client device 104. The corresponding illustrative GUIs are discussed below.

In some embodiments, documents may be stored separately from the workflows that use the documents as templates. This can allow documents to be created, modified, and shared outside of workflows as well as combine documents and workflows into many-to-many relationships.

Workflow distribution module 210 is responsible for distributing workflow packets to one or more recipients. For example, workflow distribution module 210 may be configured to present a GUI that allows an authorized user to distribute packets to individual recipients or to predefined groups of recipients. Workflow distribution module 210 may be configured to store data entered into packets by the recipients. For example, when a packet is distributed to a particular recipient, that recipient may access a GUI that displays the workflow documents (or an image thereof) overlaid with a form. For each fillable field defined as part of the workflow template, the form may include a corresponding control into which the recipient can enter data. The entered recipient data can be submitted or transmitted to the workflow distribution module 210, which can store that data in database 218. In some embodiments, workflow distribution module 210 may be configured to run one or more add-ons associated with a workflow by invoking associated callback URLs of one or more remote servers where the add-ons are hosted, as discussed above in the context of FIG. 1. Workflow distribution module 210 may be executed to perform workflow distribution operations based on user interactions with one or more GUIs via a user interface of the client device 104. The corresponding illustrative GUIs are discussed below.

Document export module 212 can be configured to export workflow packets to one or more formats, such as PDF, DOCX, or JPEG files. The module 212 may generate an exportable file by combining workflow's template documents with recipient data entered for the packet.

GUI module 214 may be configured to present GUIs having suitable controls to allow users to interact with the various modules 202-212. In some embodiments, GUI module 214 may include a Hypertext Transfer Protocol (HTTP) server that can process HTTP (or HTTPS) requests from web browsers installed on client devices (e.g., client device 104 in FIG. 1) and respond with Hypertext Markup Language (HTML) documents that can be rendered as the GUIs. In some embodiments, GUI module 214 can use WebSockets to communicate with client devices. API module 216 may include various endpoints via which third party applications ("apps") and add-ons can read or write workflow and packet data stored by the server 200. In some embodiments, API module 216 includes a representational state transfer (REST) based API having endpoints to create, read, update, and delete information about various entities within the server, such as organizations, users, workflows, and packets.

The GUI module 214 and/or API module 216 may perform user authentication before processing HTTP or other types of requests. For example, GUI module 214 may be executed to present GUIs having suitable controls to prompt a user to enter their username and password before the user can access their organization's workflows or other information. In some embodiments, GUI module 214 and API module 216 may require 2-factor authentication for owners and admins, but not for non-privileged users.

Figure 3:
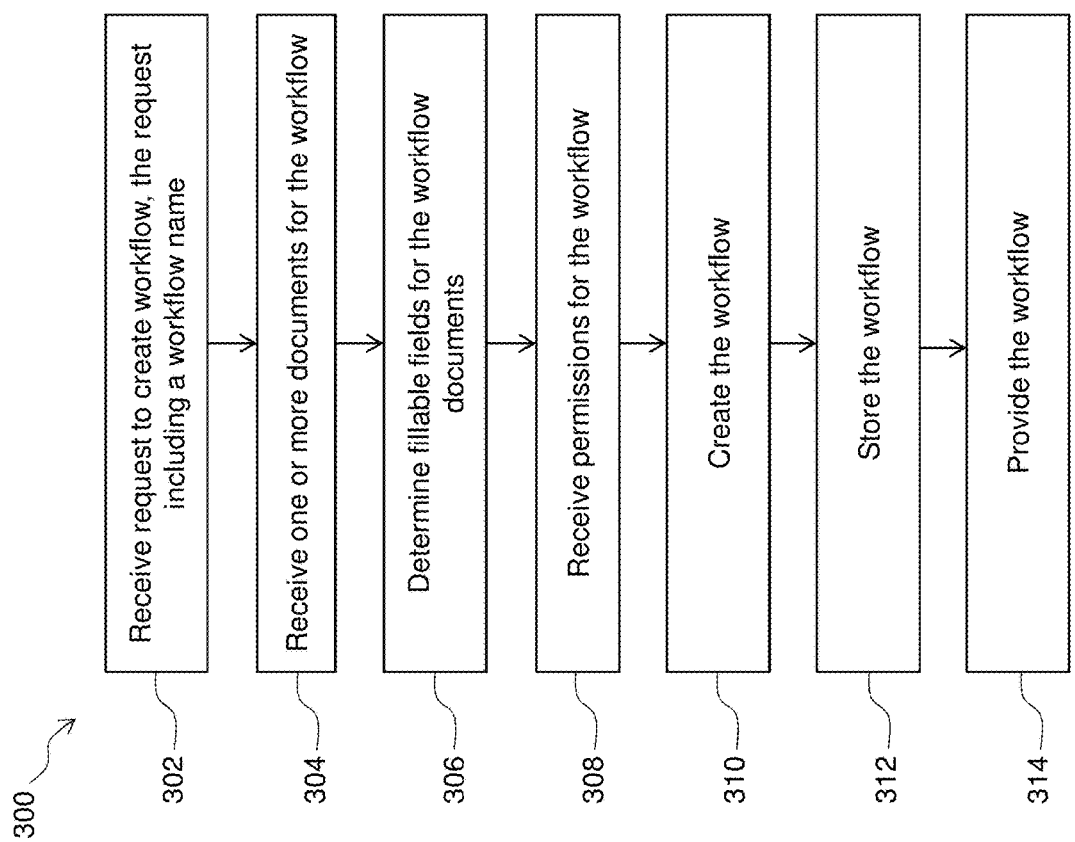
FIG. 3 is a flow diagram of an example method for creating electronic document workflows, according to some embodiments of the present disclosure.

FIG. 3 shows a flow diagram for an example method 300 for creating and distributing automated electronic document workflows, according to some embodiments of the present disclosure. The illustrative method 300 may be implemented within computing environment 100 of FIG. 1 or, more particularly, within a computer system, such as workflow server 102 or workflow server 200. GUI module 214 of workflow server 200 may be executed to present a plurality of GUIs having suitable controls to enable workflow server 200 to implement corresponding operations of creating and distributing electronic document workflows based on corresponding user interactions with the GUIs.

FIG. 4 shows an example GUI 400 which represents a user home page of accessing an automatic workflow application (e.g., "airSlate") executed by the workflow server, according to some embodiments of the present disclosure. The GUI 400 may be presented, for example, when a user logs into a workflow server 102 using a web browser via a client application through a client device 104 over network 110. The automatic workflow application may be used to collect data, fill forms, e-sign documents, and/or automate workflows. The illustrative GUI 400 can be configured to include one or more apps 402a, 402b, 402c, etc. (402 generally) and one or more workflows 404a, 404b, 404c, etc. (404 generally). The GUI 400 may include a user interface object 404d which is configured to create a new workflow. Workflows may be referred to as "slates" in the drawings. The apps 402 may include apps that were installed by default and apps that the user installed (if authorized to do so). The workflows 404 may include workflows that the user has accessed, according to the stored workflow permissions for the user's organization.

As shown in the example GUI in FIG. 4, apps 402 can include a workflow creator app 402a ("Slate Creator"), a document filler app 402b ("PDFfiller"), and a signature app 402c ("SignNow"). The creator app 402a can be a special app that can be used to generate and configure new workflows within the system. In particular, the creator app 402a, can be used to define the workflow template, assign add-ons to the workflow to automate certain tasks in response to workflow triggers, and/or distribute the template and workflow to other users (including users within the same organization and users outside the organization). The document filler app 402b can include a web app for filling out forms and other documents (e.g., PDFs). The signature app 402c can include a web app for adding an electronic signature to a document. The document filler app 402b and signature app 402c, along with other apps, can access workflows and templates configured using the workflow creator app 402a. In some embodiments, all users may have access to workflow creator app 402a, whereas the availability of other apps may vary by users. For example, in some embodiments, users can install apps into their accounts.

Referring back to FIG. 3, at step 302, a request to create a workflow may be received by workflow server 102 from a client device operated by a first user. The request may include a name for the workflow. Workflow server 102 may be configured to execute an automatic workflow application and to cause a GUI to be presented on a user interface of client device 104 for creating or setting up a workflow. The first user may access an automatic workflow application via a browser of a client device 104 and log into workflow server 102 through a client device 104 over network 110. The request to create a workflow may be initiated when the first user interacts with a GUI 400 presented with the workflow creator app ("Slate Creator").

Figure 29:
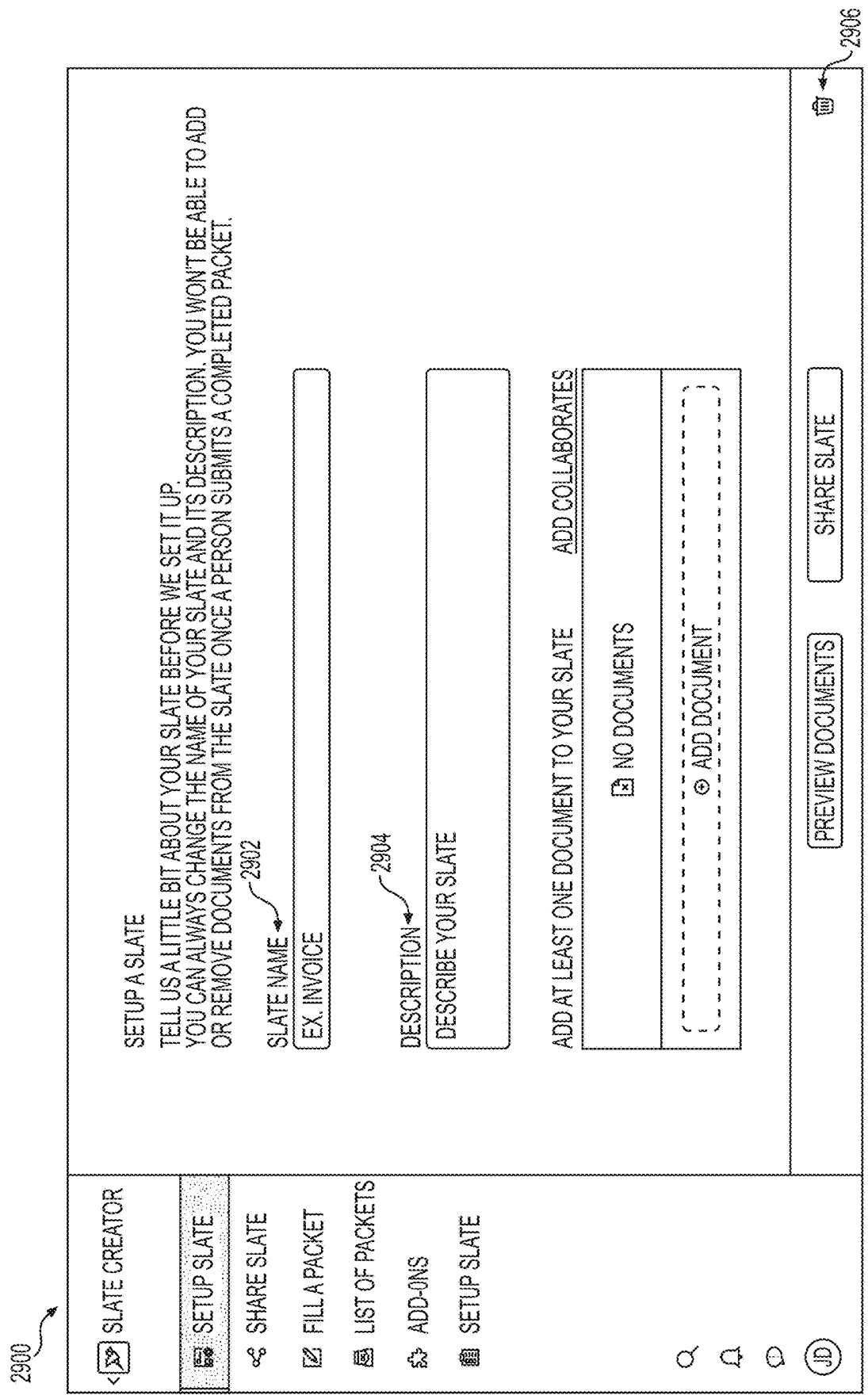
Figure 30:
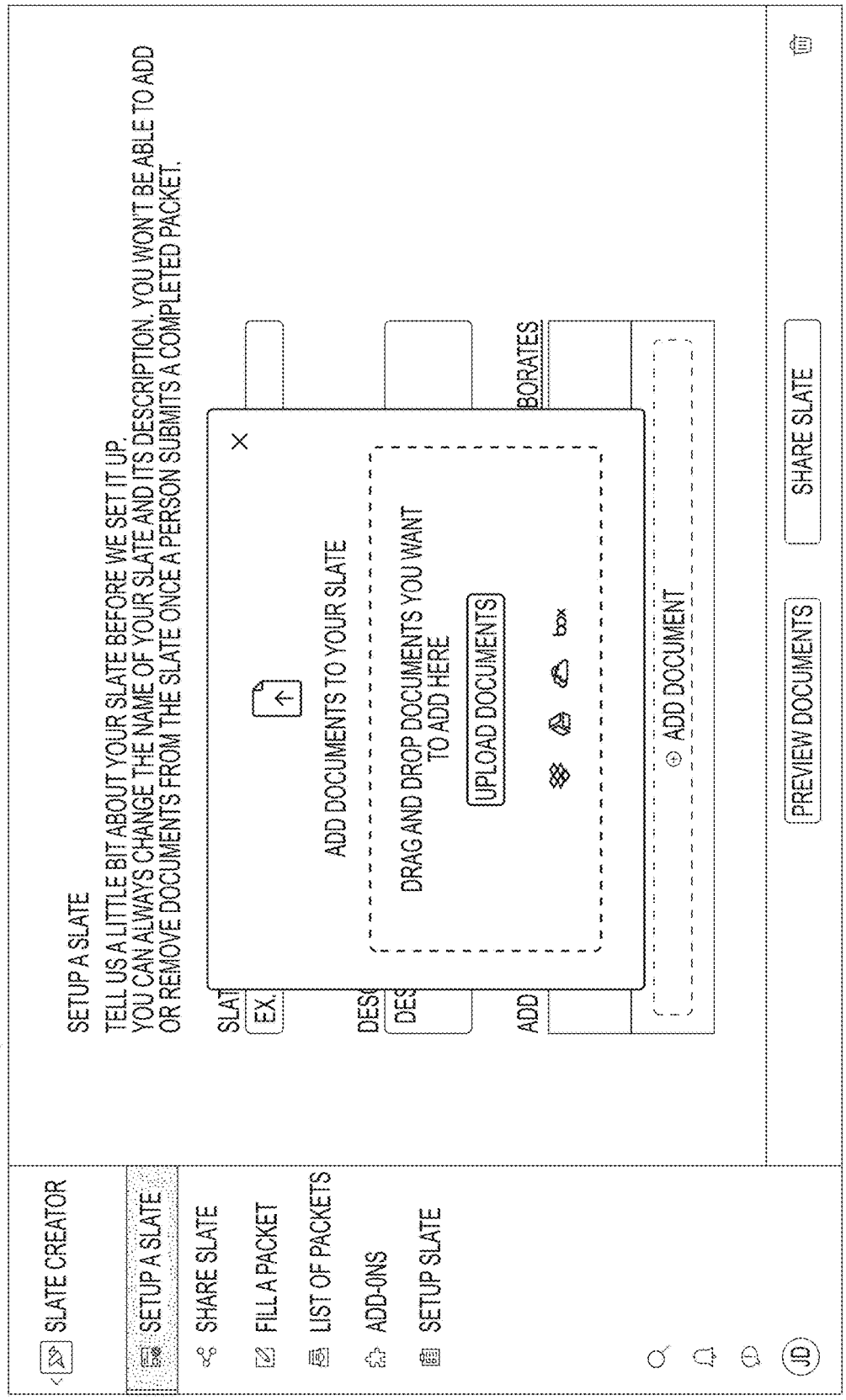

At step 304, one or more documents may be received by document import module 208 of workflow server 102 for the workflow. The one or more documents may be received, for example, as PDF files, DOCX files, JPEG files, or other file formats uploaded to the workflow server 102. As shown in a GUI 2900 in FIG. 29, a user can specify the workflow name 2902 ("Slate name") and a workflow description 2904. Workflow server 102 may receive one or more fillable documents uploaded from workflow templates or imported from the user's local device or a cloud storage service via network 110. For example, FIG. 30 shows an example GUI 3000 for adding one or more documents to the workflow by dragging and dropping the documents. FIGS. 34-35 show other example GUIs for adding more documents to a workflow of "Company Invoice." In some embodiments, documents may be uploaded from the user's local device or imported from a cloud storage service via network 110. The user may review the uploaded documents by triggering a selectable user interface object, such as selectable user interface object 3502 illustrated in example GUI 3500 in FIG. 35. The set of documents added to a particular workflow may be generated and edited based on the workflow templates from a library of pre-built workflows ("Slate Library"). Each document may be created or edited by the editing application (e.g., airSlate editor in FIG. 40) provided by the automatic workflow application (e.g., airSlate in FIG. 4). A user may access the uploaded pdf workflow template to edit and/or add fillable fields using functionality blocks provided by an editing application, such as functionality blocks 3104a, 3104b, and 3104c illustrated in example GUI 3100 in FIG. 31.

Figure 31:
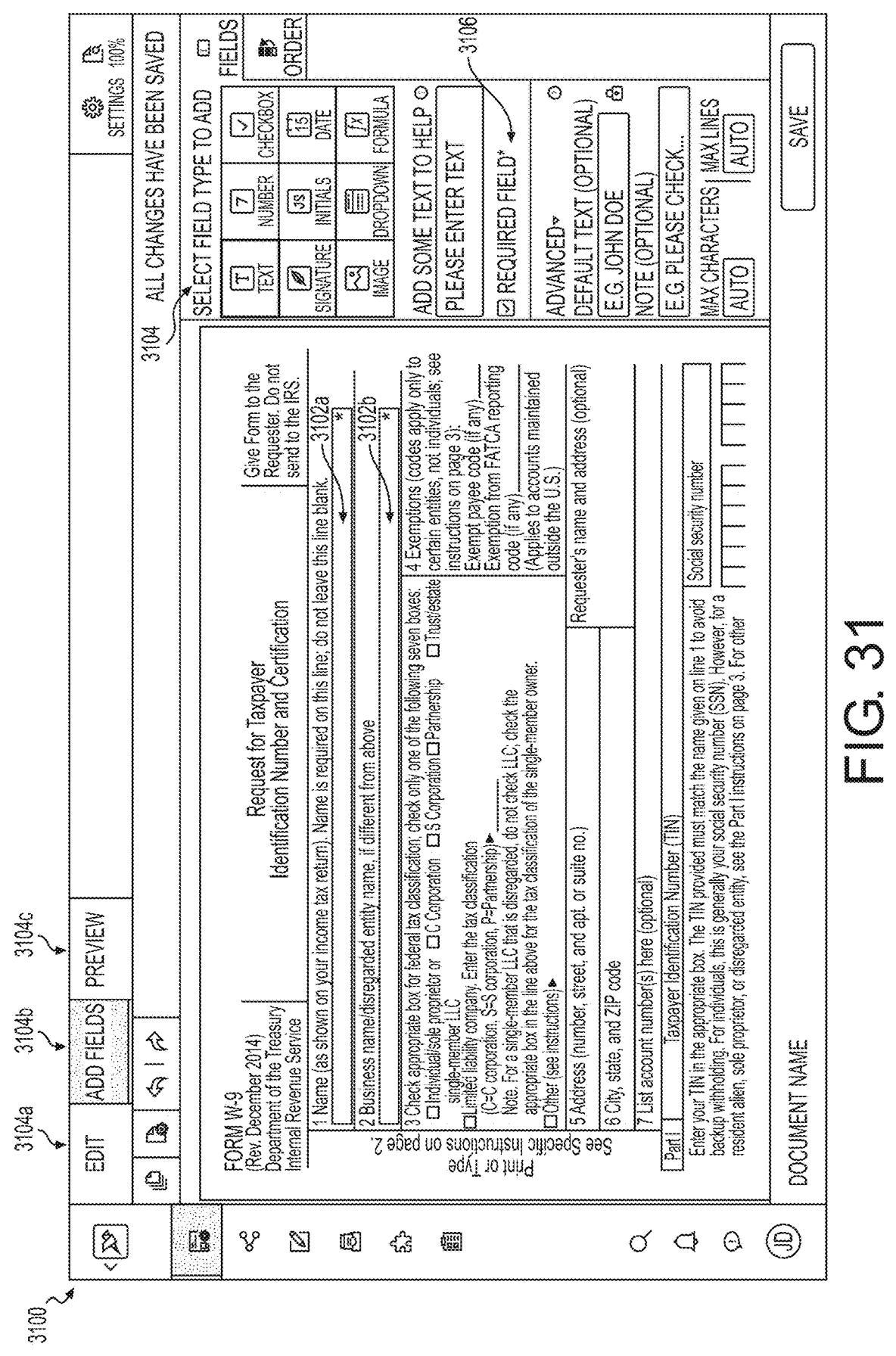

At step 306, each of the received documents for the workflow may be analyzed to determine one or more fillable fields within the document. Documents can be uploaded, for example, as part of creating or modifying a workflow template. In some embodiments, an uploaded document may be analyzed and fillable fields within the document may be automatically identified by the document import module 208 in workflow server 200. For example, as shown in example GUI 3400 in FIG. 34, the first workflow document may be analyzed to automatically determine two fillable fields within the document. In some embodiments, when workflow server 102 determines there are no fillable fields in a workflow document, as is the case for the second workflow document in example GUI 3400 in FIG. 34, the user may specify and add one or more fillable fields for a document using a slate creator, such as Slate Creator 402a illustrated in example GUI 400 in FIG. 4. Different types of fillable fields may be defined and/or added to the document with the editor app. For example, as shown in FIG. 31, the document import module 208 may detect that a workflow template is a PDF file and then analyze the PDF file to identify form fields, such as required text input fields, using metadata within the PDF file.

At step 308, permission information for the workflow may be received from a client device 104. Permission information for the workflow may be configured based on user interactions with one or more GUIs via a user interface of the client device 104. The workflow permission information may indicate one or more recipients permitted to edit, share, and/or distribute the workflow. As shown in example GUI 3700 of FIG. 37 and example GUI 3900 of FIG. 39, a user can add the email address of a recipient to grant the recipient permission to fill out the workflow ("Can Fill"), permission to use the workflow ("Can Use"), and/or permission to share the workflow with others ("Can Share"). Some recipients may be permitted only limited access (such as "read only") to the work flow. As shown in example GUI 6900 of FIG. 69, the one or more fillable fields in one document may be assigned to be filled in by one or more recipients based on a user interaction with a GUI. As shown in example GUI 7000A of FIG. 70A, a workflow document may be configured to be edited by one or more teammates and/or outside users. In some embodiments, permission information may include an order based on the roles of the users. For example, as described in more detail below, a user may create a workflow of an employee vacation request and share/distribute the workflow to a department manager and a hiring manager in a managerial authority order.

At step 310, a workflow may be created to include the workflow name, template documents, fillable fields, and workflow permission information. Workflow configuration module 206 may be configured to present the one or more GUIs for generating, updating, and/or deleting workflows within the server 200.

At step 312, a created workflow may be stored to a non-volatile computer memory of the workflow server 102 by executing the workflow configuration module 206. In some embodiments, the workflow documents may be stored to a file store (e.g., file store 220 in FIG. 2) whereas the other information (e.g., fillable field information) may be stored within a database (e.g., database 218 in FIG. 2). The created workflow may be automatically stored by workflow server 102 to a cloud storage.

At step 314, the workflow may be provided (e.g., shared, distributed) by the workflow distribution module 210 in workflow server 200 in accordance with the permission information for the workflow. The documents included in the workflow may be shared and/or distributed to individual recipients or to predefined groups of recipients inside or outside an organization with which a user is associated.

In some embodiments, the workflow distribution module 210 may be configured to enable a user to add multiple individual recipients or collaborators who can share and edit the documents of the workflow, such as shown in example GUI 3500 of FIG. 35. In some embodiments, the workflow distribution module 210 may be configured to enable a user to invite collaborators such as teammates or anyone outside the organization to collaborate on the generated slate or workflow, such as shown in example GUI 3600 of FIG. 36. For example, as shown in GUI 3600, the GUI may present the user with a list of collaborators. A selectable user interface object, such as user interface object 3602, may be selected by a user to send emails to each of the collaborators to invite them to collaborate on the workflow. Each of the collaborators may be given permission to add documents, remove documents, fill out documents, and/or edit fillable fields in documents.

Figure 37:
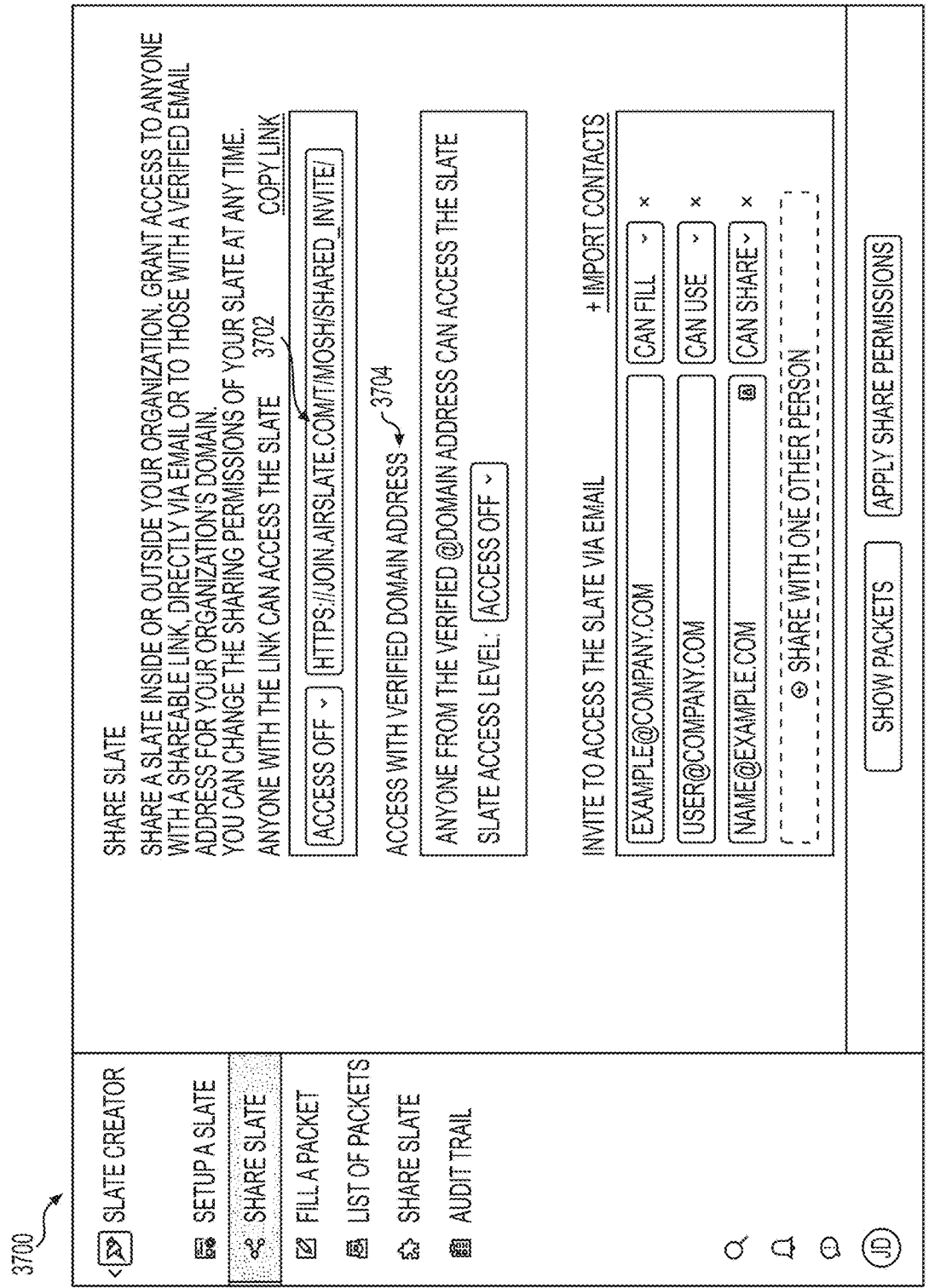

In one embodiment, the workflow distribution module 210 may be configured to enable a user to setup workflow permission information for the workflow, such as shown in example GUI 3700 of FIG. 37. The distribution module 210 may be executed to generate a shareable link, such as shareable link 3702, associated with the workflow (e.g., slate in FIG. 37). A GUI, such as GUI 3700, may be configured to enable the user to import one or more contacts as individual recipients, and may display email addresses associated with the recipients. The GUI (e.g., GUI 3700) may be configured to set up which recipients are permitted to edit, fill out, share, and/or use a slate via the shareable link (e.g., shareable link 3702). The workflow may be shared by groups of the individual recipients with respective verified domain addresses. As described below in reference to FIG. 37 and FIG. 39, the system may provide different methods for sharing and distributing workflows to one or more recipients.

Figure 5:
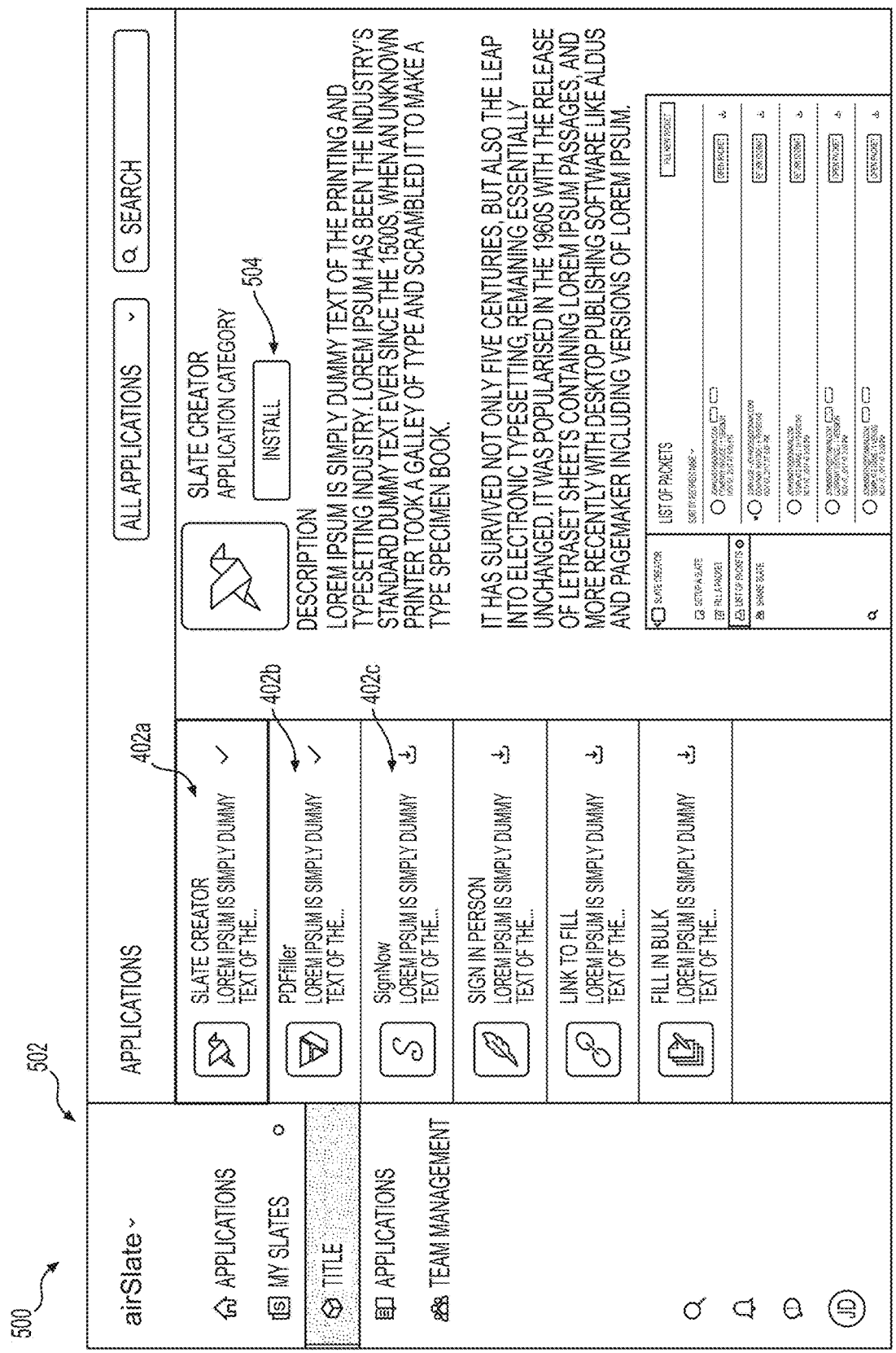

A GUI may be provided to allow the user to install new apps provided by the workflow server 200 within a user account, according to some embodiments of the present disclosure. For example, FIG. 5 shows an example GUI 500 that allows a user to install new apps. The GUI (e.g., example GUI 500) may be configured to provide a menu (e.g., menu 502) which includes a plurality of user interface objects enabled to, upon selection, trigger a plurality of GUIs for the user to create workflows, manage teams, share workflows, distribute workflows, etc. The GUI (e.g., GUI 500) may include one or more apps (e.g., apps 402a, 402b, 402c of FIG. 4) and a user interface object (e.g., user interface object 504 ("Install" icon)). The user interface object (e.g., user interface object 504) may be configured to be triggered by a user action to initiate an installation of the selected app, such as slate creator (e.g., Slate Creator 402a). The slate creator app can be used to generate and configure new workflow documents and/or workflows within the system.

Figure 6:
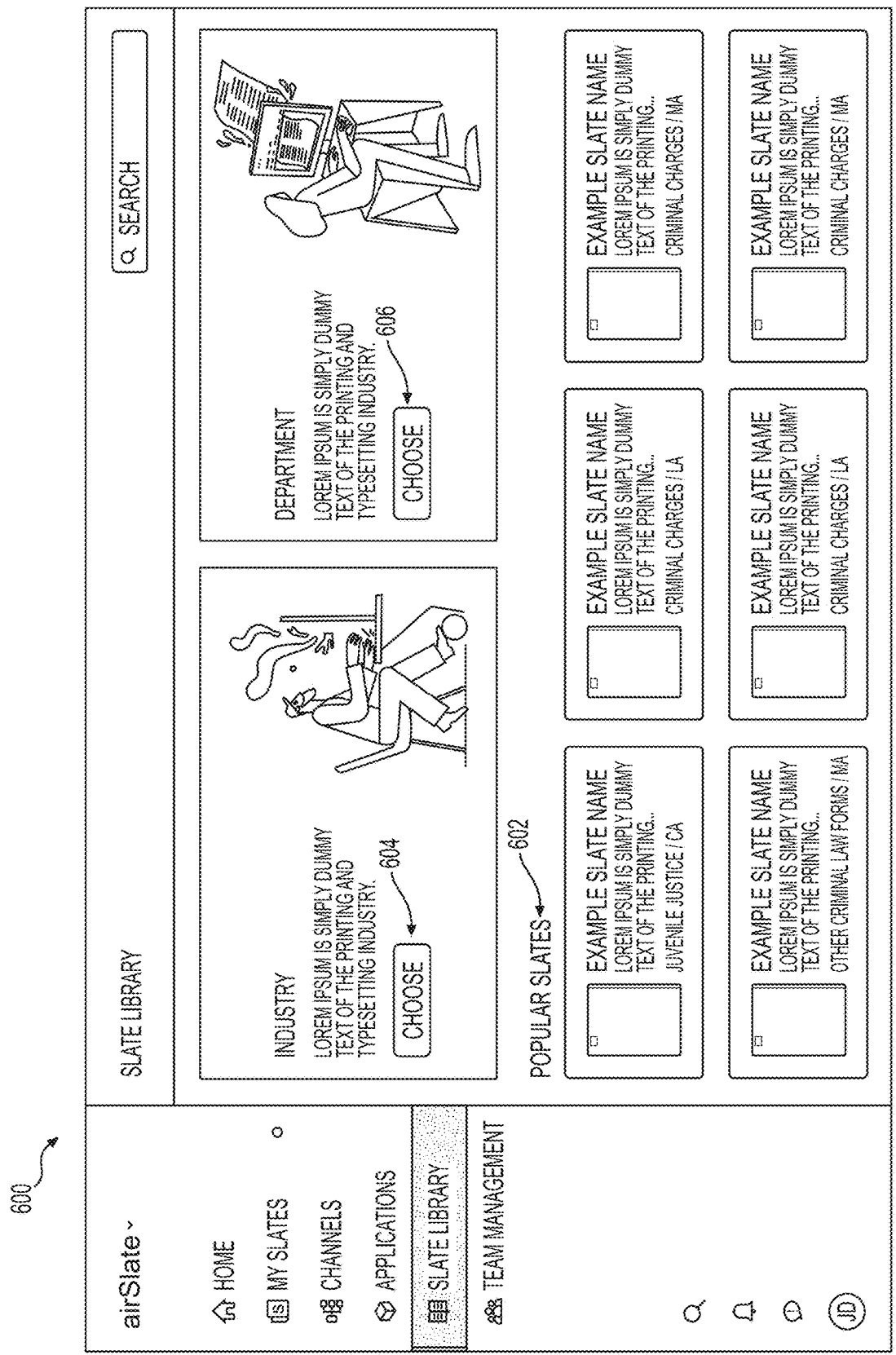
Figure 7:
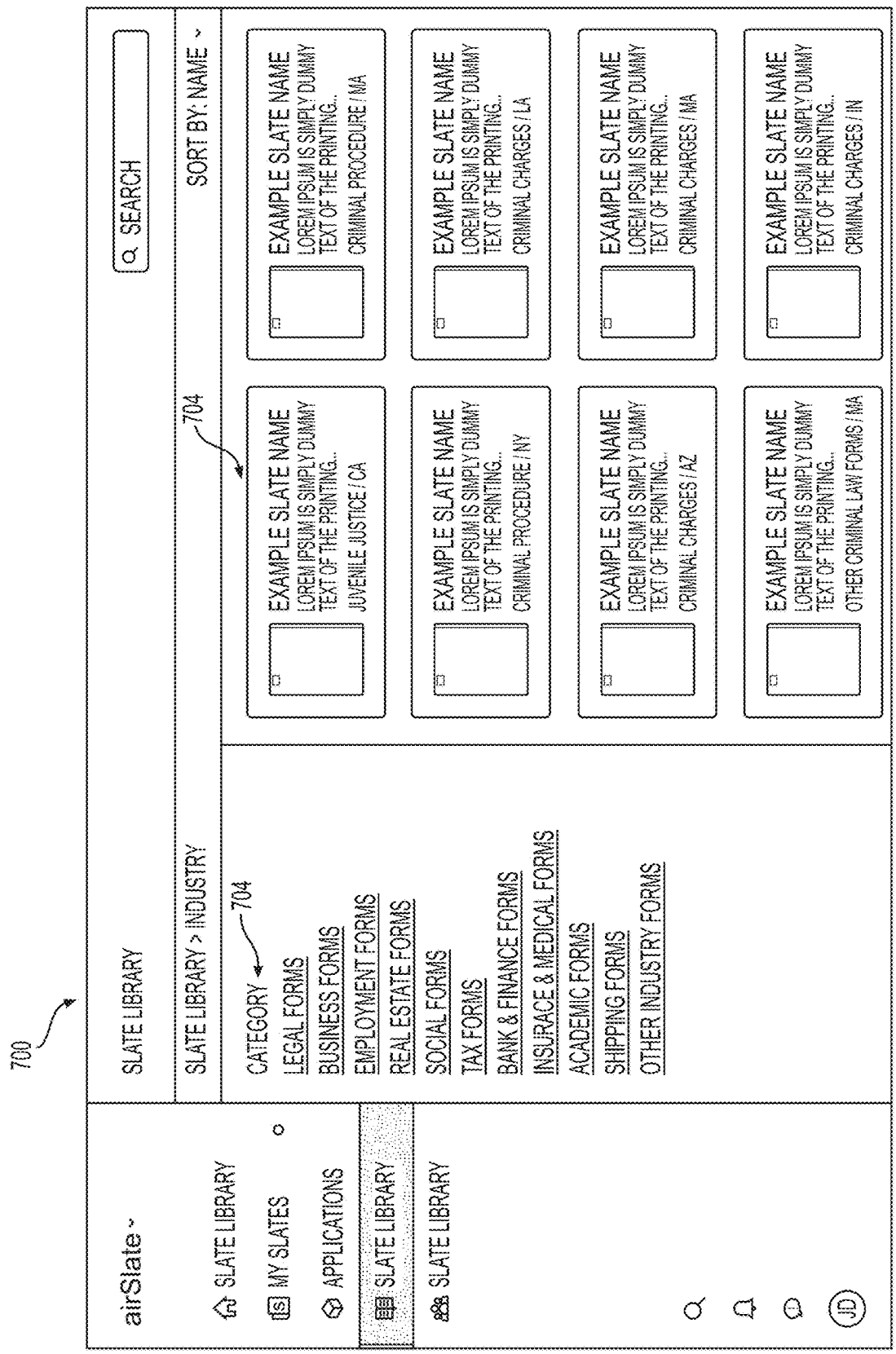

FIGS. 6-11 show example GUIs that allow a user to browse a library of pre-built workflows (e.g., "Slate Library"), according to some embodiments of the present disclosure. In some embodiments, the library can include a collection of popular workflows. Popular workflows may be determined automatically based on usage statistics within the system. In some embodiments, the workflow library can include workflows categorized by industry or department. In some embodiments, the library includes workflows created by other users within the same organization. In some embodiments, the library can include workflows created by users outside the current user's organization. FIG. 6 shows an example GUI 600 for browsing a library of pre-built workflows ("Slate Library"), according to some embodiments of the present disclosure. In some embodiments, the library can include a collection of popular workflows 602. In some embodiments, the user may browse the library by selecting a user interface object 604 to view and select workflows by industry. In some embodiments, the user may browse the library by selecting a user interface object 606 to view and select workflows by department. FIG. 7 shows another example GUI 700 for browsing a slate library relevant to different industry categories. Some examples of categories include "Legal forms," "Business forms," "Employment forms," and "Tax forms." For example, GUI 700 shows a collection of example workflows 702 in a category of "legal forms".

Figure 8:
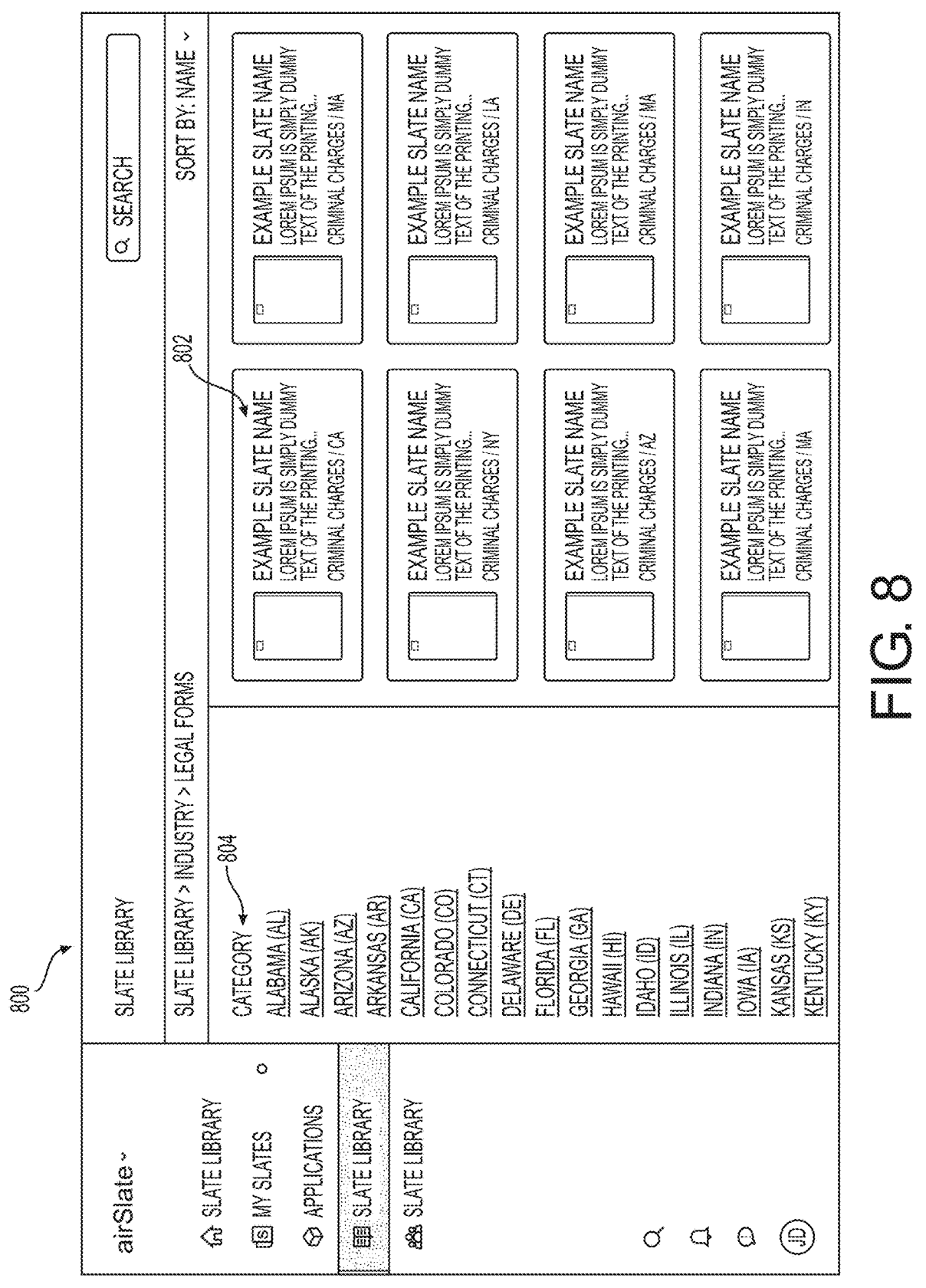

FIG. 8 shows an example GUI 800 configured for browsing a library of pre-built workflows ("Slate Library") associated with an industry category of "Legal forms." For example, the library may include a list 804 of states, jurisdictions, and/or locations for the legal forms. The library can include a collection of workflows 802 associated with a type of "Legal form" used in different states. In some embodiments, workflows 802 may be sorted alphabetically by names of the workflows.

Figure 9:
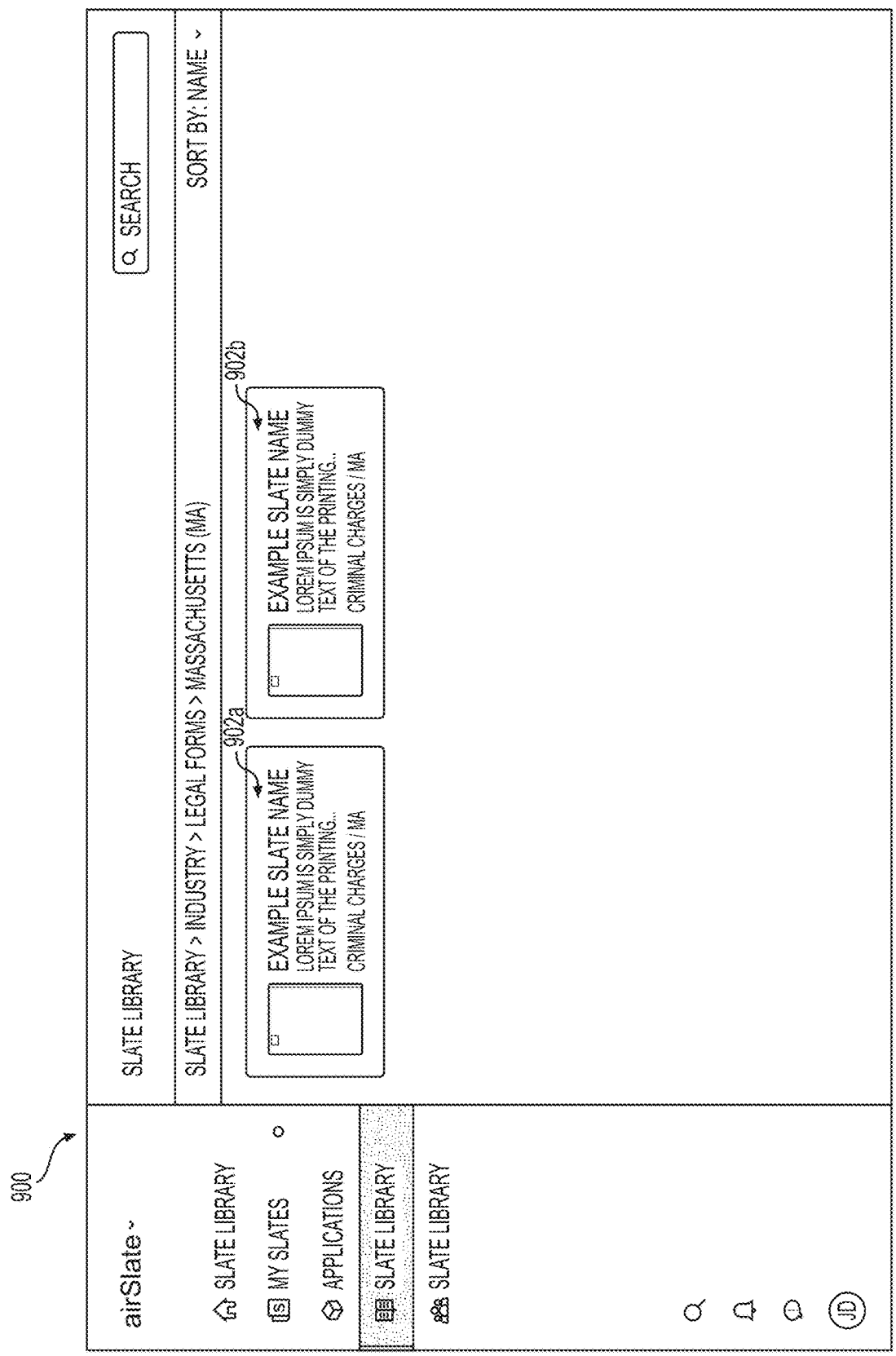

FIG. 9 shows an example GUI 900 configured for browsing a library of pre-built workflows ("Slate Library"), according to some embodiments of the present disclosure. In some embodiments, the library can include a collection of workflows (e.g., workflows 902a-b) corresponding to a type of legal form used in a specific state (e.g. Massachusetts). The workflows (e.g., workflows 902a-b) may be sorted alphabetically by name.

Figure 10:
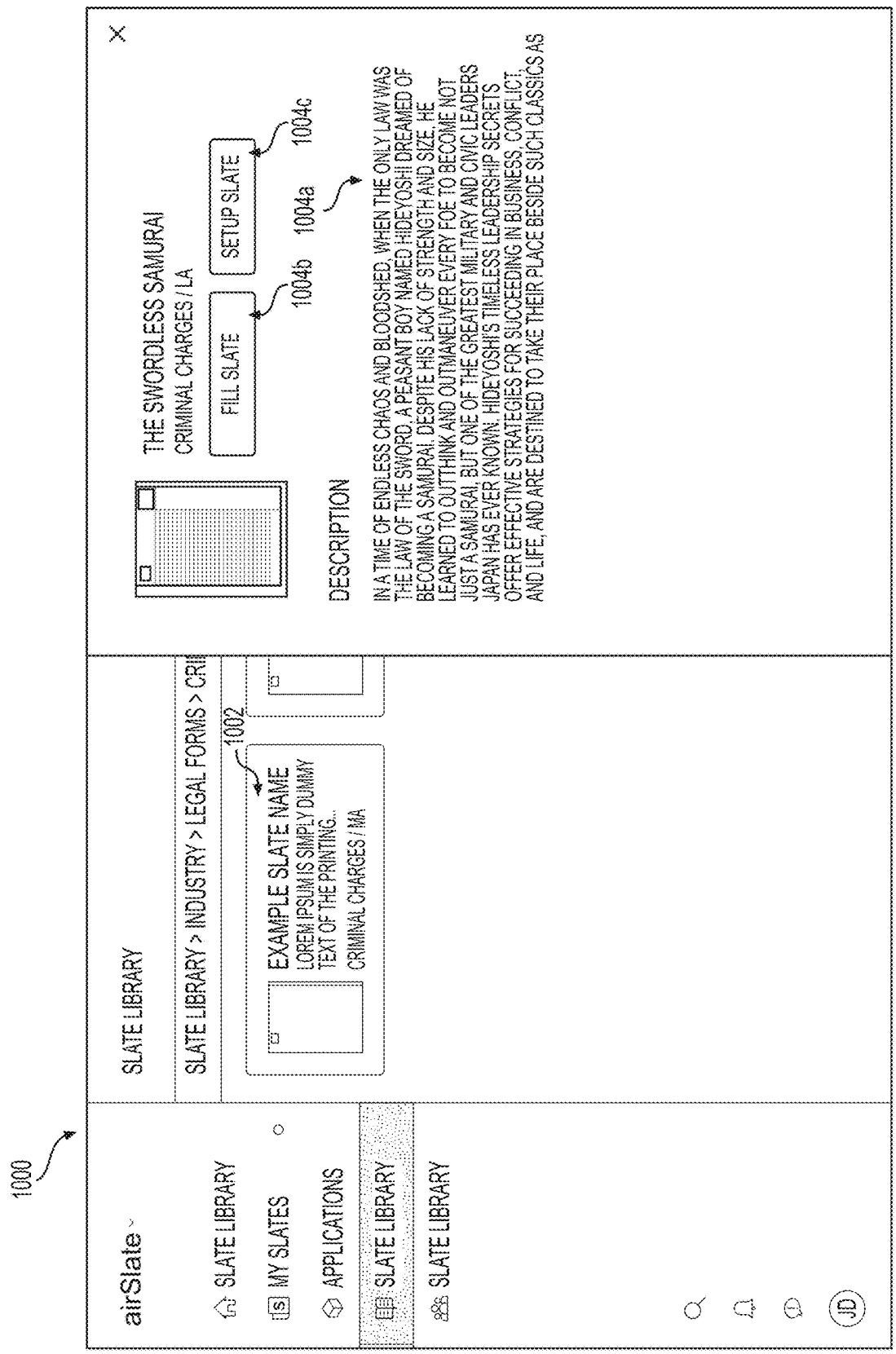

FIG. 10 shows an example GUI 1000 configured for browsing a library of pre-built workflows ("Slate Library"), according to some embodiments of the present disclosure. As shown in the example in FIG. 10, a user can click on a particular workflow (e.g., workflow 1002) within the library to see a detailed description (e.g., detailed description 1004a) of the workflow. A user can click a selectable user interface object (e.g., user interface object 1004b ("Fill Slate")) that allows the user to fill the workflow, or click a selectable user interface object (e.g., user interface object 1004c ("Setup Slate")) that allows the user to configure a new workflow based on the selected workflow. When configuring a new workflow, the selected workflow may be copied into the user's account such that the user can configure and distribute workflow.

Figure 11:
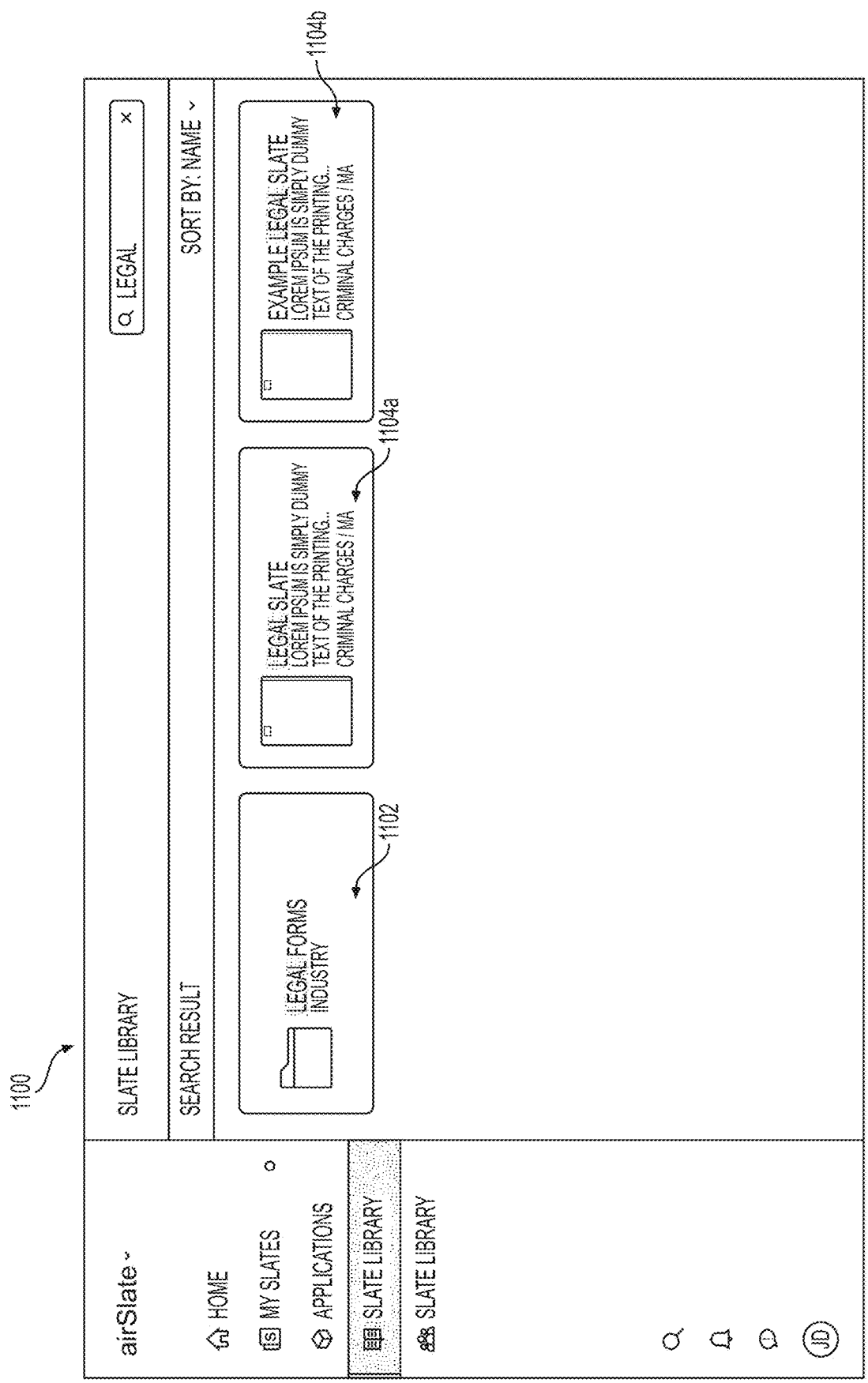

FIG. 11 shows an example GUI 1100 configured for browsing a library of pre-built workflows ("Slate Library"). For example, in the example shown in FIG. 11, a user has searched the library of workflows using the keyword "Legal" in a search bar. A GUI (e.g., GUI 1100) may be configured to allow a user to search a type of workflows and may present workflow folders and corresponding workflows. The GUI (e.g., GUI 1100) may include folders (e.g., folders 1102) and/or corresponding workflows (e.g., workflows 1104a, 1104b). The folders and corresponding workflows may be sorted alphabetically by name.

Figure 13:
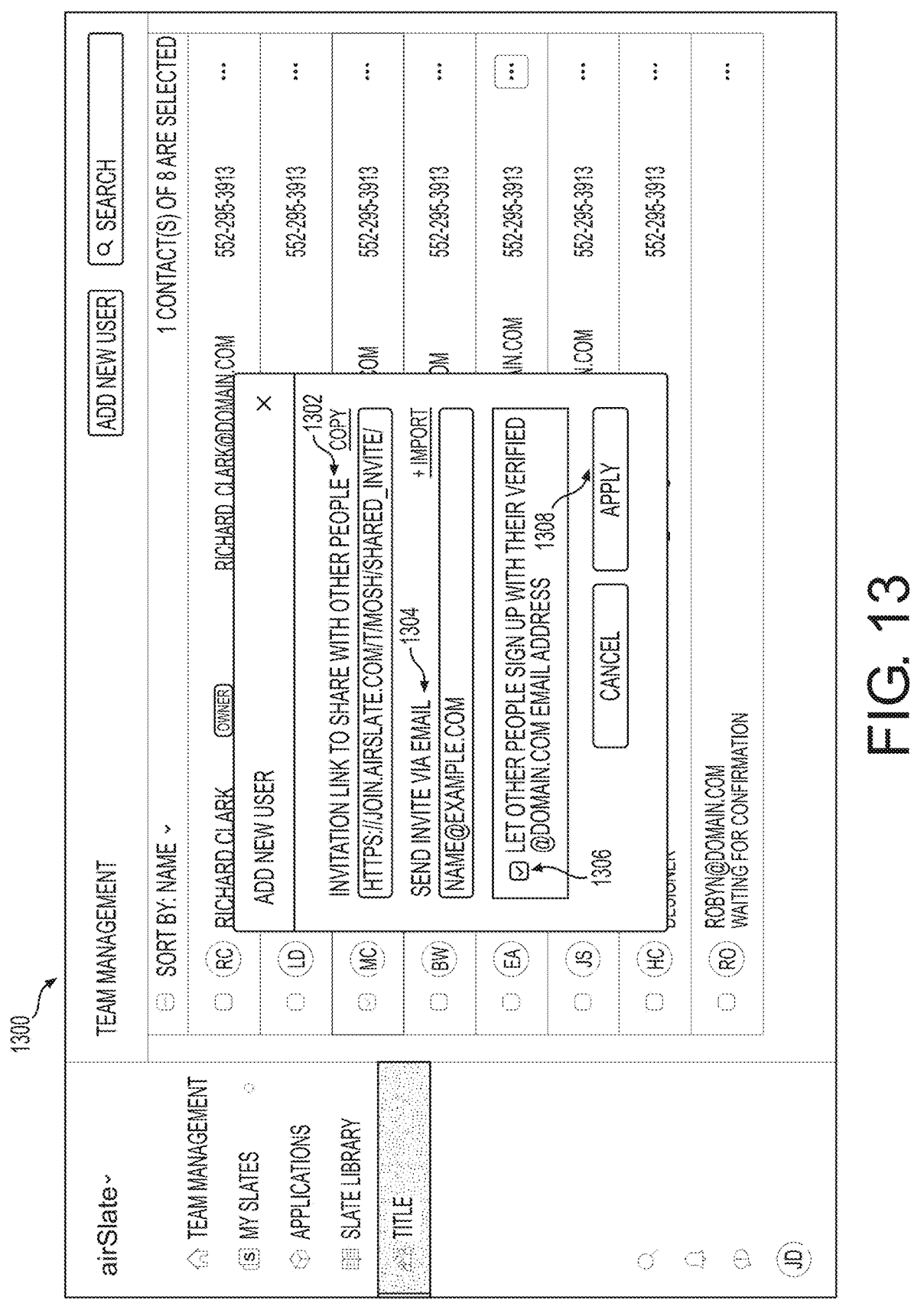
Figure 14:

FIGS. 12-16 show example GUIs configured for managing registered users within an organization, according to some embodiments of the present disclosure. An organization's users may be assigned to one or more "teams" within the system. As shown in FIG. 13, a GUI (e.g., GUI 1300) can be used to invite new users to the system, either by sending them a URL provided by the GUI, or by sending them an email. As shown in FIG. 14, a GUI (e.g., GUI 1400) may be used to assign each user a particular role with their organization or team, such as a "Team Member," "Org Admin" (e.g., organizational admin), "Team Admin," etc. In some embodiments, the organizational admin has full privileges within the system, whereas users with other roles may have restricted privileges.

Figure 12B:
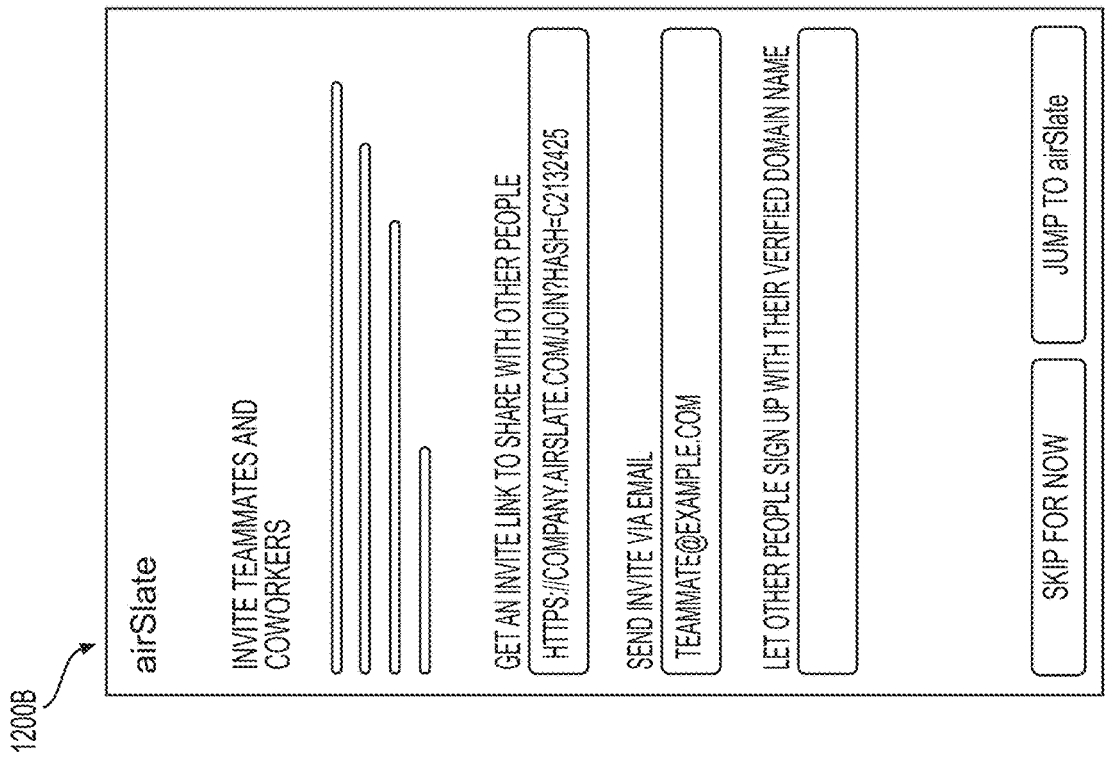
Figure 12A:
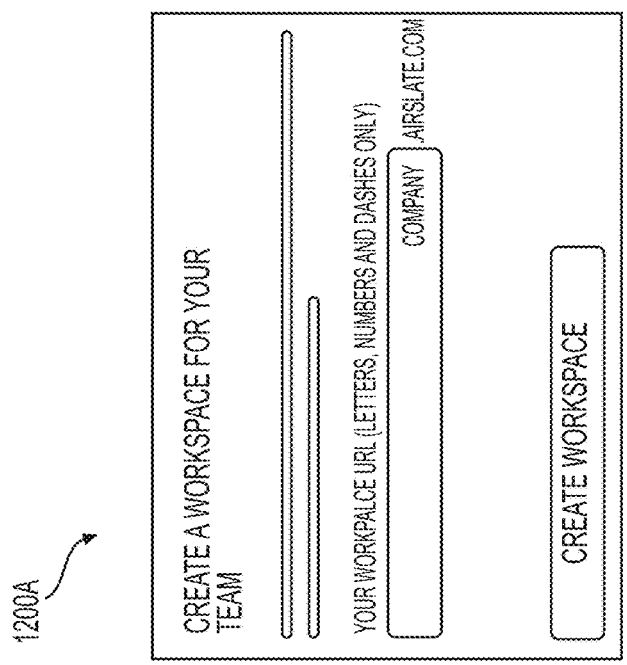

FIG. 12A shows an example GUI 1200A for allowing a user (e.g., organizational admin) to create a workspace for an organization while logging into an automatic workflow application executed by the workflow server 102. FIG. 12B shows an example GUI 1200B allowing a user to add an allowed email domain or multiple domains such that anyone with a verified company email address can join the workspace. It also allows other users outside the organization to join in the workflow system using their organization or company email. An organizational admin may navigate to the team management section of the corresponding workspace and perform team management to assign roles to teammates, block or delete teammates, or invite new ones to join, etc.

Figure 12C:
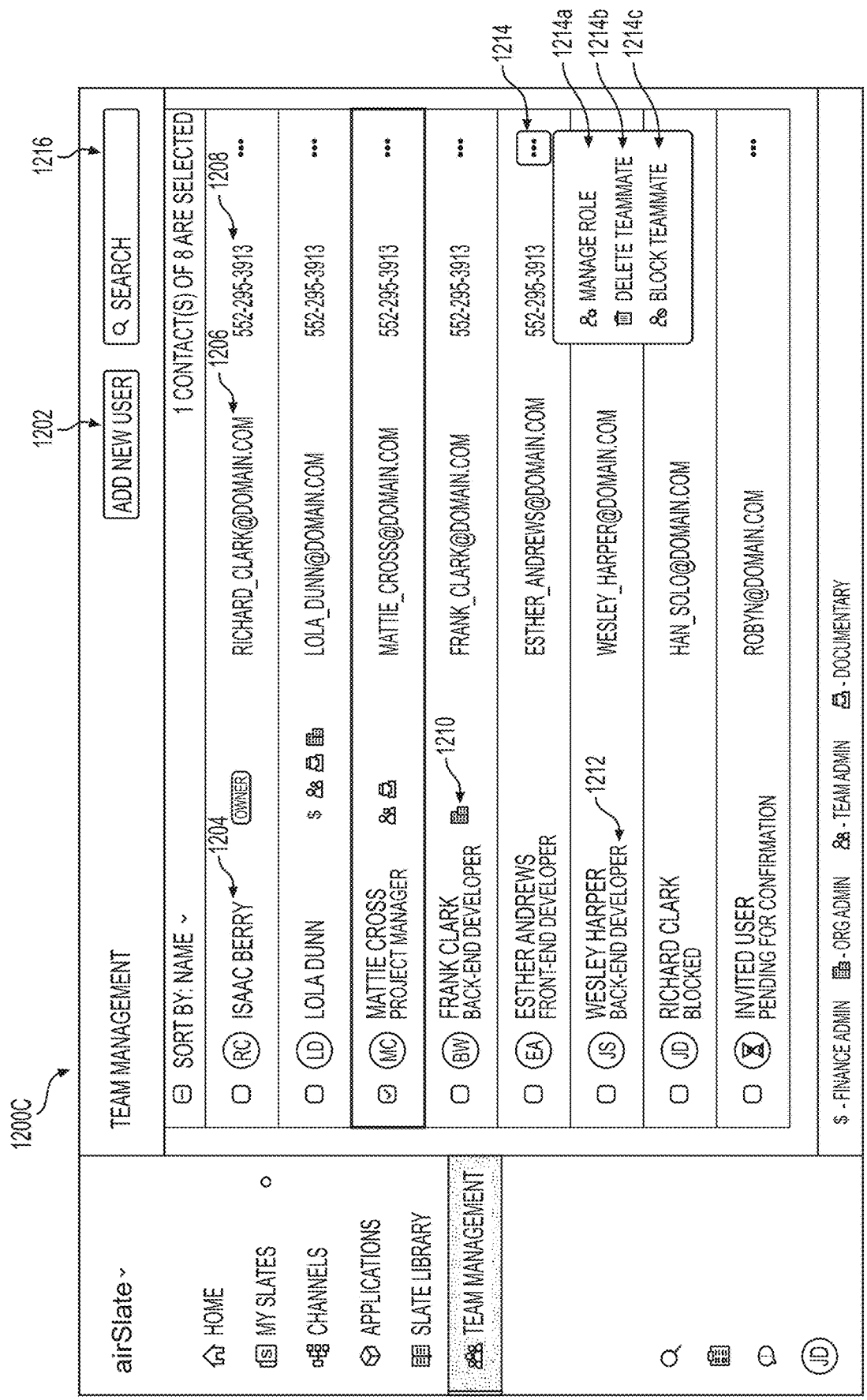

FIG. 12C shows an example GUI 1200C configured for managing users within an organization, according to some embodiments of the present disclosure. An organization's users may be assigned to one or more "teams" within the system. In some embodiments, the members of the team may be sorted alphabetically by name. The illustrative GUI may include a selectable user interface object (e.g., user interface object 1202) that, when clicked, allows a new user to be added to an organization or a team of an organization. The illustrative GUI may include a plurality of user interface elements, such as a user interface element corresponding to a user or member name of each user (e.g., user interface element 1204), a user interface element corresponding to an email address associated with each team member (e.g., Richard_clark@domain.com) (e.g., user interface element 1206), a user interface element corresponding to a team member's contact information (e.g., user interface element 1208), a user interface element corresponding to a job title (e.g., user interface element 1212), an icon that indicates the type of admin of each team member (e.g., Organizational Admin) (e.g., icon 1210), and text indicating a team member's role within the organization (e.g., Back-end developer 1212). The GUI 1200C may include a user interface object 1214 which allows for managing an individual team member. For example, user interface object 1214 may be triggered by a user selection to display a menu, and elements of the menu may be selected by a user to manage a team member's role (e.g., interface element 1214a), delete a teammate (e.g., interface element 1214b), or block a teammate (e.g., interface element 1214c). The GUI 1200C may also include a search bar (e.g., search bar 1216) configured to search for a user registered with the system, so that, for example, the user can be added as a new team member of the listed team.

FIG. 13 shows an example GUI 1300 for managing users within an organization. The GUI 1300 can be used to invite new users to join a team and workflow system, either by sending the users a URL (e.g., URL 1302) associated with a current workflow system via email (e.g., using email input box 1304). The GUI 1300 may include a checkmark functionality (e.g., checkmark functionality 1306) to toggle whether to let other people sign up with the verified email address of the same domain. Once the invitation method is chosen, a selectable user interface object (e.g., user interface object 1308 ("Apply" icon)) may be activated to send the invitation link to an email of a user.

Figure 16:
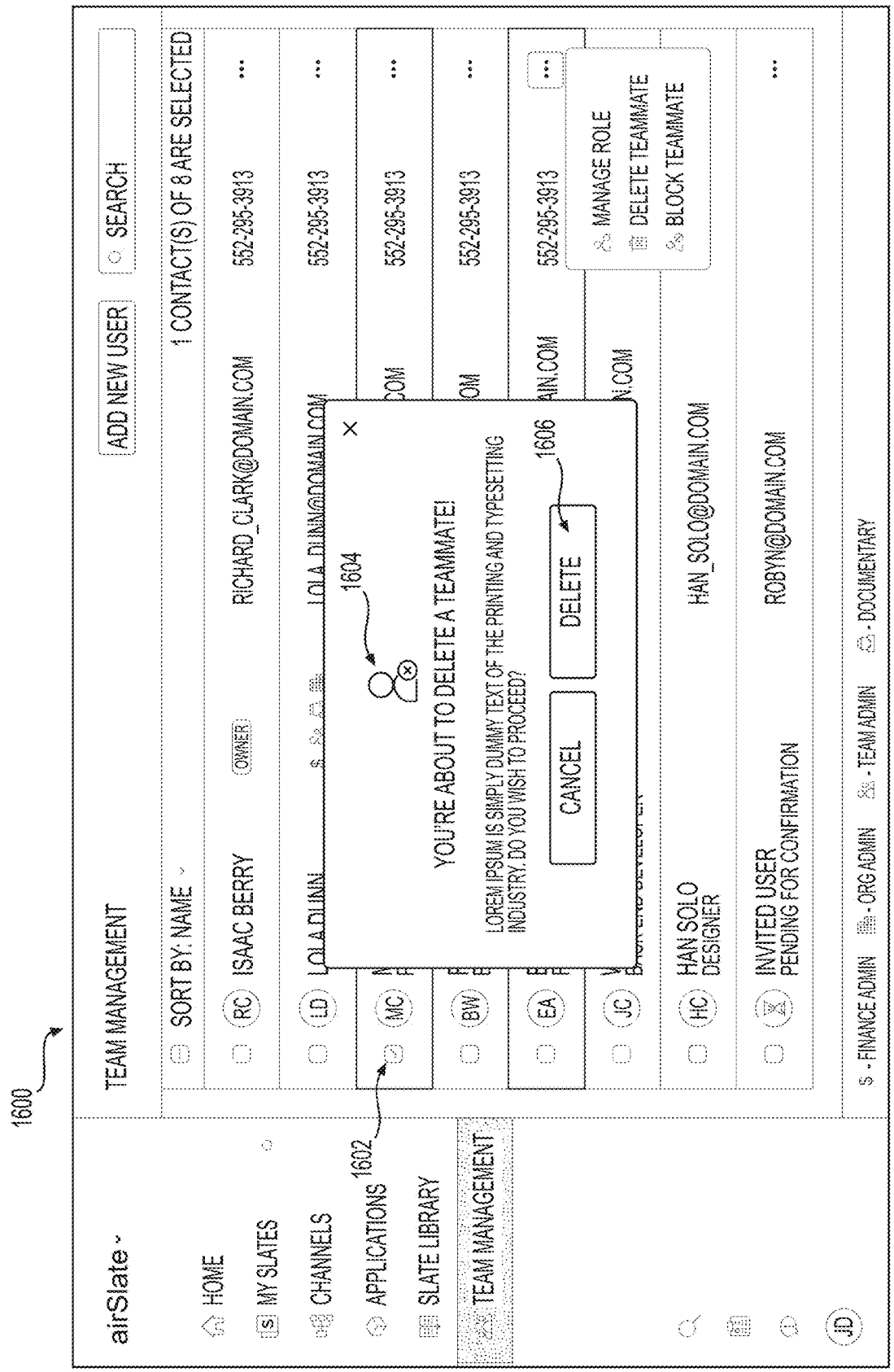

FIG. 14 shows an example GUI 1400 configured for managing users within an organization, according to some embodiments of the present disclosure. Each user may be assigned with a particular role with their organization or team, such as Team Member 1402a, "Org Admin" 1402b (e.g., "Organizational Admin"), "Team Admin" 1402c, "Documentary" 1402d, or "Finance Admin" 1402e. In some embodiments, an organizational admin role may have full privileges within the system, whereas users with other rules have restricted privileges. The GUI may also include an icon (e.g., Apply icon 1404) to apply the changes of role assignment to the team member after a role has been selected. FIG. 15 illustrates another example GUI 1500 for managing users within an organization, according to some embodiments of the present disclosure. Checkmarks (e.g., checkmarks 1502a, 1502b) indicate that two team members (Mattie Cross and Richard Clark) are selected for an action to be performed on both of them. FIG. 16 shows an example GUI 1600 for managing users within an organization, according to some embodiments of the present disclosure. For example, after selecting a team member (as indicated by checkmark 1602) and choosing an option to delete a teammate, as described in relation to selectable user interface object 1214 of FIG. 12, the GUI may provide functionality to delete the selected teammate by providing a user interface window (e.g., user interface window 1604) with a selectable user interface object (e.g., user interface object 1606 (Delete icon)).

Figure 17:
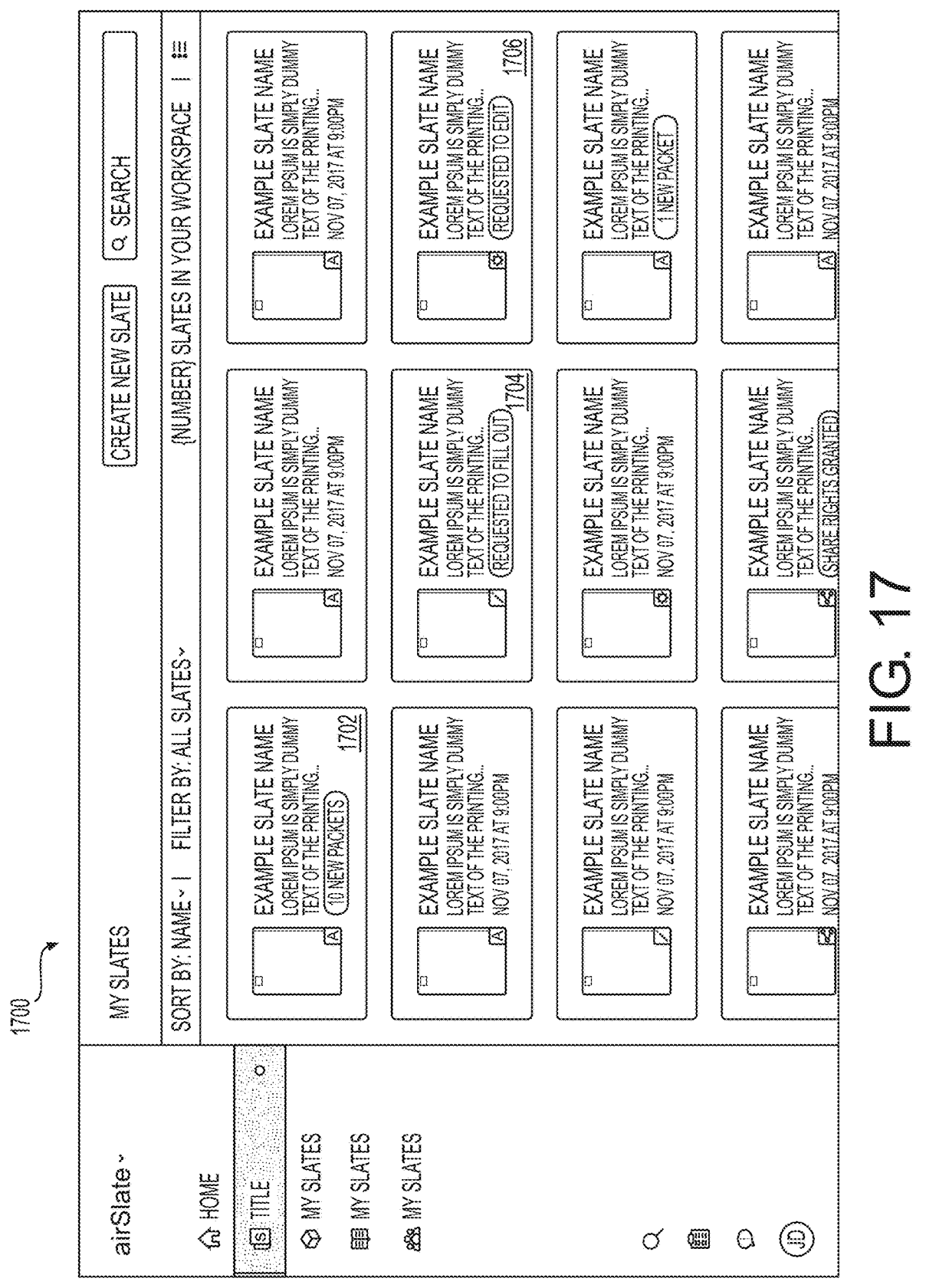
Figure 18:
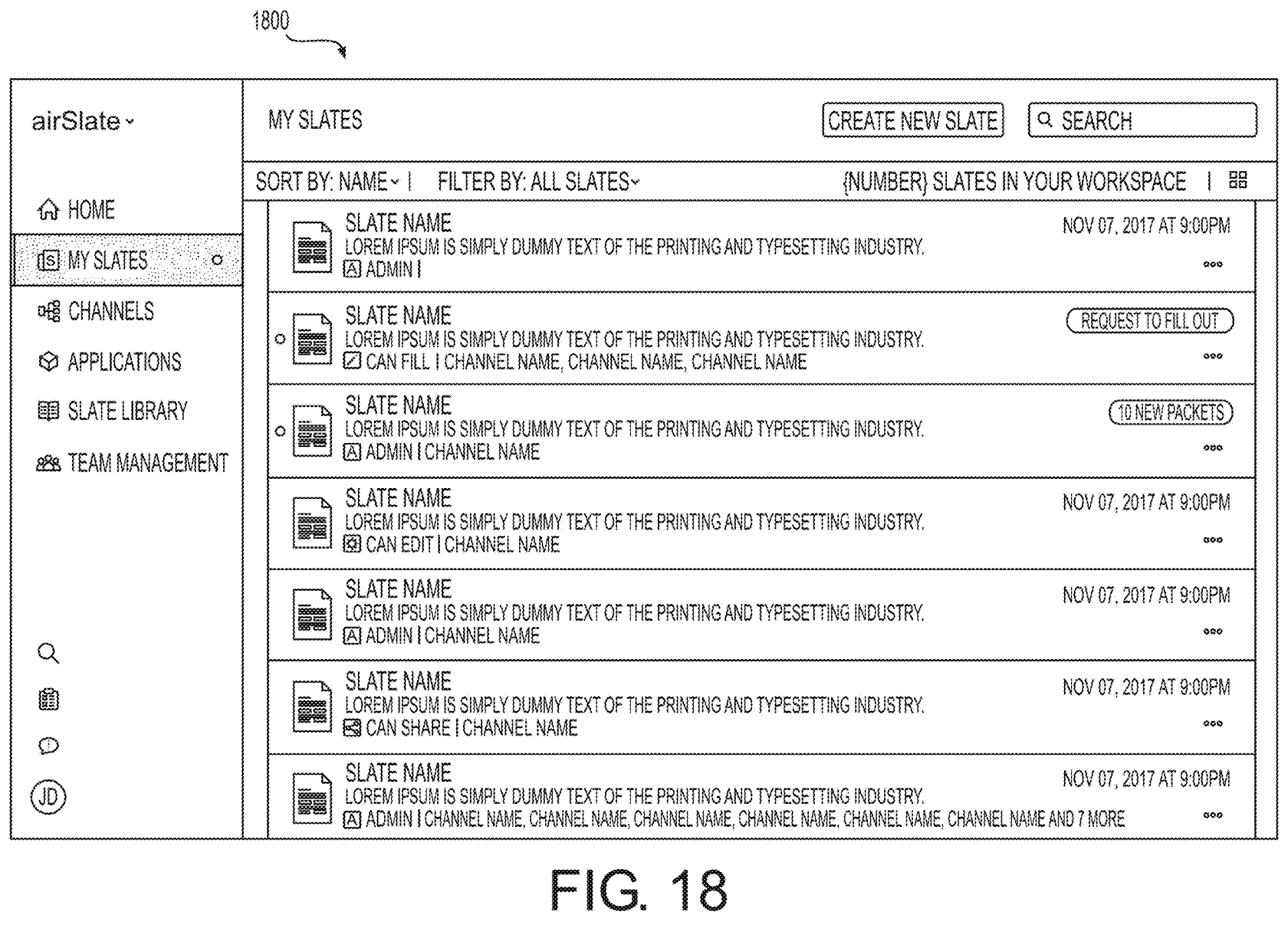

FIGS. 17 and 18 show example GUIs configured for browsing (a) workflows that the current user has created or distributed, (b) workflows that have been distributed to the current user for filling out, and (c) workflows on which the current user has been invited to collaborate. The workflows may be viewed as different icons in FIG. 17 or displayed as a list in FIG. 18. The uncompleted workflows may be presented with tasks to be done. For example, as shown in FIG. 17, a first workflow 1702 may have been created by the user. The first workflow 1702 is shown as having "10 New Packets," meaning that the workflow has been filled out ten (10) times since some earlier point in time. A second workflow (e.g., workflow 1704) may have been distributed to the current user to fill out ("Requested to fill out"). A third workflow (e.g., workflow 1706) may have been shared with the current user for collaborative editing ("Requested to edit").

Figure 19:
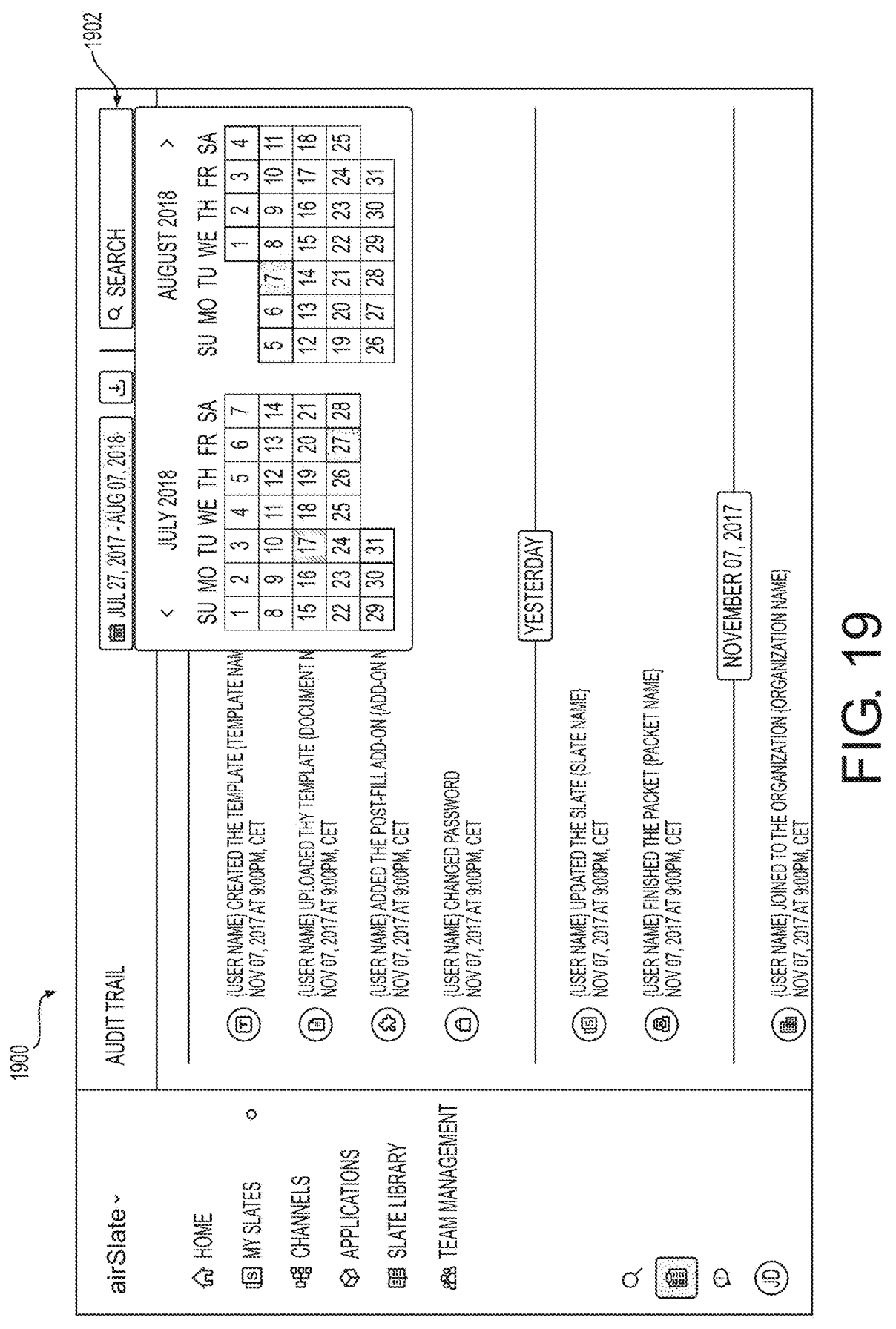

FIG. 19 shows an example GUI 1900 configured for viewing system activity, according to some embodiments of the present disclosure. The GUI may provide an "Audit Trail," allowing certain users (e.g., admins) to view a chronological list of system events and modifications associated with a particular user, team, or organization. The GUI 1900 may include a calendar bar 1902 used to set a time period for displaying system events and modifications made by the users in the system.

FIGS. 20-28 show example GUIs that allow users to manage user accounts, according to some embodiments of the present disclosure. The user account information may be arranged under a list of categories including company information, payment information, personal information, custom branding, account settings and address book.

Figure 20:
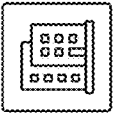
Figure 21:
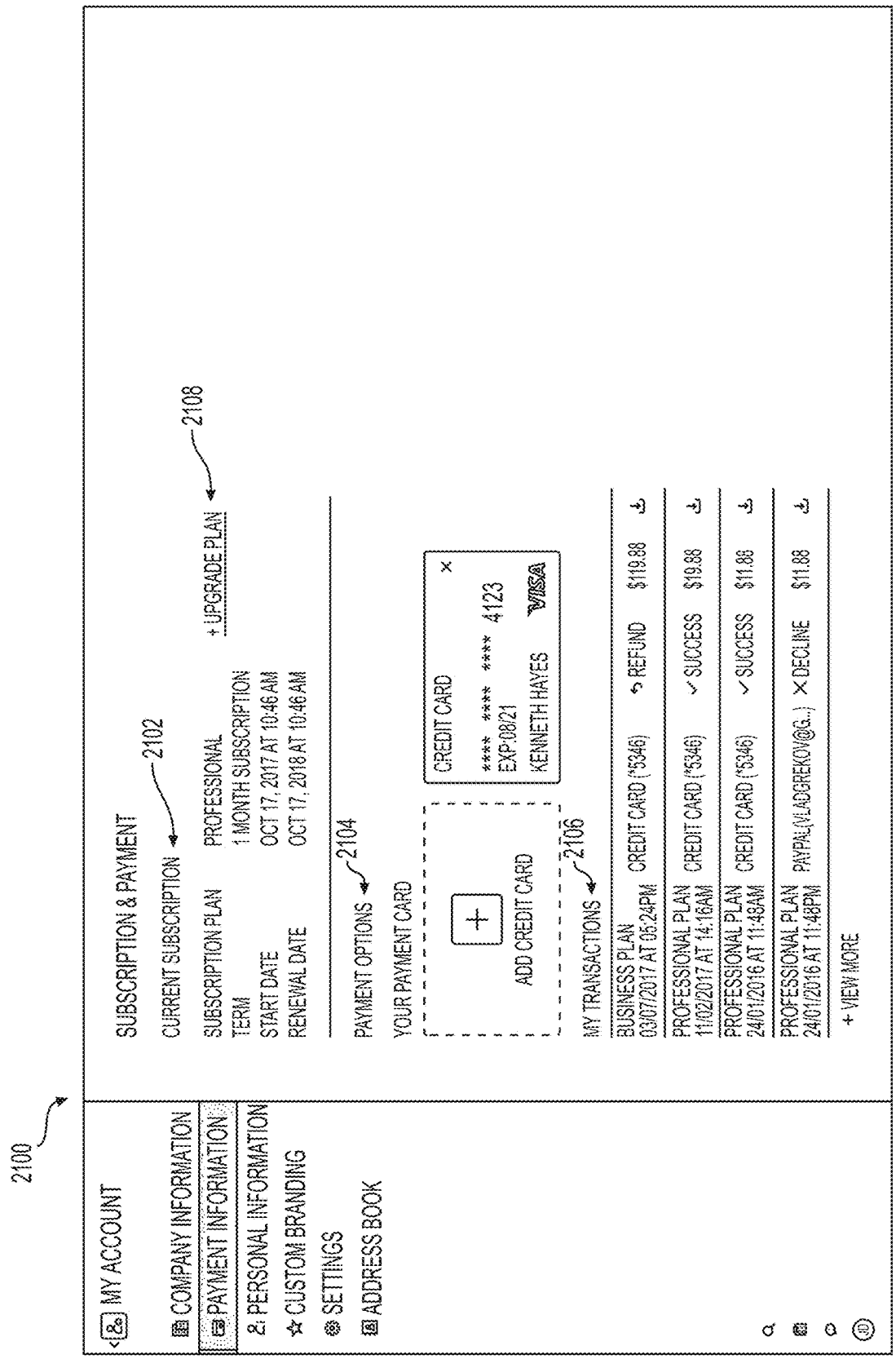

FIG. 20 shows an example GUI 2000 that allows a user to update an organization's information (e.g., company profile) within the system, according to some embodiments of the present disclosure. For example, the GUI 2000 may be configured to invite teammates to join the current user workspace by sharing an invitation link (e.g., invitation link 2002) with other users or members. The GUI 2000 may be configured to allow users to register in the current user workspace with their permitted and verified domain names (e.g., domain names 2004). FIG. 21 shows an example GUI 2100 configured for updating user subscription and payment information (e.g., user subscription and payment information 2102) within the system, according to some embodiments of the present disclosure. The GUI may present the current user subscription information and payment information. The GUI may allow a user to change and upgrade a subscription plan by clicking a selectable user interface object (e.g., user interface object 2108 ("Upgrade Plan")). The GUI may allow a user to view a transaction history (e.g., transaction history 2106) and update a payment option (e.g., payment option 2104).

Figure 22:
Figure 23:
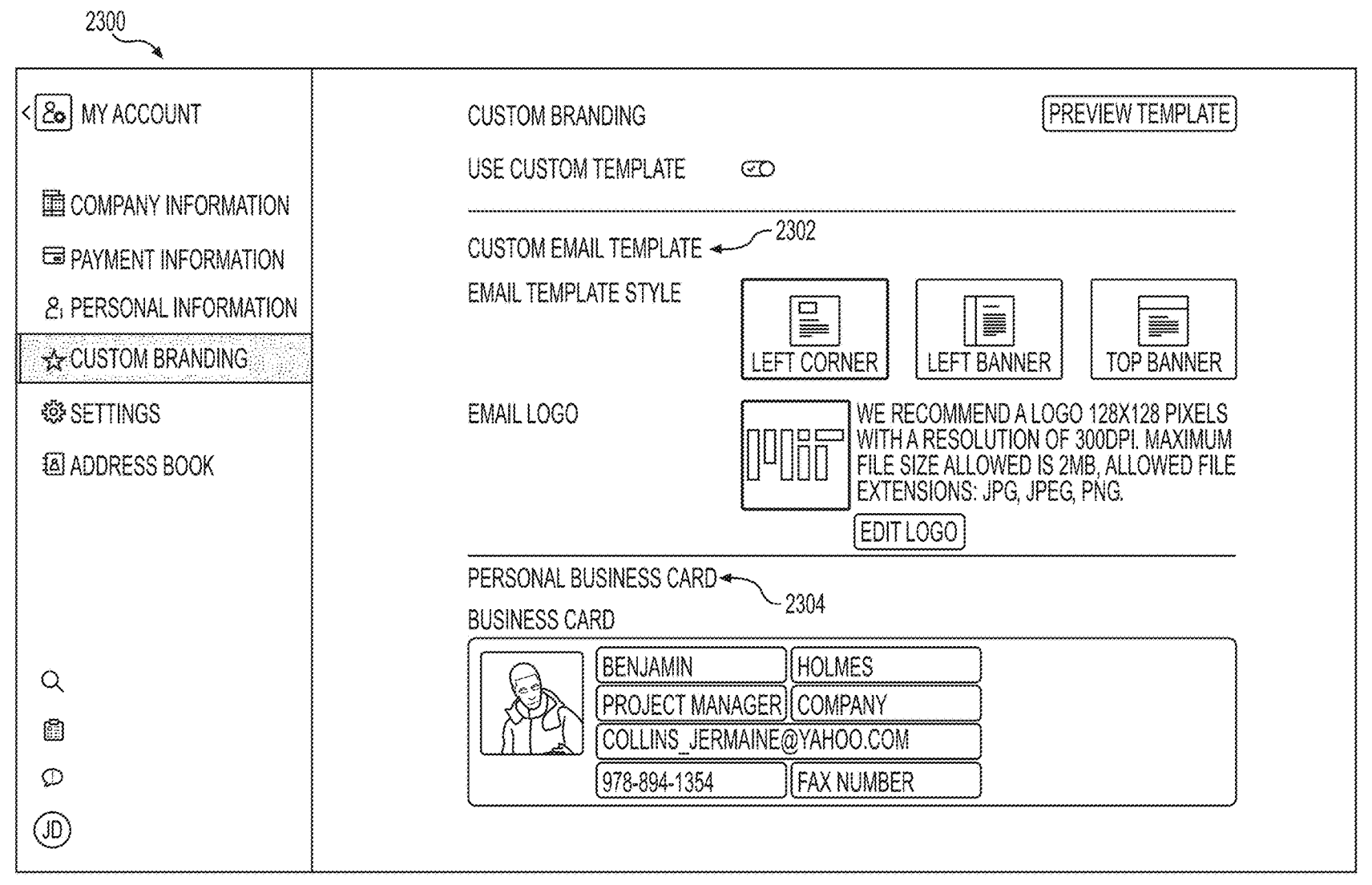
Figure 24:
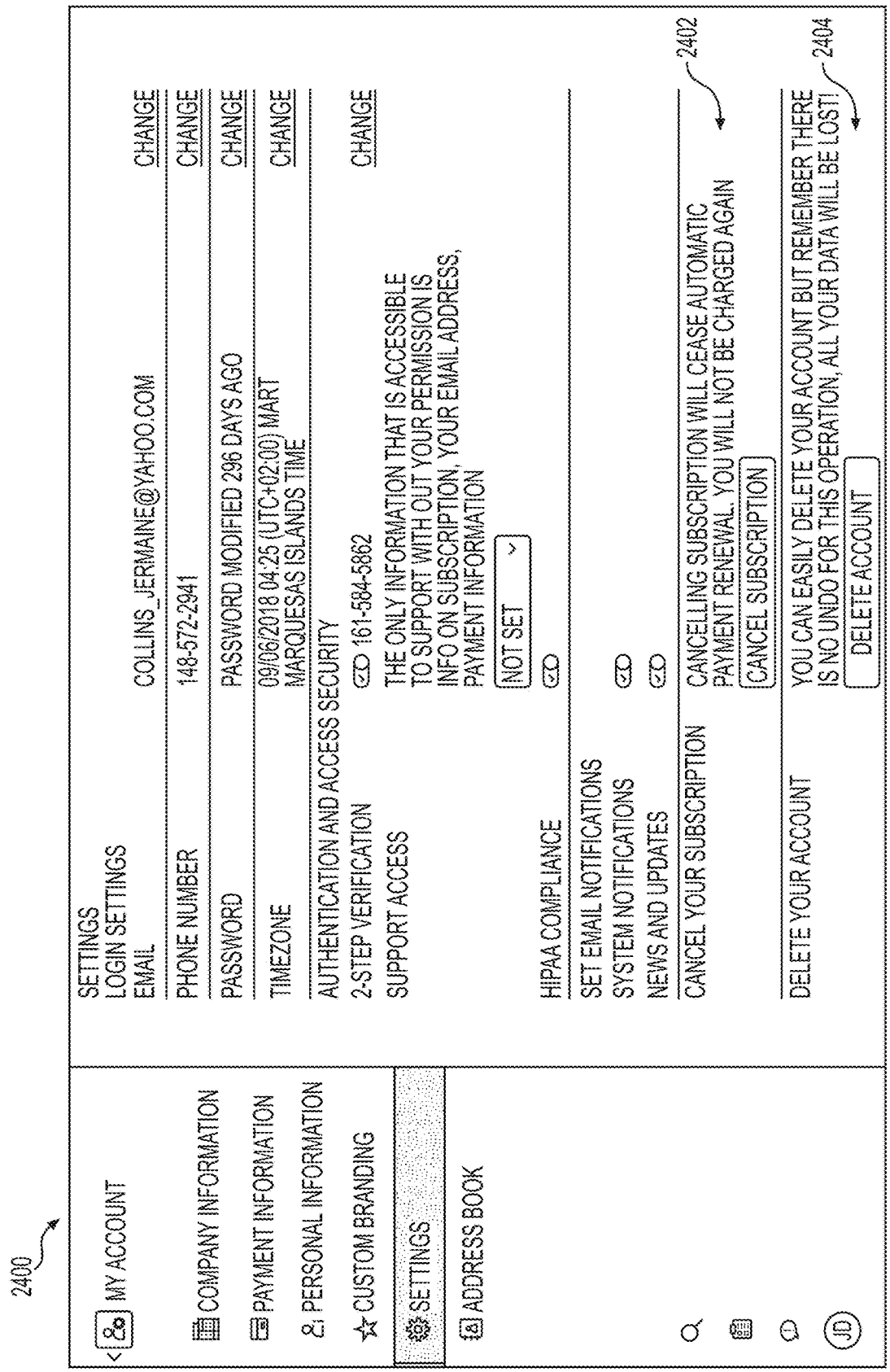

FIGS. 22-24 show example GUIs for updating a user's personal information and account settings within the system, according to some embodiments of the present disclosure. FIG. 22 shows an example GUI 2200 for a user to enter and update a user's profile and address information. FIG. 23 shows an example GUI 2300 that allows a user to customize and preview an email template (e.g., email template 2302) and edit a personal business card (e.g., personal business card 2304). FIG. 24 shows an example GUI 2400 that allows a user to edit and update user account settings, such as login settings, authentication and access security, etc. The GUI may include a selectable user interface object (e.g., user interface object 2402) for a user to cancel a subscription and a selectable user interface object (e.g., user interface object 2404) for that allows the user to delete the associated user account.

Figure 25:
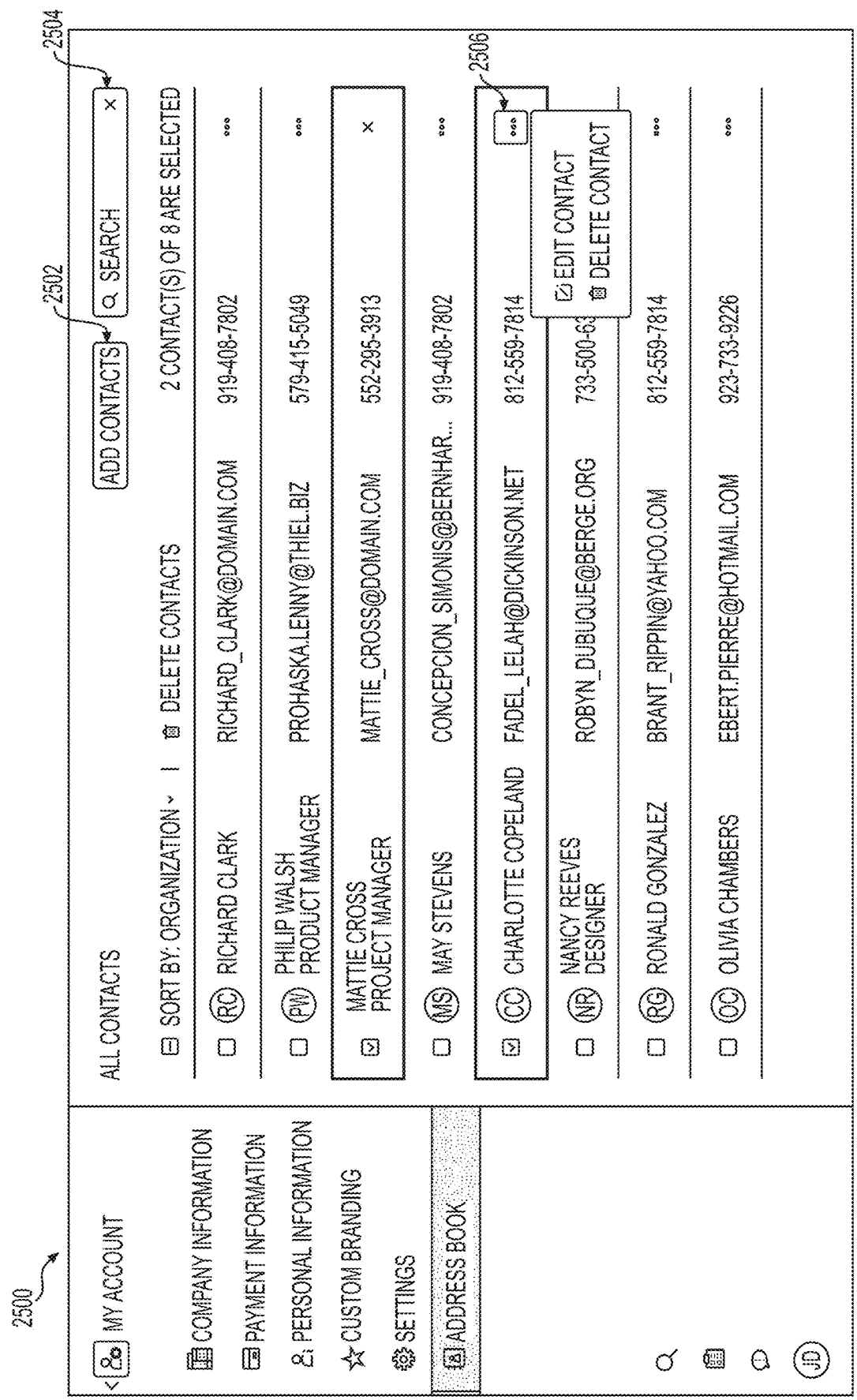
Figure 28:
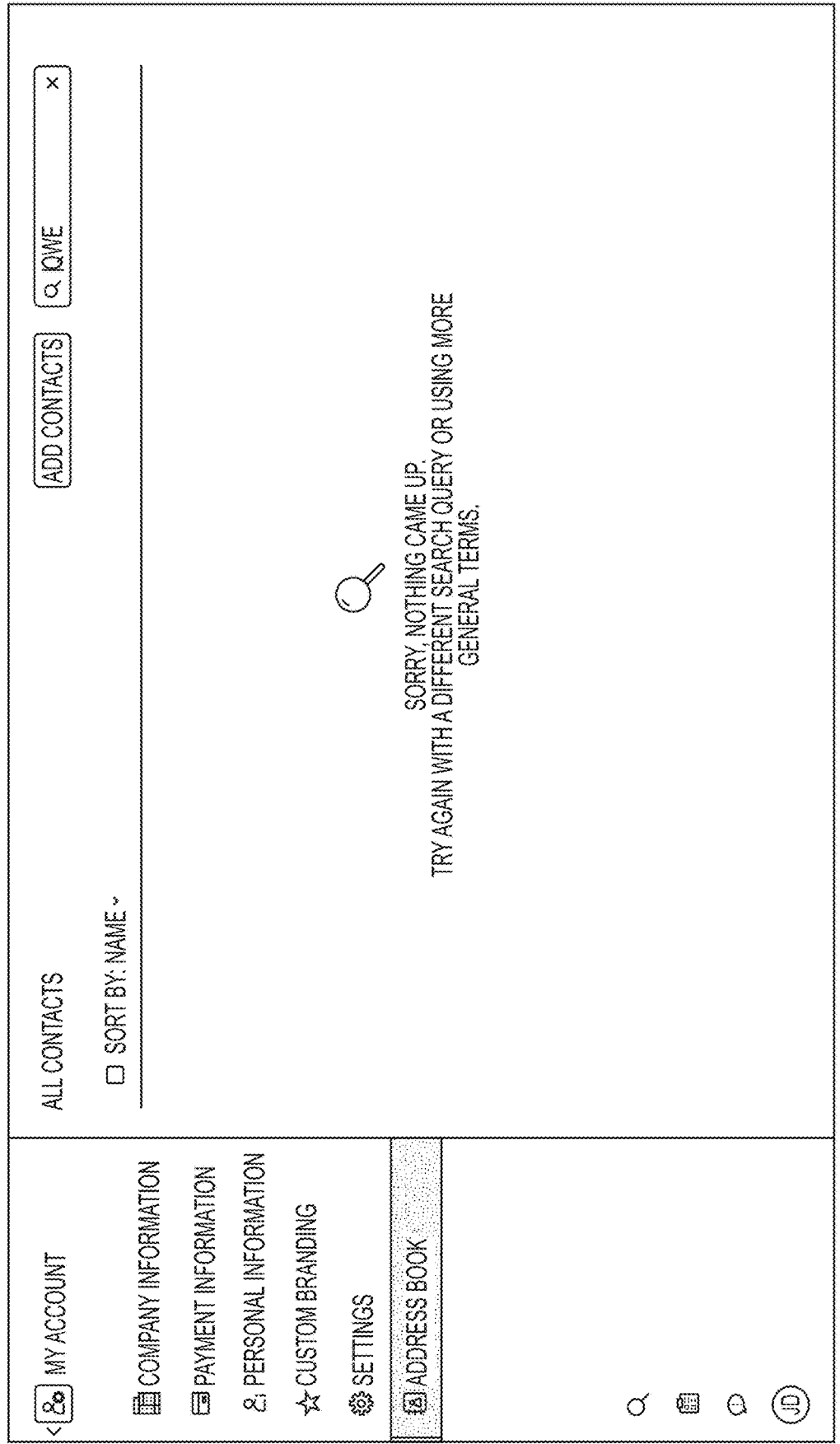

FIGS. 25-28 show example GUIs for managing a user's contacts within the system, according to some embodiments of the present disclosure. FIG. 25 shows an example GUI 2500 with a plurality of selectable user interface objects that allow a user to add contacts (e.g., user "Add contacts" button 2502), search for a contact (e.g., using contact search bar 2504), and edit/delete contacts (e.g., using "Edit contact" or "Delete contact" buttons 2506). FIG. 26 shows an example GUI 2600 that allows a user to create a new contact (e.g., using "Create" button 2602). FIG. 27 shows an example GUI 2700 that allows a user to save a created contact. FIG. 28 shows an example GUI 2900 that provides a user with a search bar for searching a contact.

FIGS. 29-39 show example GUIs that can be used by a user to create and/or distribute a workflow, according to some embodiments of the present disclosure. The GUIs shown in FIGS. 29-39 may be used, for example, within a workflow creator app, such as Slate Creator. As shown in example GUI 2900 in FIG. 29, a user can specify the workflow name (e.g., using text field 2902 ("Slate name")) and a workflow description (e.g., using text field 2904). The user can add one or more documents to the workflow. FIG. 30 shows an example GUI 3000 for adding a document to the workflow. Documents can be uploaded from the user's local device or imported from a cloud storage service. The set of documents added to a particular workflow may correspond to the workflow's template.

Figure 32:
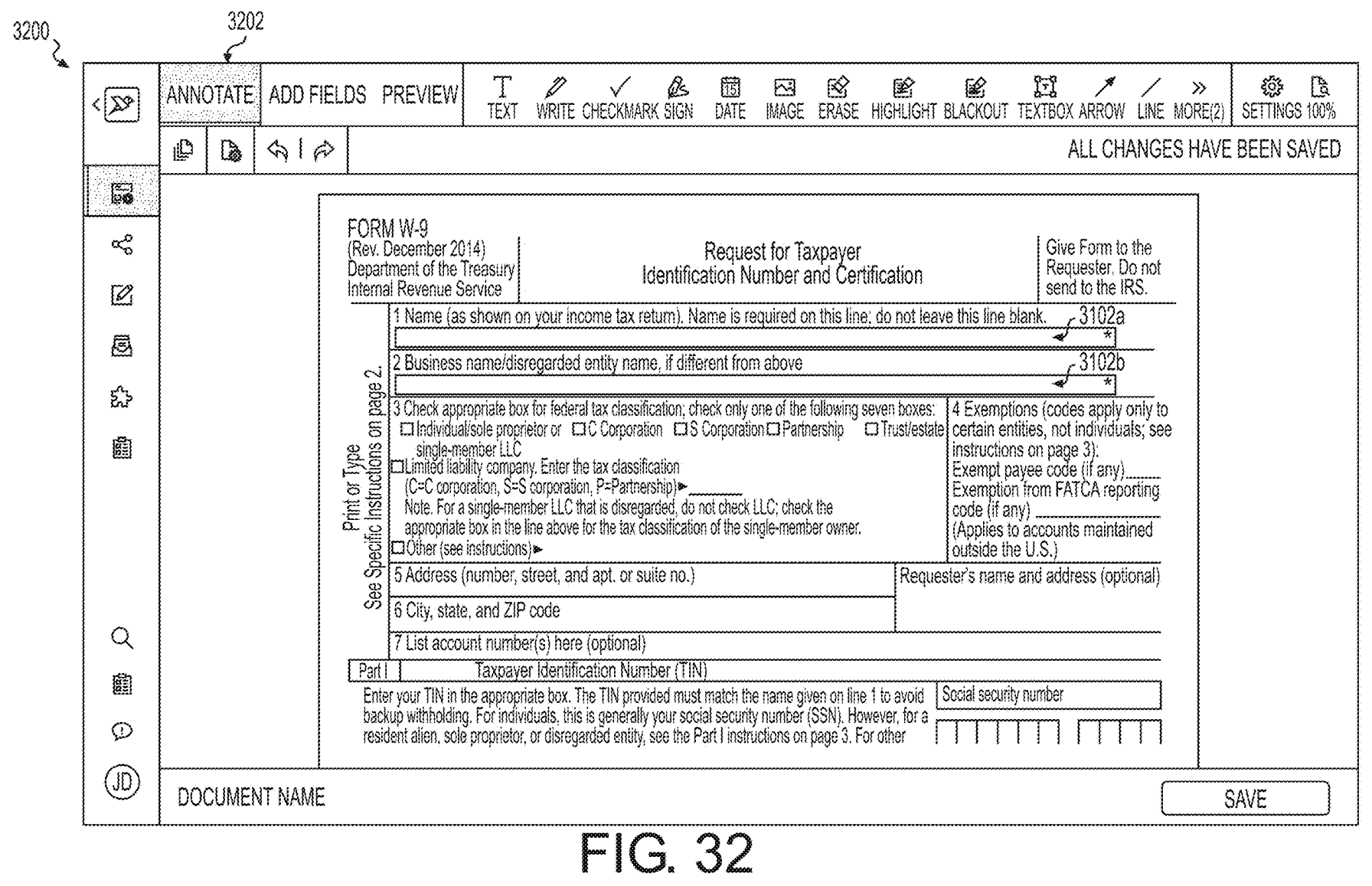
Figure 33:
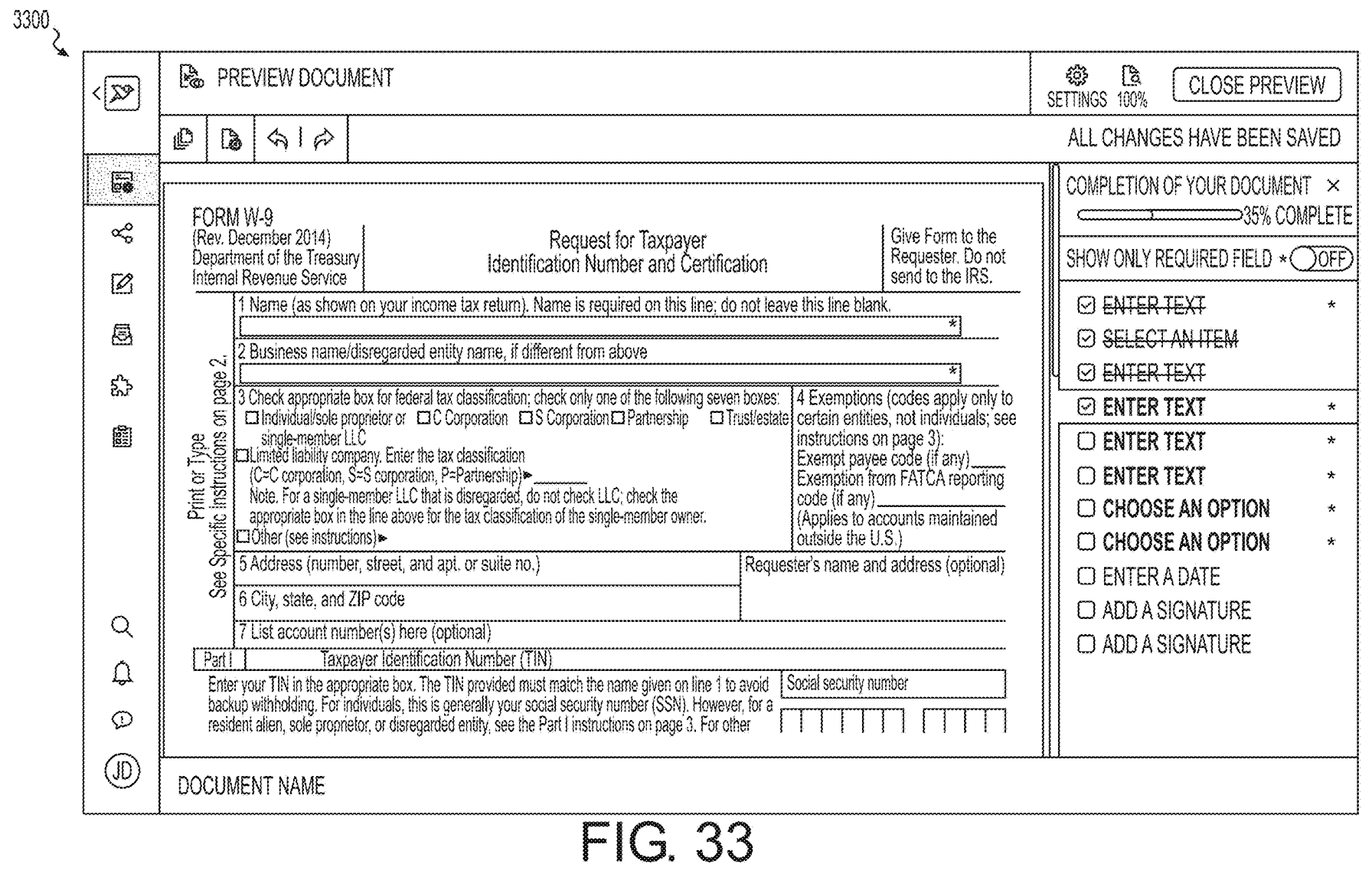

FIG. 31 shows an example GUI 3100 for defining fillable fields (e.g., fillable fields 3102*a*, 3102*b*) for a workflow document using the workflow creator app. The GUI may display one of the documents added to the workflow, and may provide various controls (e.g., controls 3104) for defining fillable fields within the document. The plurality of controls may allow for the addition of text, numbers, a checkbox, a signature, initials, date, images, dropdown menus, or formulas. The fillable fields (e.g., fillable fields 3102*a*, 3102*b*) in the documents may be marked as required fields (e.g., required fields 3106) and defined with a filled type of control. The GUI 3100 may include various selectable user interface objects (e.g., user interface objects 3104*a*, 3104*b*, 3104*c*) for editing, adding fillable fields, and/or previewing the document within the workflow creator app. FIG. 32 shows an example GUI 3200 that has defined two fillable fields (e.g., fillable fields 3102*a*, 3102*b* for the document shown in FIG. 31). FIG. 33 shows an example GUI 3300 for previewing a workflow that is being created. The GUI may display one of the workflow's documents overlaid with the associated fillable fields (e.g., fillable fields 3102*a*, 3102*b* for the document shown in FIG. 31).

FIGS. 34 and 35 illustrative example GUIs 3400 and 3500 that allow a user to complete a new workflow by iteratively defining fillable fields on each of the workflow's documents.

Figure 36:
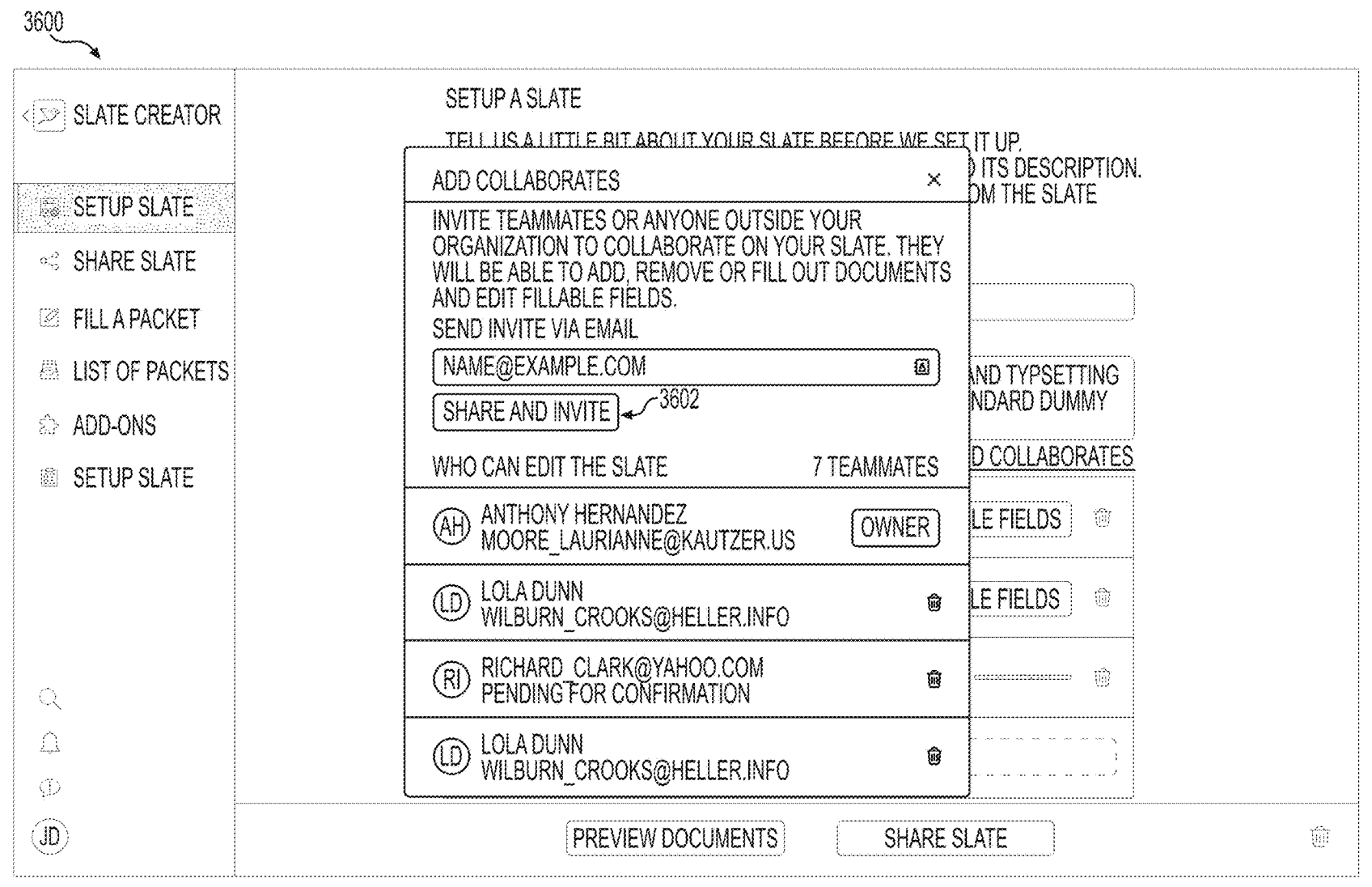

FIG. 36 shows an example GUI 3600 for adding collaborators to a workflow. Each collaborator may be permitted to modify the workflow, including adding/removing documents and editing fillable fields. The GUI may include a selectable user interface object (e.g., user interface object 3602) configured to share and invite the collaborators by sending an email to each of the collaborators.

Figure 38:
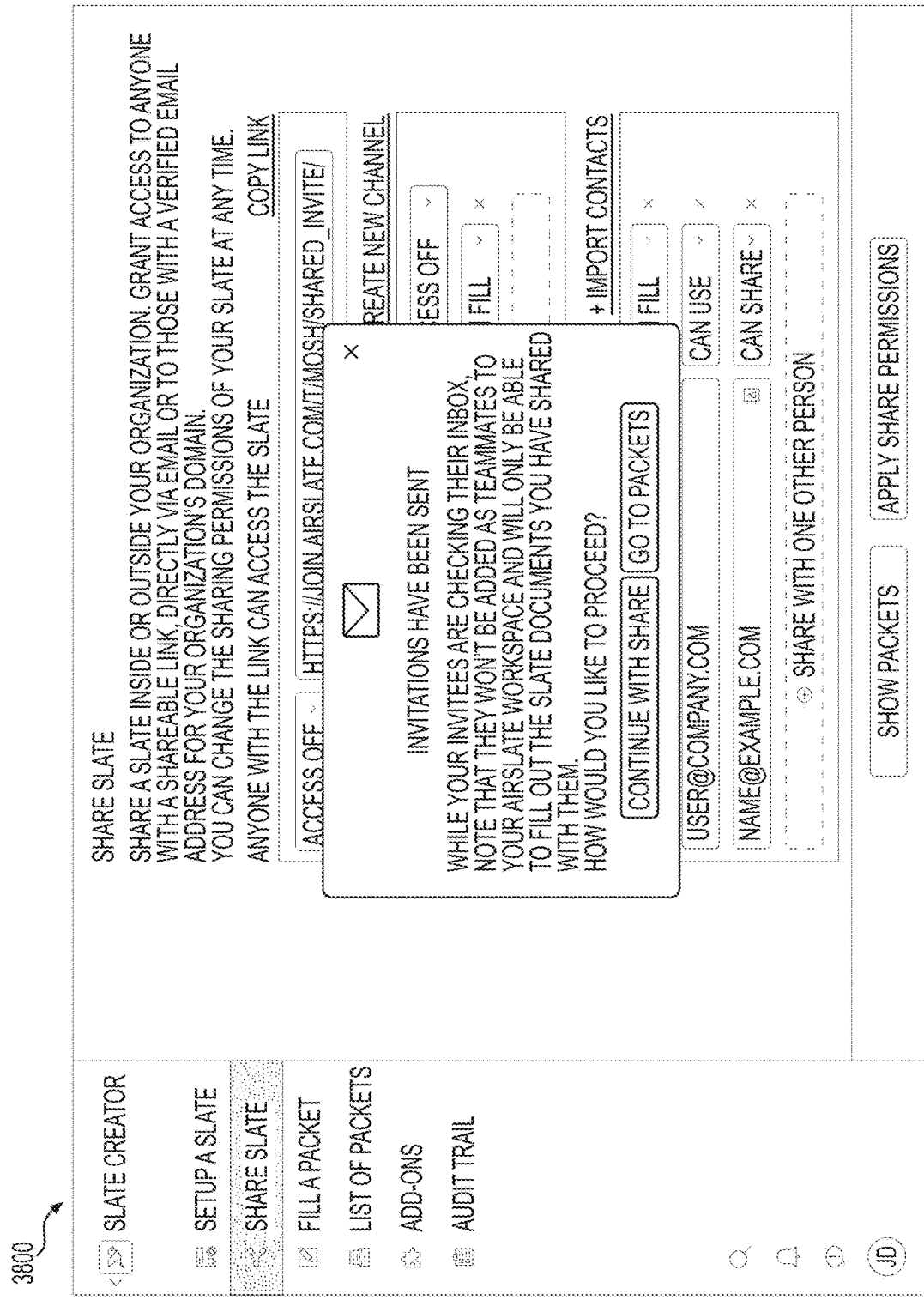
Figure 39:
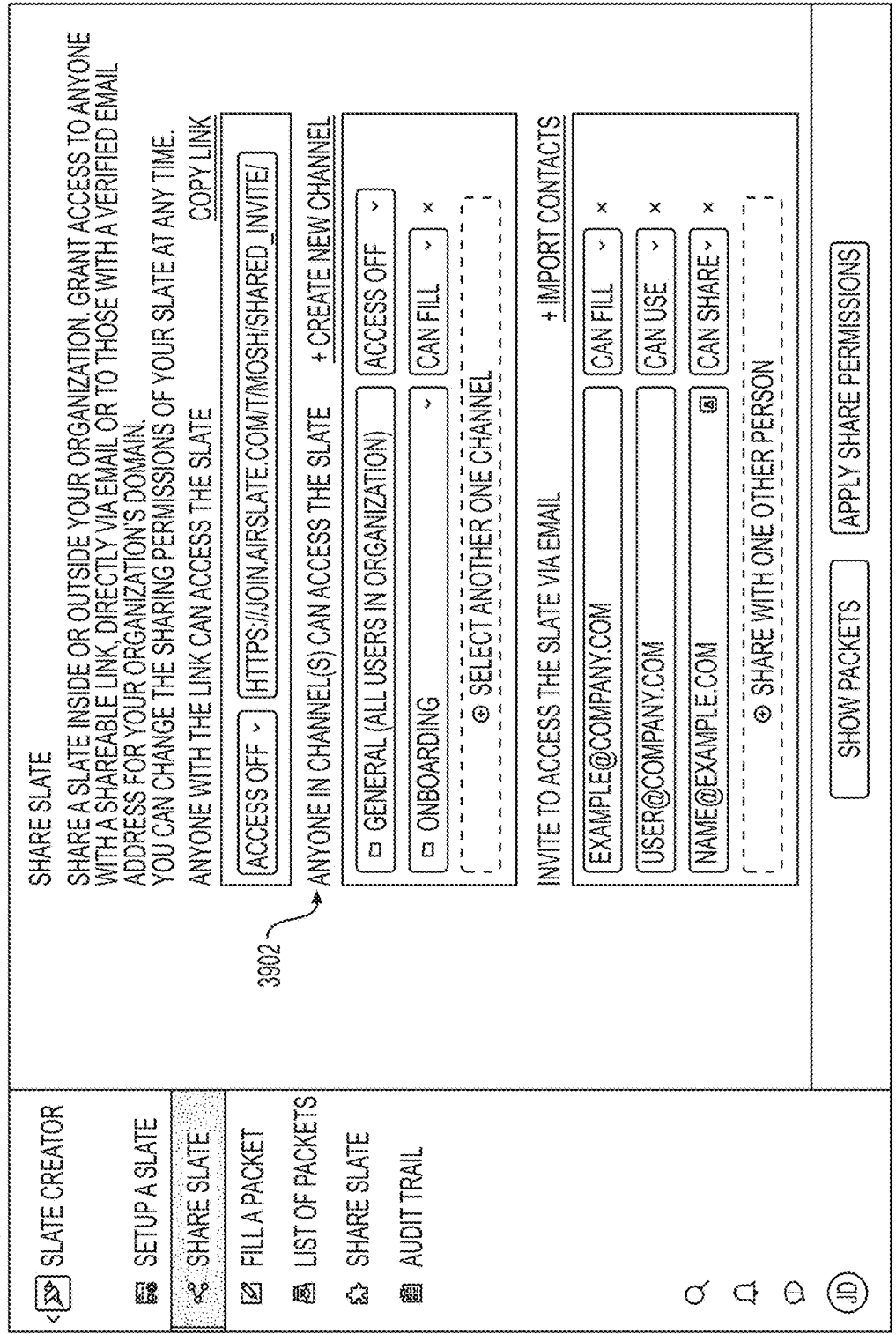

FIGS. 37-39 show example GUIs that allow a user to share and/or distribute workflows with users (or "recipients") inside and outside the current user's organization. As shown in FIGS. 37 and 39, the system may provide different methods for sharing workflows. For example, workflows may be shared to anyone inside or outside the organization by sharing a particular link (e.g., a URL) (e.g., link 3702) associated with the workflow, as shown in the example GUI of FIG. 37. In some embodiments, the link may be "secure" meaning that it cannot be easily guessed. A user can send the link to one or more recipients via email, text messages, etc. to provide access to the workflow. A recipient may be granted permission with an corresponding email address to fill out the workflow ("Can Fill"), permission to use the workflow ("Can Use"), and/or permission to share the workflow with others ("Can Share"). As another example, workflows may be shared to anyone having an email address that includes a verified domain (e.g., verified domain 3704) as shown in the example GUI in FIG. 37. FIG. 38 shows an example GUI 3800 indicating an invitation has been sent. The system may provide an option for the user to confirm the invitation or to go back to the previous GUI to reset the permission information or recheck the related documents.

As another example shown in example GUI 3900 of FIG. 39, an "onboarding" channel may be created for a group of new employees and respective department managers and hiring managers. Workflows may be shared with other users within a particular "channel" (e.g., channel 3902). As yet another example, workflows can be shared by email to recipients within the user's contacts. A workflow recipient may be granted a particular level of access to the workflow. Different workflow recipients may be granted a particular order of access to the workflow. In some embodiments, as shown in example GUI 3900 of FIG. 39, a recipient may be granted permission to fill out the workflow ("Can Fill"), permission to use the workflow ("Can Use"), and/or permission to share the workflow with others ("Can Share").

Figure 40:
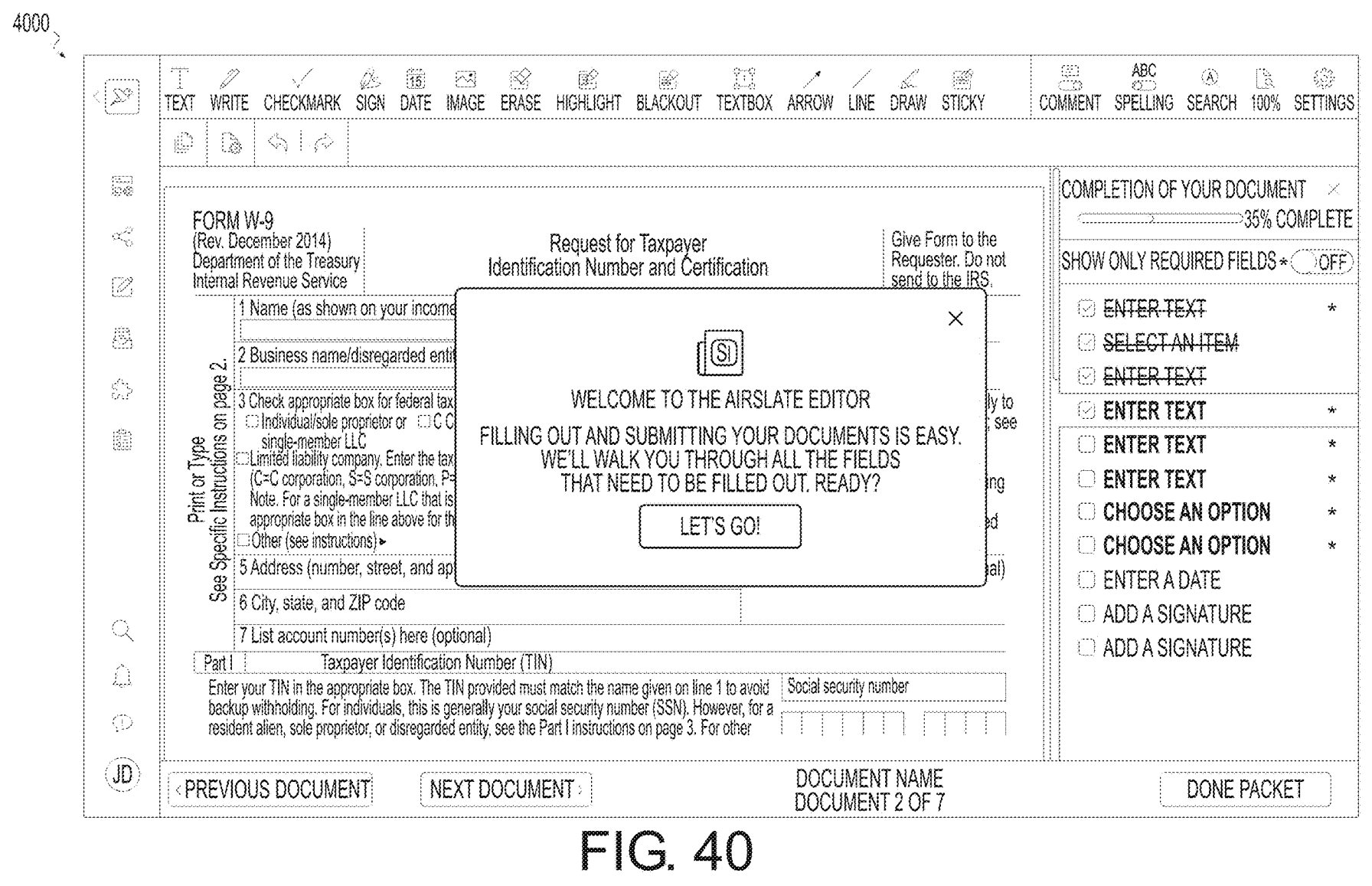
Figure 41:
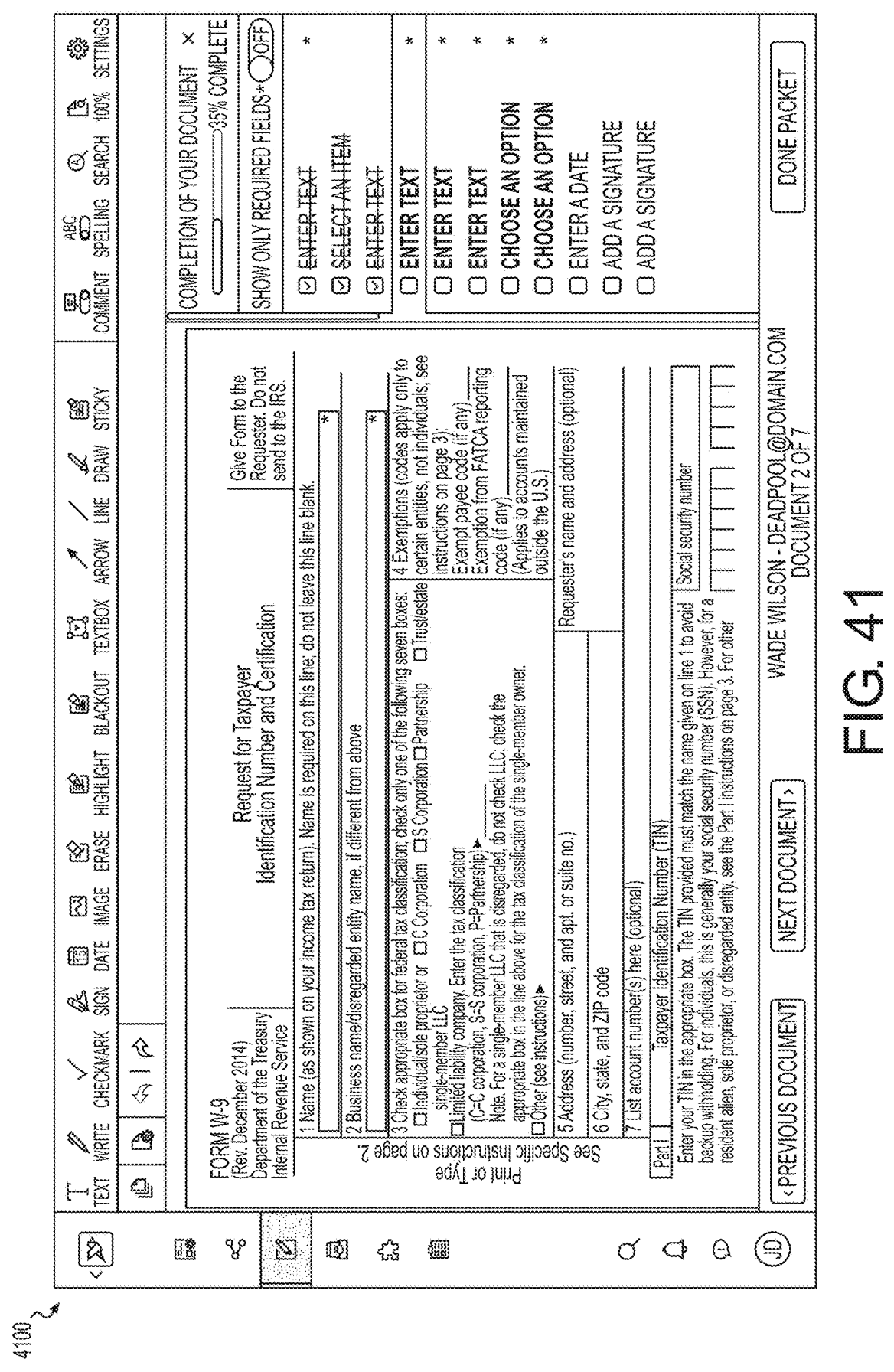

FIGS. 40 and 41 show example GUIs 4000 and 4100 that allow a user to fill out a workflow document with an editor app, such as an airSlate editor, according to embodiments of the present disclosure.

Figure 42:
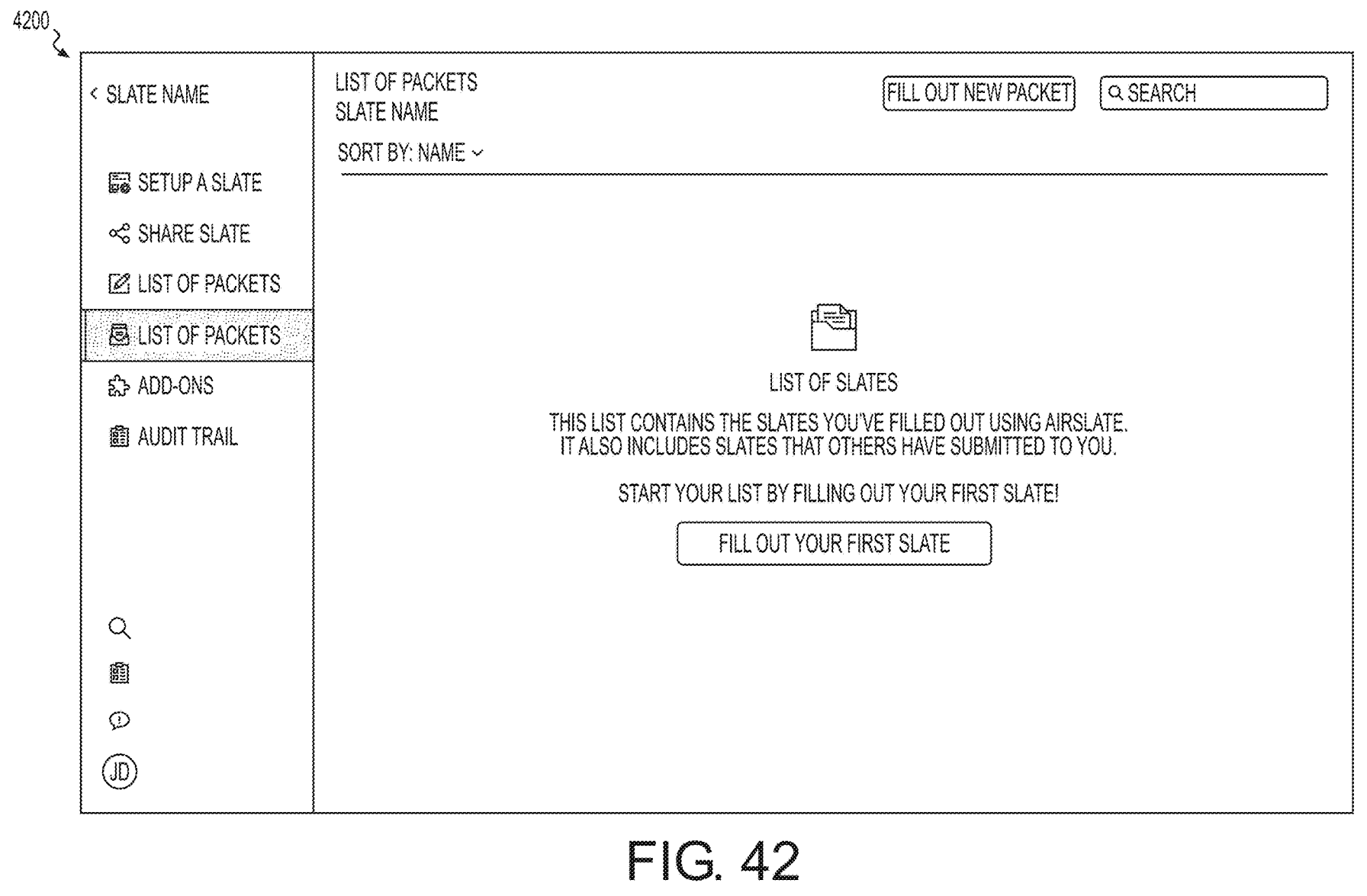
Figure 43:
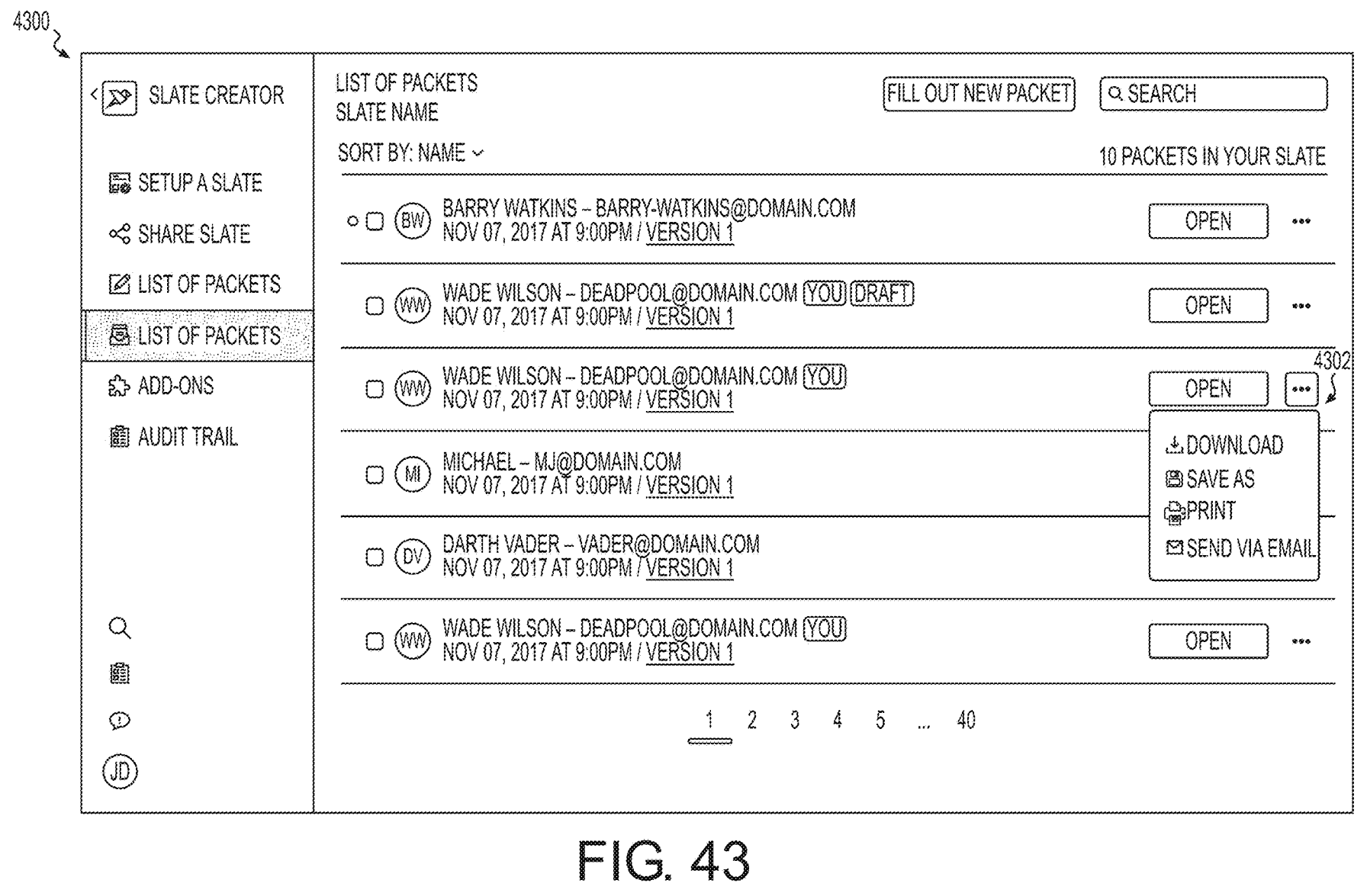
Figure 44:
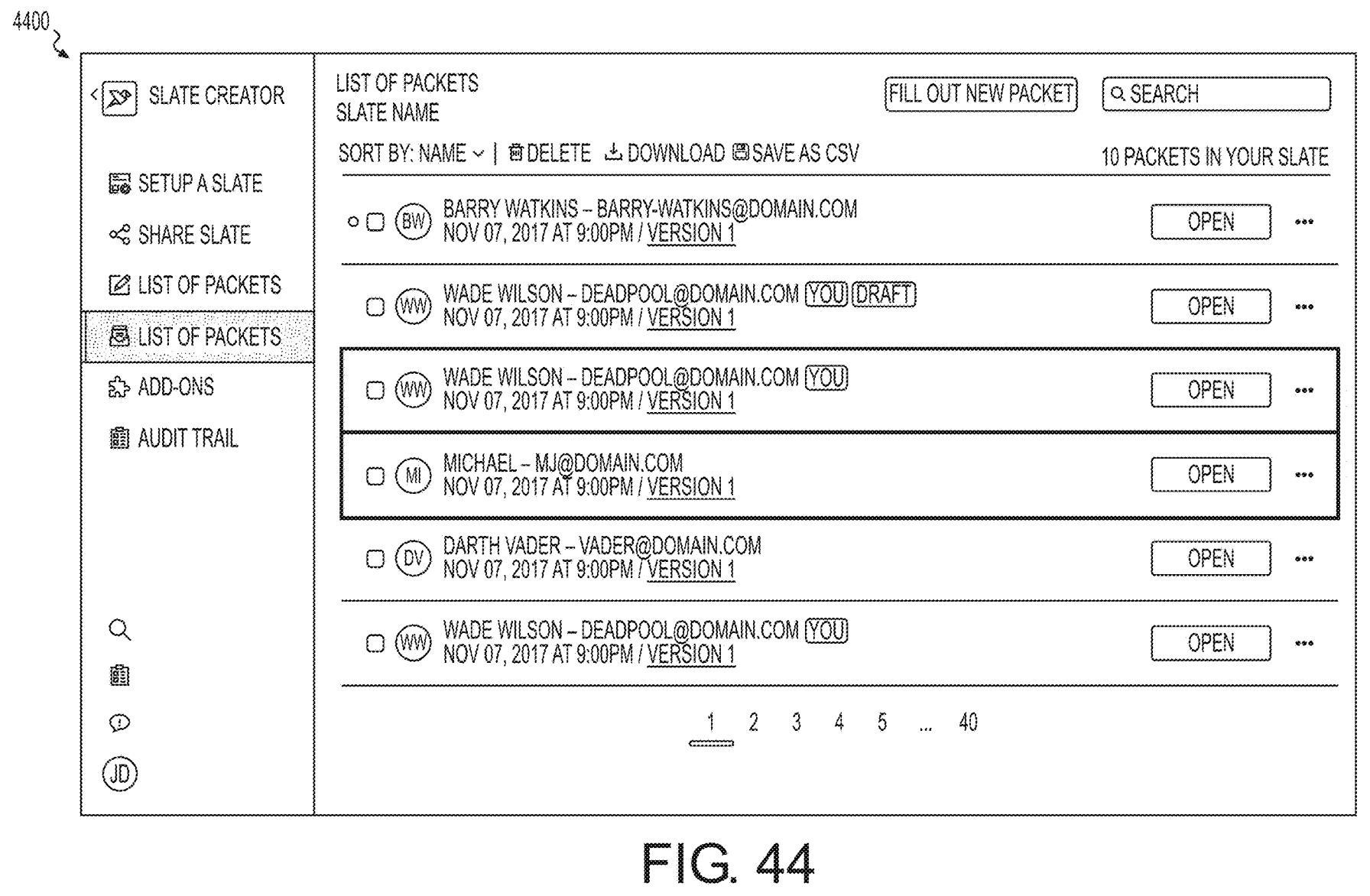
Figure 45:
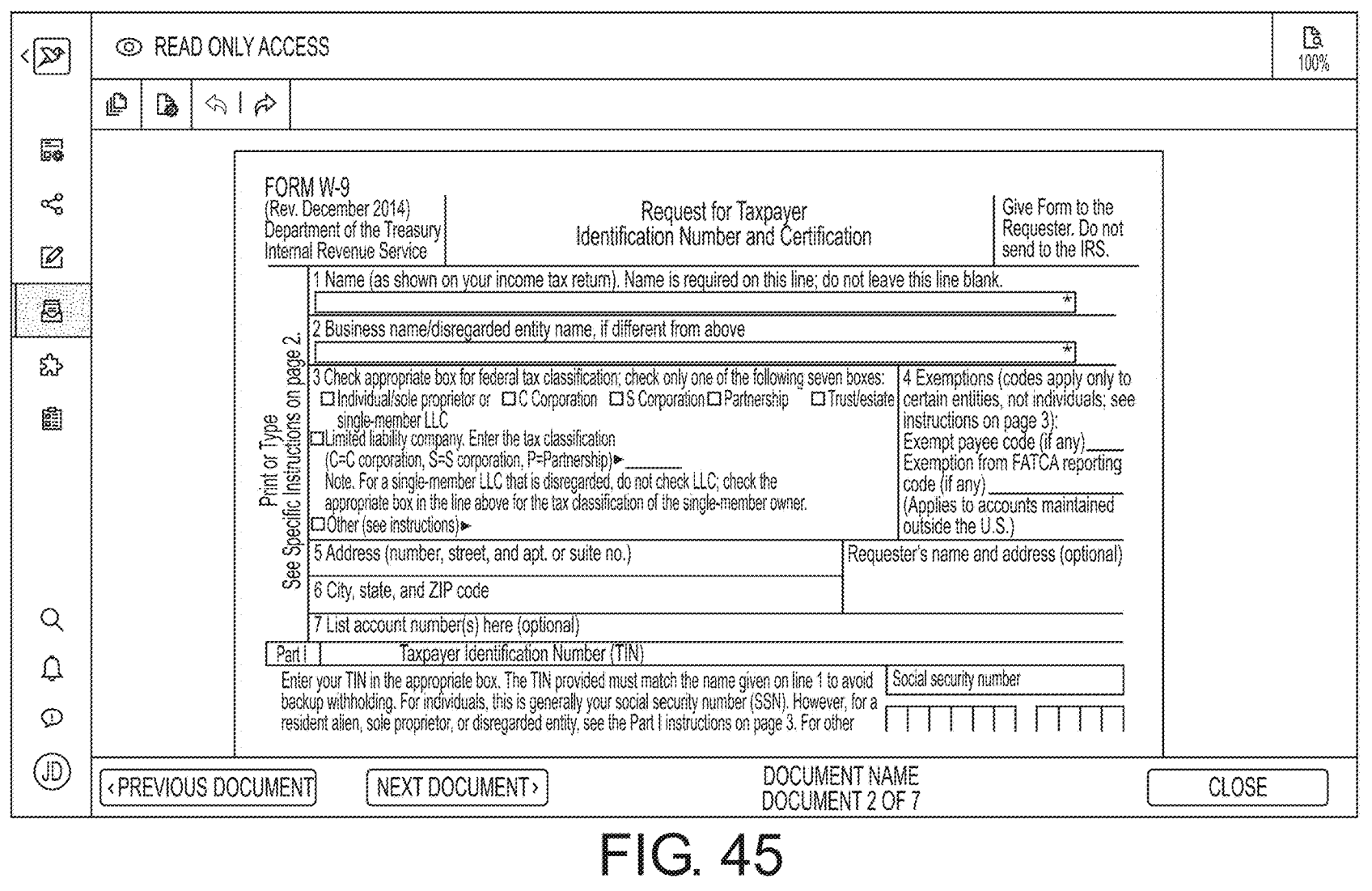
Figure 46:
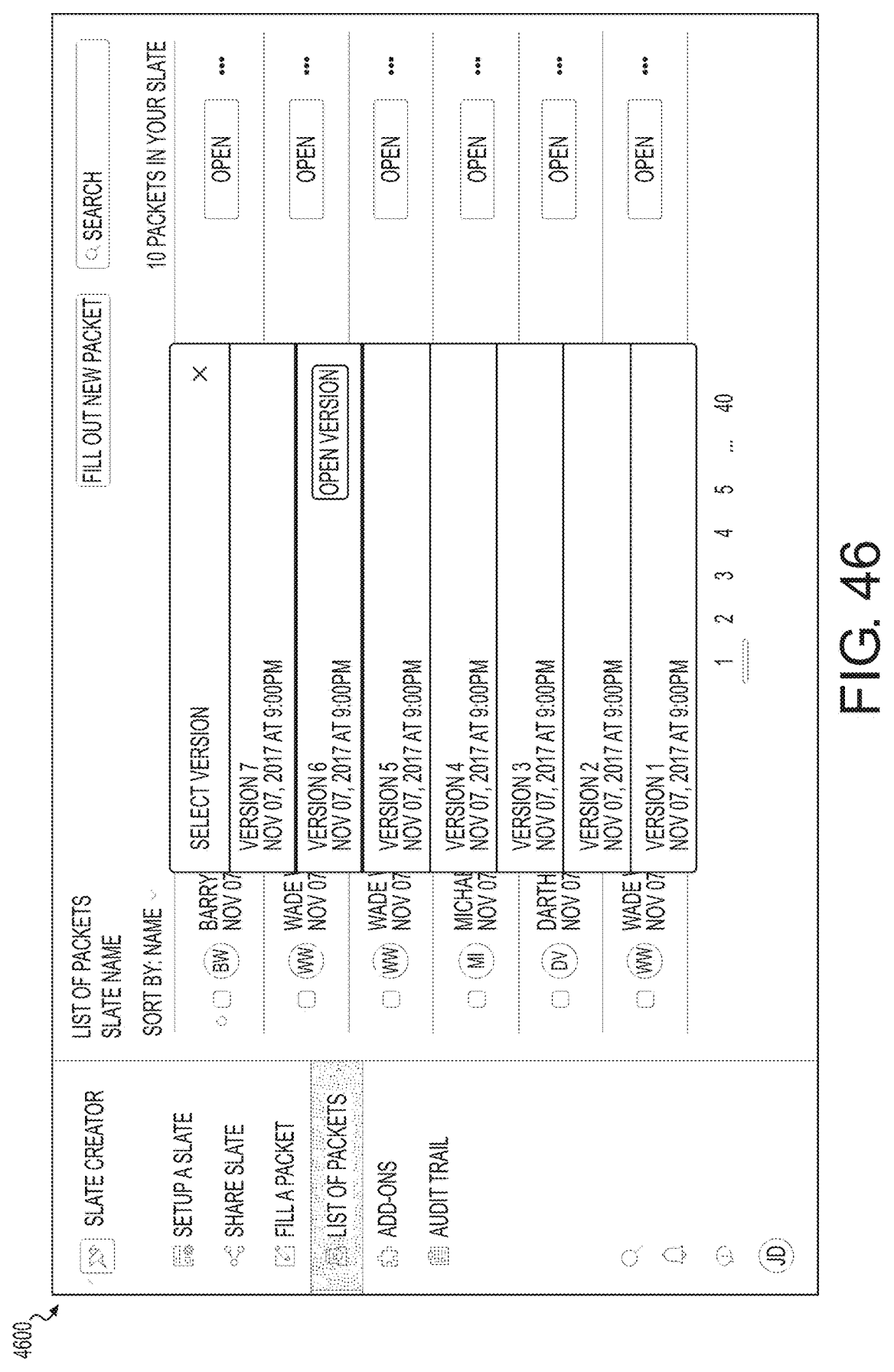

FIGS. 42-46 show example GUIs 4200, 4300, 4400, 4500, 4600 that may allow a user to view workflow data for (a) workflows that the current user has filled out or (b) workflows that the current user created which have been filled out by others. The filled-out workflows may be referred to as "packets" in the figures. As shown in example GUI 4300 of FIG. 43, the system may allow a user to download, save, print, and/or email filled-out workflows via a drop down list (e.g., drop down list 4302) associated with respective packet. In some embodiments, the system may allow packets to be exported in various file formats, such as PDF, DOCX, or JPEG. As shown in FIGS. 43 and 44, the GUIs may indicate which packets are not completely filled-out, for example using the label "Draft." As shown in example GUI 4500 of FIG. 45, the user may view filled-out workflows in read-only mode. As shown in example GUI 4600 of FIG. 46, the system may include a versioning feature for workflows and/or packets. The GUIs can be customized depending on user and workflow permissions.

Figure 48:
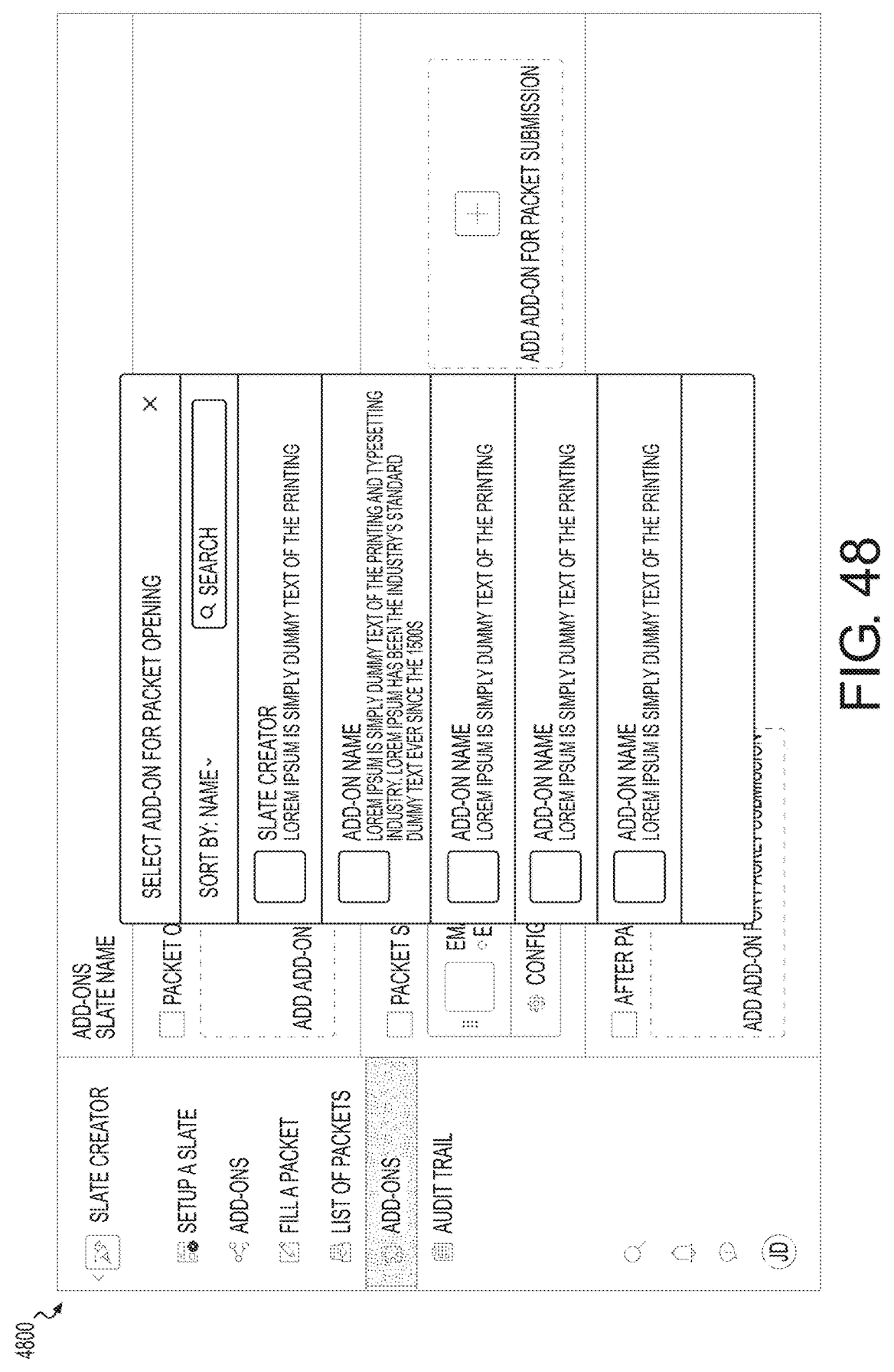
Figure 49:
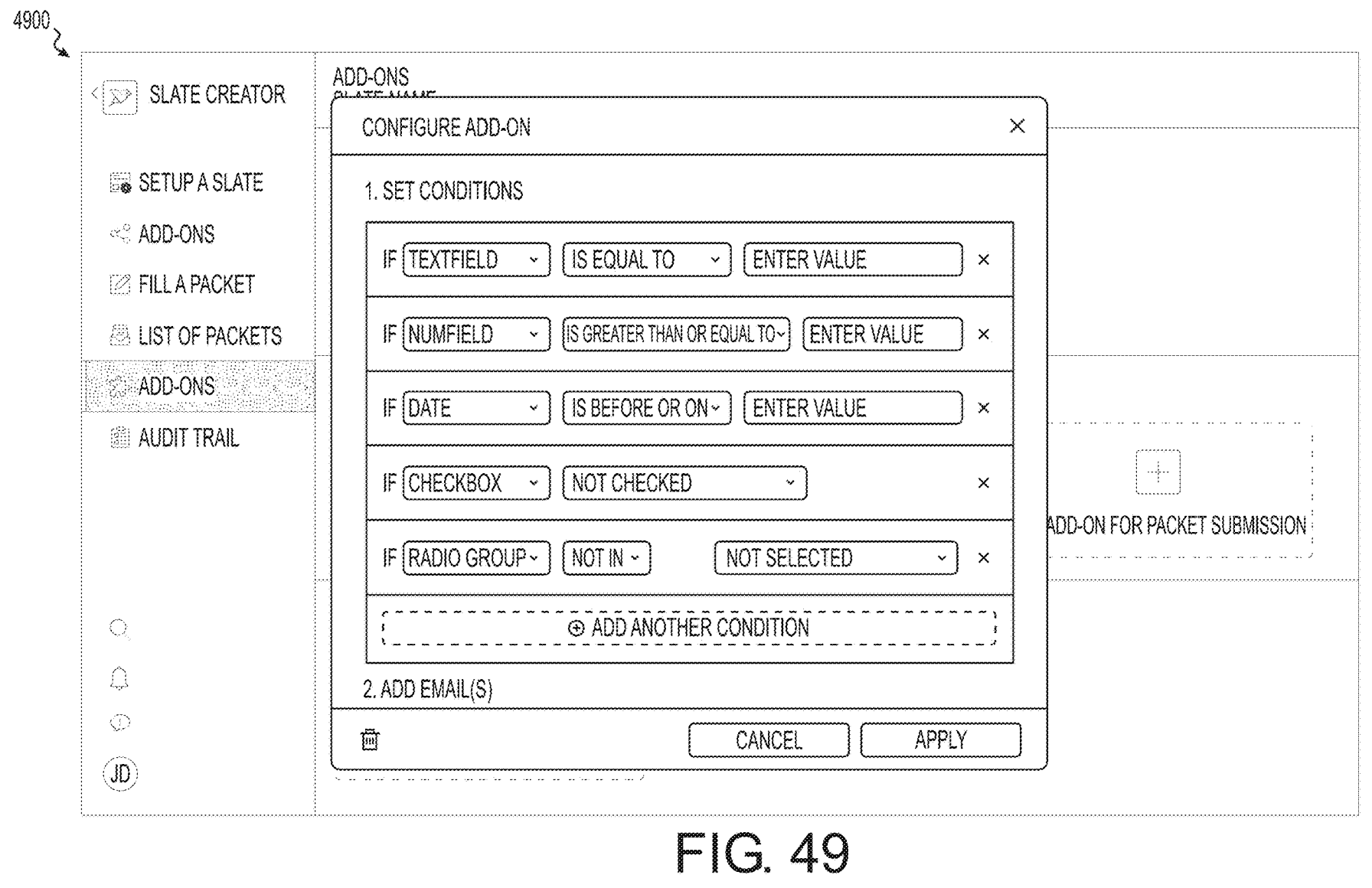

FIGS. 47-52 show example GUIs for configuring add-ons for a workflow, according to embodiments of the present disclosure. As shown in example GUI 4700 of FIG. 47, a user may define add-ons at various points in a workflow lifecycle, including for example (a) when the packet is opened, (b) while the packet is being filled out, and (c) after the packet is submitted (e.g., after a user enters data for all the required fields and clicks a submit button). As shown in example GUI 4800 of FIG. 48, the user can select from a plurality of add-ons implemented within the system. As shown in example GUIs 4900, 5000, 5100 of FIGS. 49-51, add-ons can be triggered based on conditions associated with specific form values entered by the person filling out the form. Thus, as shown in the example illustrated in GUI 5100 of FIG. 51, a particular add-on can be triggered (or not triggered) depending on which value (e.g., state) is selected from a drop down list (e.g., drop down list 5102). As shown in example GUI 5200 of FIG. 52, for example, if a particular text field in the corresponding workflow document meets a satisfied value, the system may be enabled to connect to a cloud storage such as Dropbox over a network 110.

Figure 53:
Figure 54:
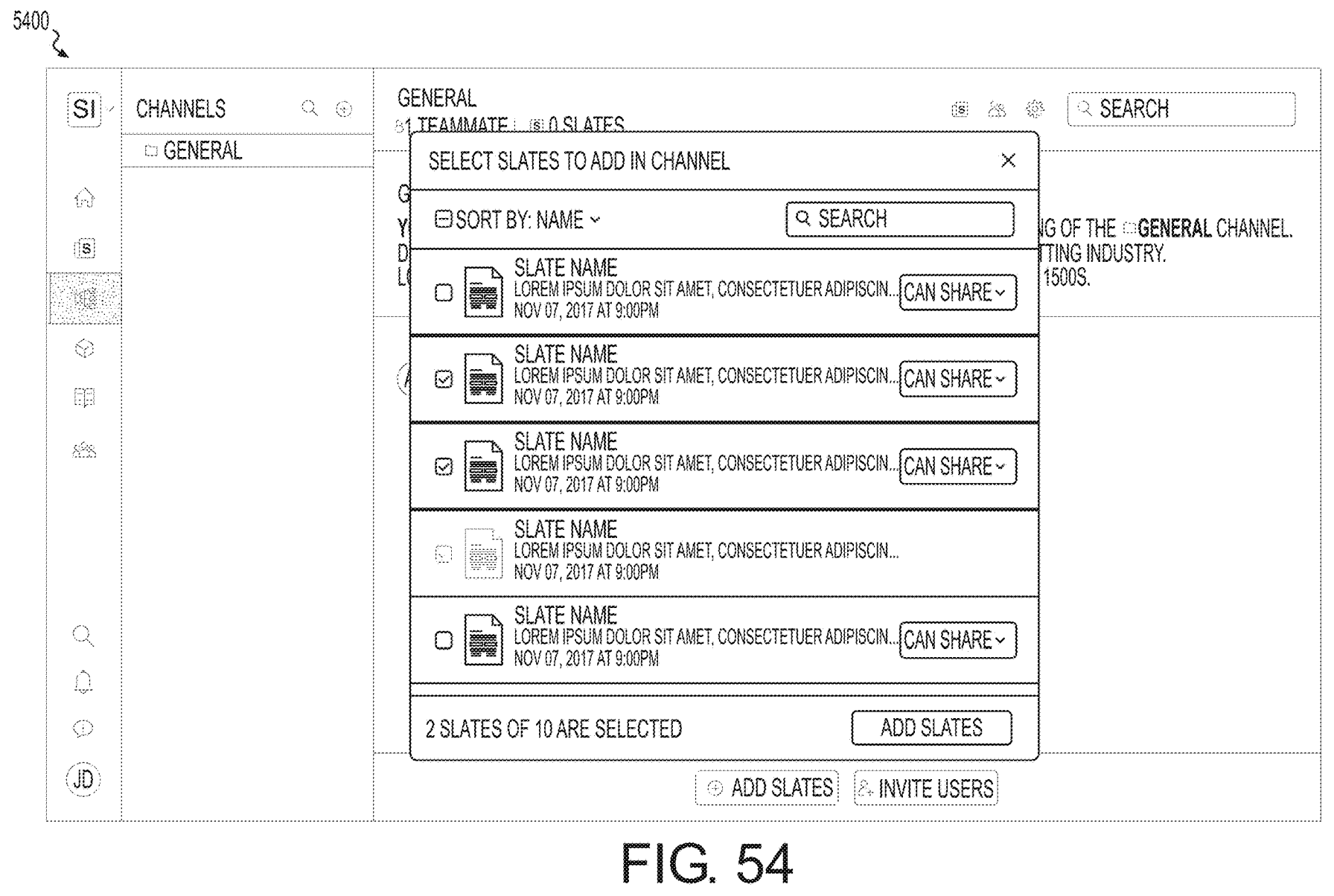
Figure 56:
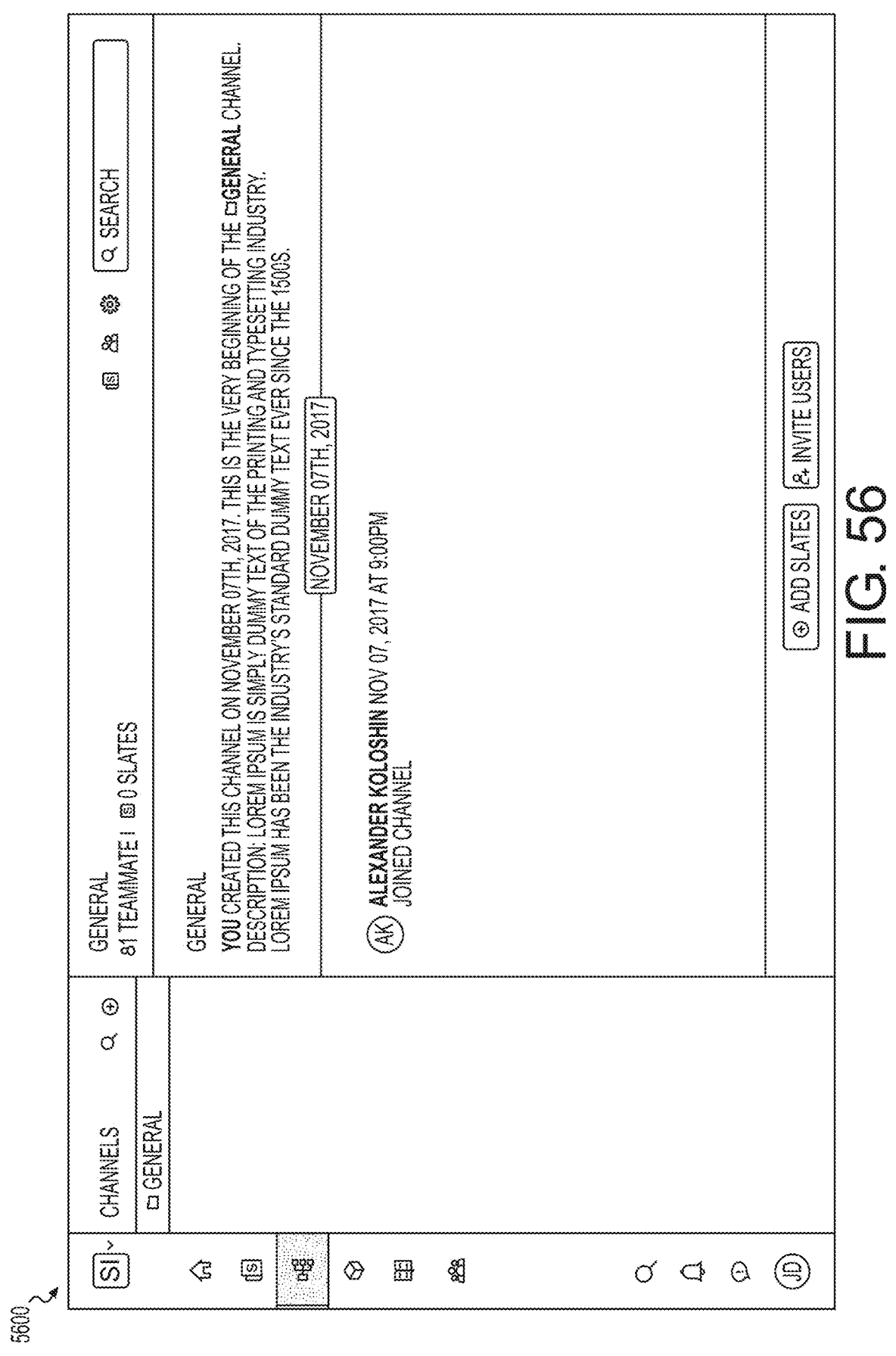
Figure 57:
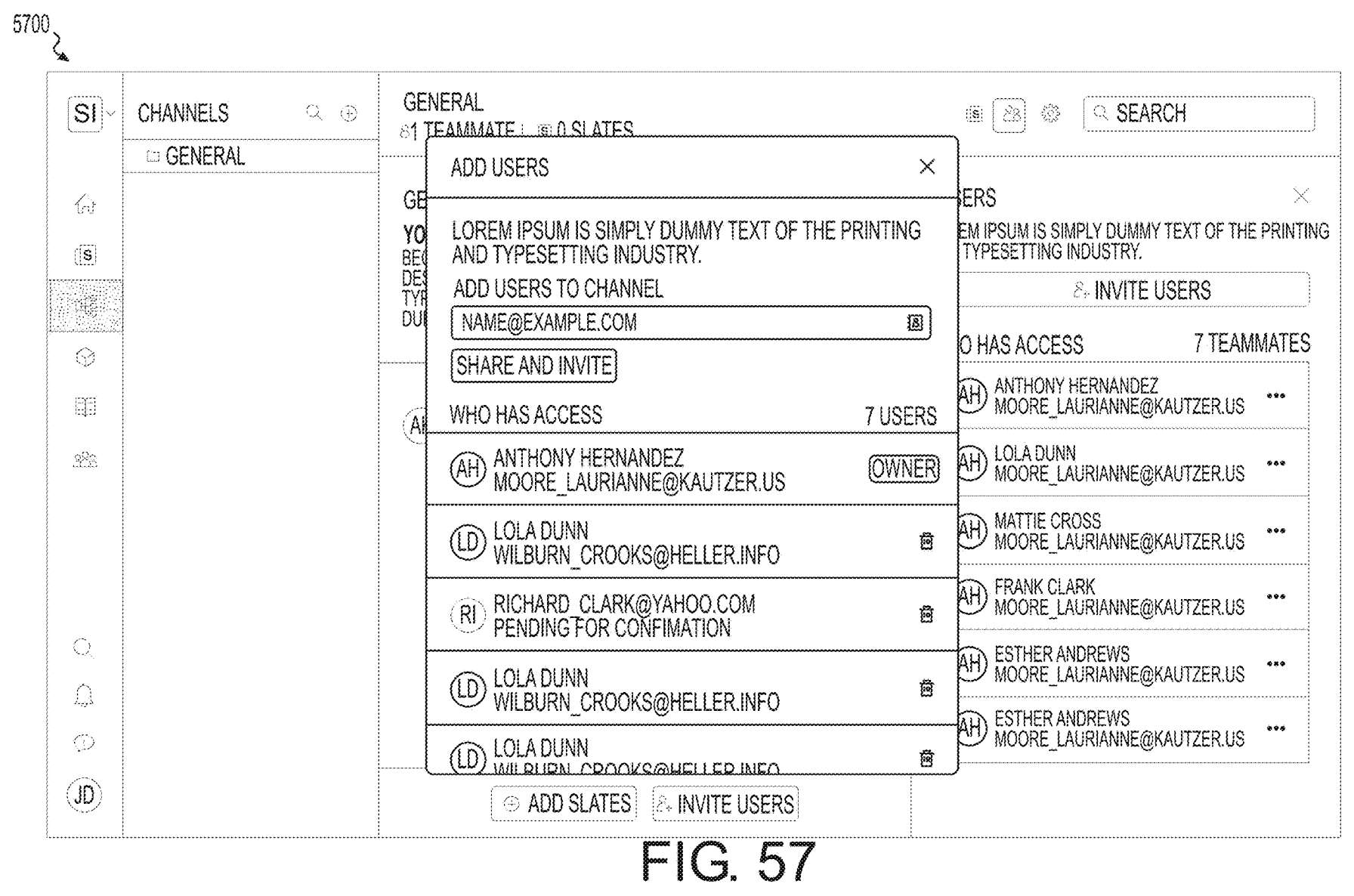
Figure 58:
Figure 59:

FIGS. 53-58 show example GUIs configured for managing channels and access to channels, according to embodiments of the present disclosure. FIG. 53 shows an example GUI 5300 configured for creating a new public channel including defining a channel name, providing associated channel description, adding teammates to the channel, and/or adding one or more workflows to the channel. As illustrated in example GUI 5400 of FIG. 54, after the channel is created and saved in the system, the system may enable a user to select and add one or more created workflows to the channel. FIG. 55 shows an example GUI 5500 configured for creating a new private channel including defining a channel name, providing associated channel description, adding teammates with teammates' emails to the channel, and/or adding one or more workflows to the channel. The system may allow each workflow to be filled or automatically shared with one or more teammates in the same channel. FIG. 56 shows an example GUI 5600 with a general description of the channel and the teammates joined in the channel. FIG. 57 shows an example GUI 5700 that allows a user to add teammates by sending an email invitation to the teammates inviting the teammates to join the channel. The GUI can be configured to display a list of teammates and the corresponding invitation confirmation status. A pending confirmation status associated with a teammate may be highlighted in the list. A user may send a request for an access to a workflow and waiting for a response. FIGS. 58-59 show example GUIs 5800, 5900 configured to verify a user's permission to a particular workflow via the workflow application.

The described automatic workflow application (e.g., airSlate in FIG. 4) executed on a workflow server may be used to perform various automated actions for automating electronic document workflows, such as generating pre-filled documents, sharing and distributing the workflow, sending notifications and reminders, archiving the filled and signed documents, etc.

Figure 47:
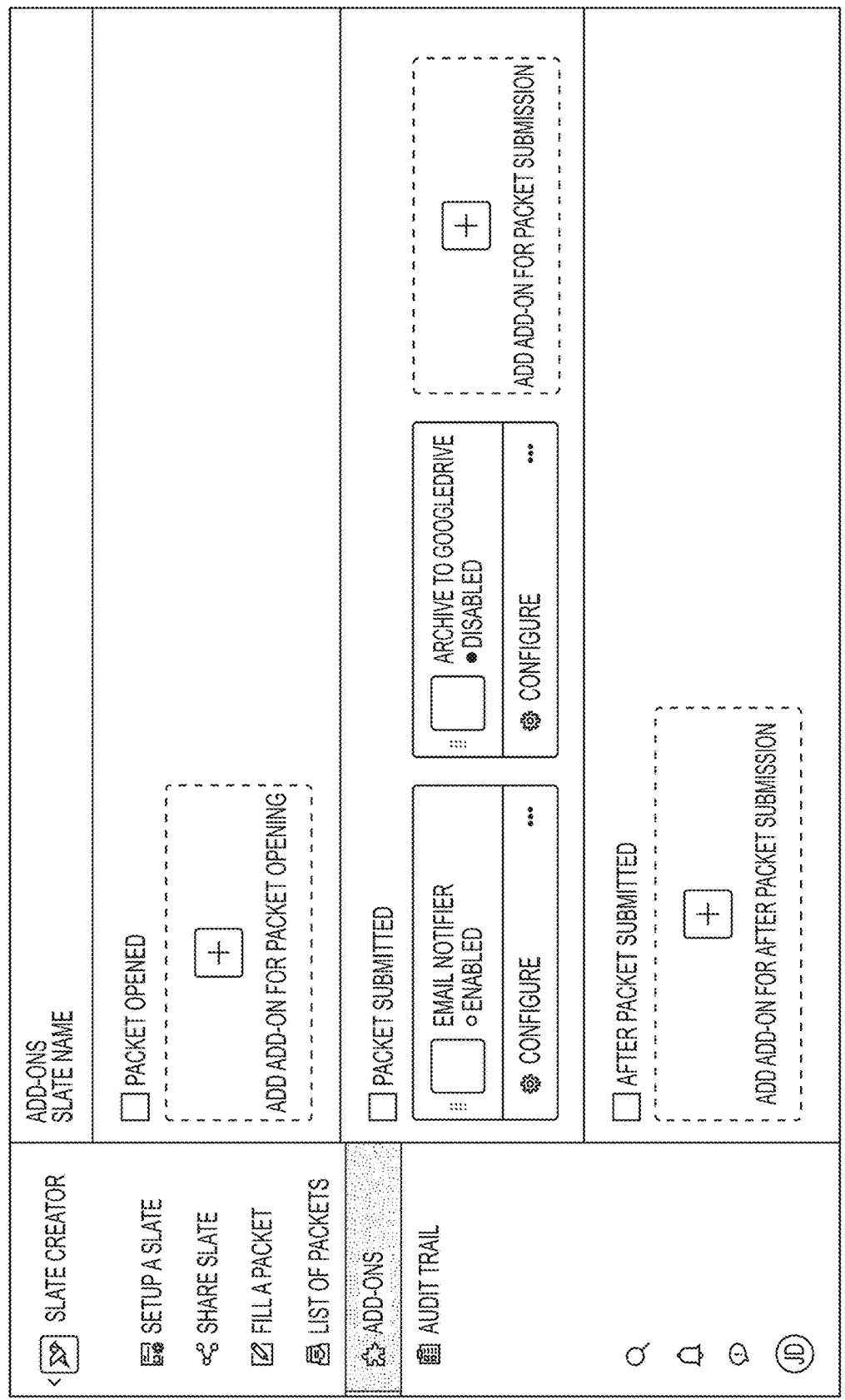
Figure 51:
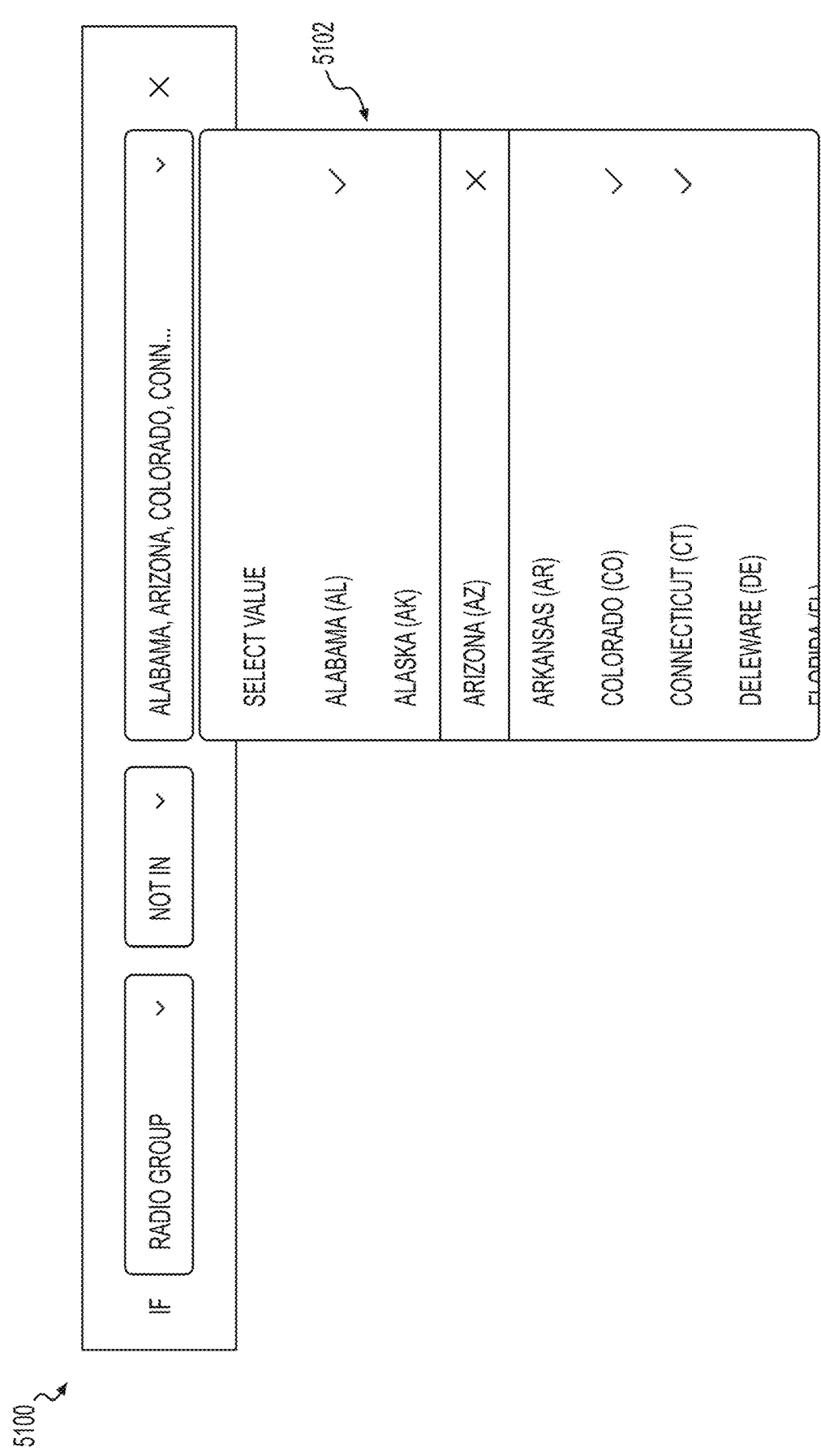
Figure 52:
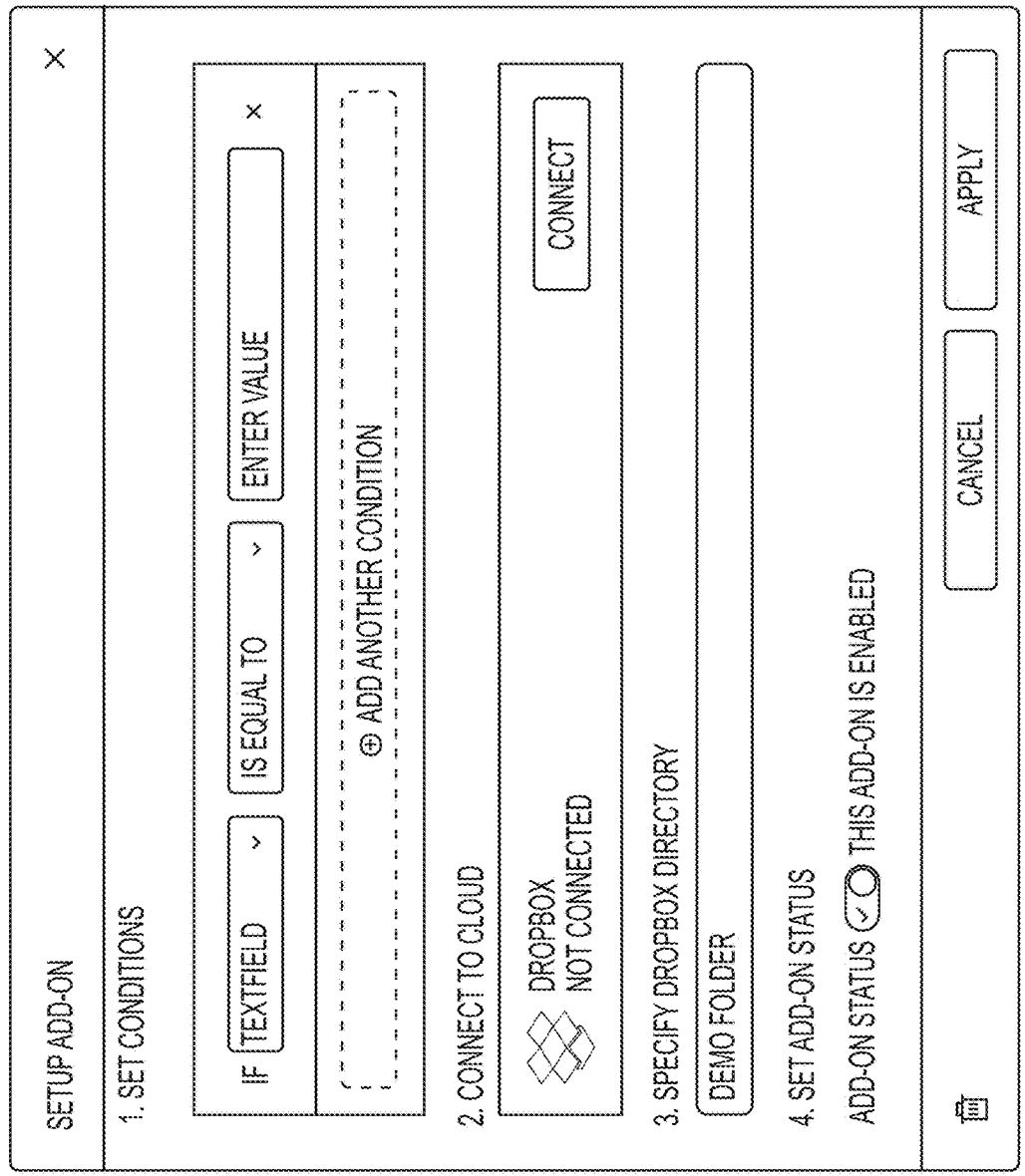
Figure 60:
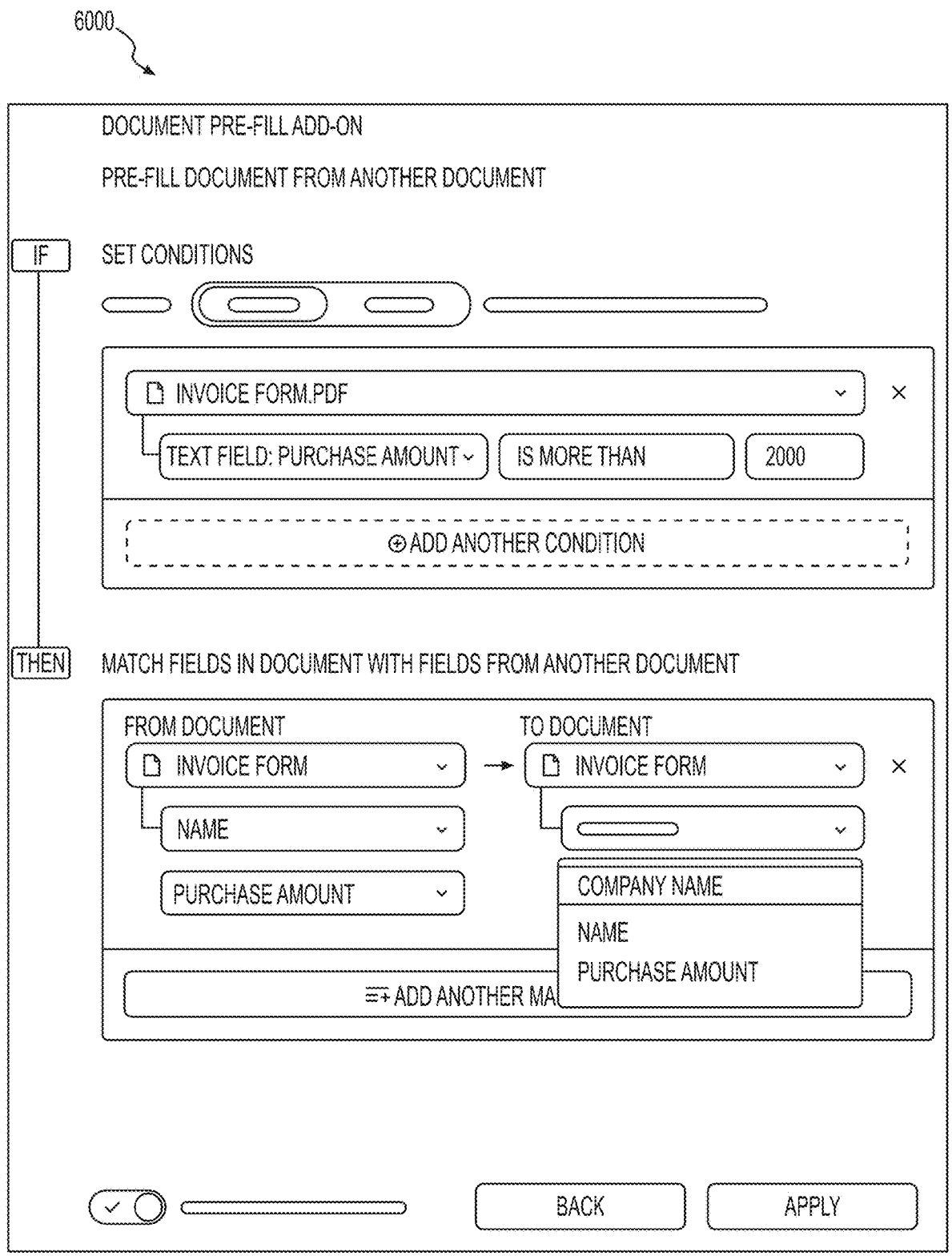

In some embodiments, as shown in example GUI 4700 of FIG. 47, an online editing application such as Slate Creator 402a may collect data to pre-fill and automate workflow documents by utilizing a plurality of add-ons implemented within the workflow server 102. FIG. 60 shows an example GUI 6000 configured to pre-fill a document from another document by utilizing a document pre-fill add-on with the editing application. A user may select conditions (e.g., values) for a document and set fields in the document to be filled with the corresponding fields from another document. If both fields match with each other, the one document can be pre-filled with data entered in another document.

Figure 63:

In some embodiments, the workflow server may be configured to execute the online editing application to automate two-way data exports between a document slate (workflow document) and a cloud storage spreadsheet, such as a Google spreadsheet. For example, the workflow server may be configured to generate a document pre-filled with spreadsheet data. FIG. 61 shows an example GUI 6100 configured to connect a user's cloud storage account (e.g., a Google account) for prefilling workflow document data from a cloud storage spreadsheet. As illustrated in example GUI 6200 of FIG. 62, the workflow server may be configured to generate a document pre-filled with spreadsheet data by setting up mapping conditions or values for pulling spreadsheet data into a workflow template and generating a document. The workflow server may be configured to: 1) set a condition for pulling spreadsheet data into the workflow template and generate a document; 2) connect the user's cloud storage account to find a spreadsheet and choose a sheet to pull data from; 3) locate and match the document's field data with rows in a selected spreadsheet column; and/or 4) connect the document's fields with the spreadsheet columns. After the match is made, information of the connected document fields may be filled with data of the spreadsheet columns that correspond with the row of the match as shown in example GUI 6300 of FIG. 63 (e.g., row values from a spreadsheet). The conditions can be a date, specific filled information, a recipient's name or a document Slate revision. The conditions can be configured by selecting fillable fields such as "All fillable fields," "Signature Field," "Text Field." When some changes are made to the same spreadsheet, a new corresponding document slate revision can be generated based on the changes.

Figure 64:
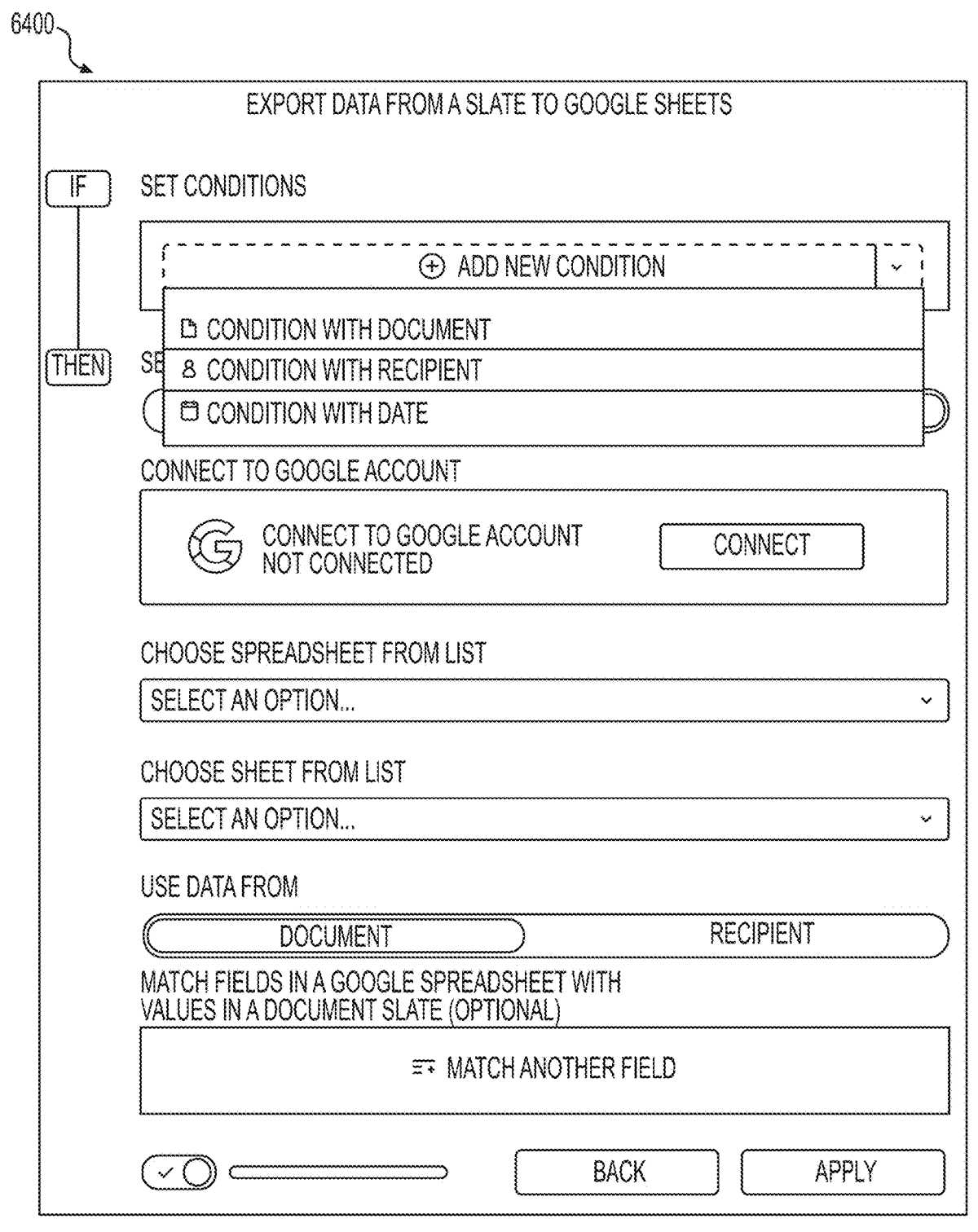
Figure 65:
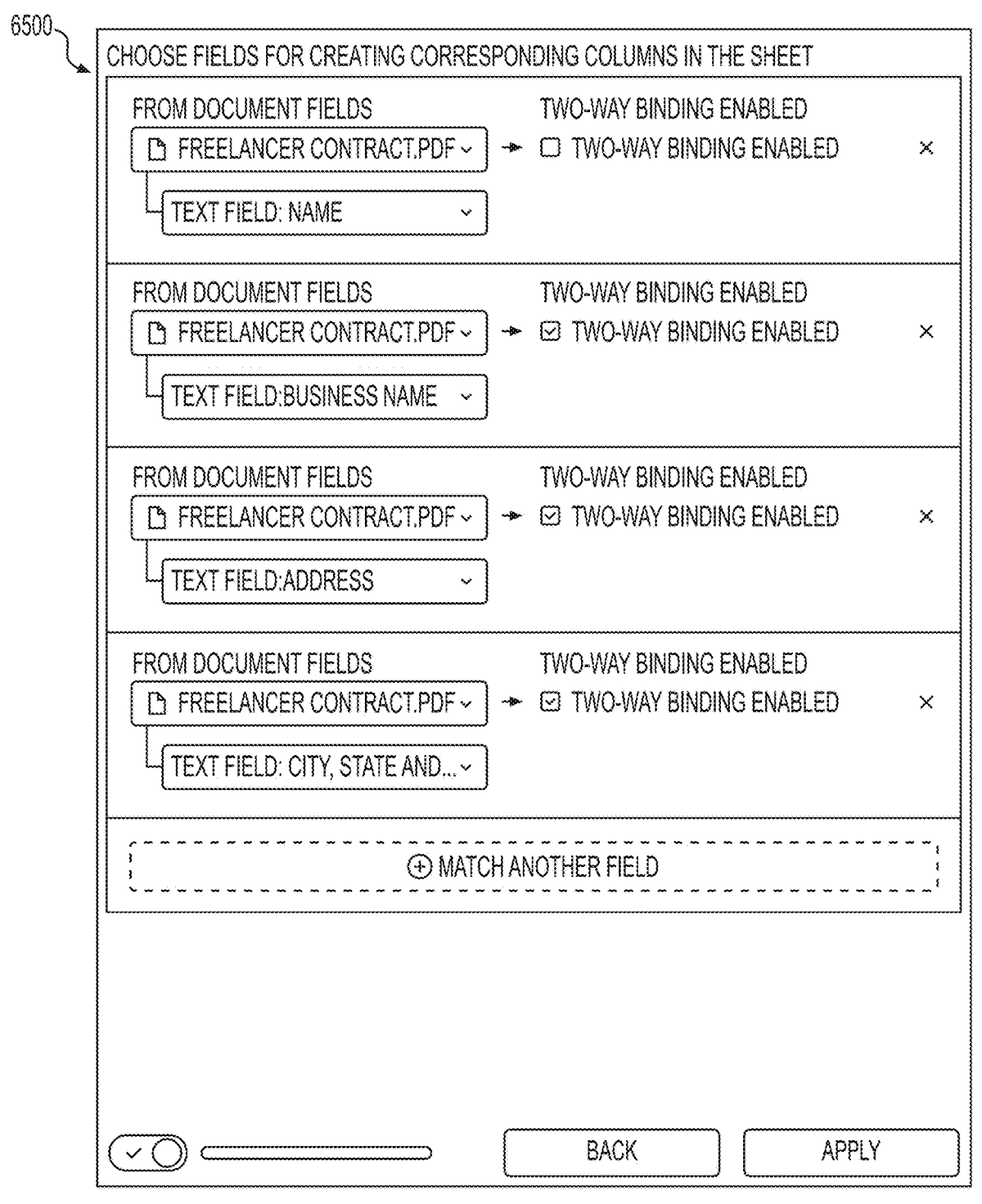

FIG. 64 shows an example GUI 6400 configured to export data from a workflow document to a document in a cloud storage such as a spreadsheet (e.g., Google sheet), according to some embodiments of the present disclosure. The user can send the generated document slate to the client. Once the document is changed and/or completed by the client, the system can automatically update the corresponding spreadsheet to reflect the changes. In some embodiments, the workflow server may be configured to: 1) set a condition for information from filled-in fields of the workflow document to be transferred to a spreadsheet; 2) connect the user's cloud storage account, find a spreadsheet, and choose a sheet to be updated; and/or 3) configure the data transfer from a document field to a spreadsheet column. As shown in example GUI 6500 of FIG. 65, the conditions can be a date, specific filled information, a recipient's name or a document slate revision. As shown in example GUI 6500 of FIG. 65, two-way binding may be enabled for changes in a slate or sheet to be updated in the corresponding document.

Figure 66:
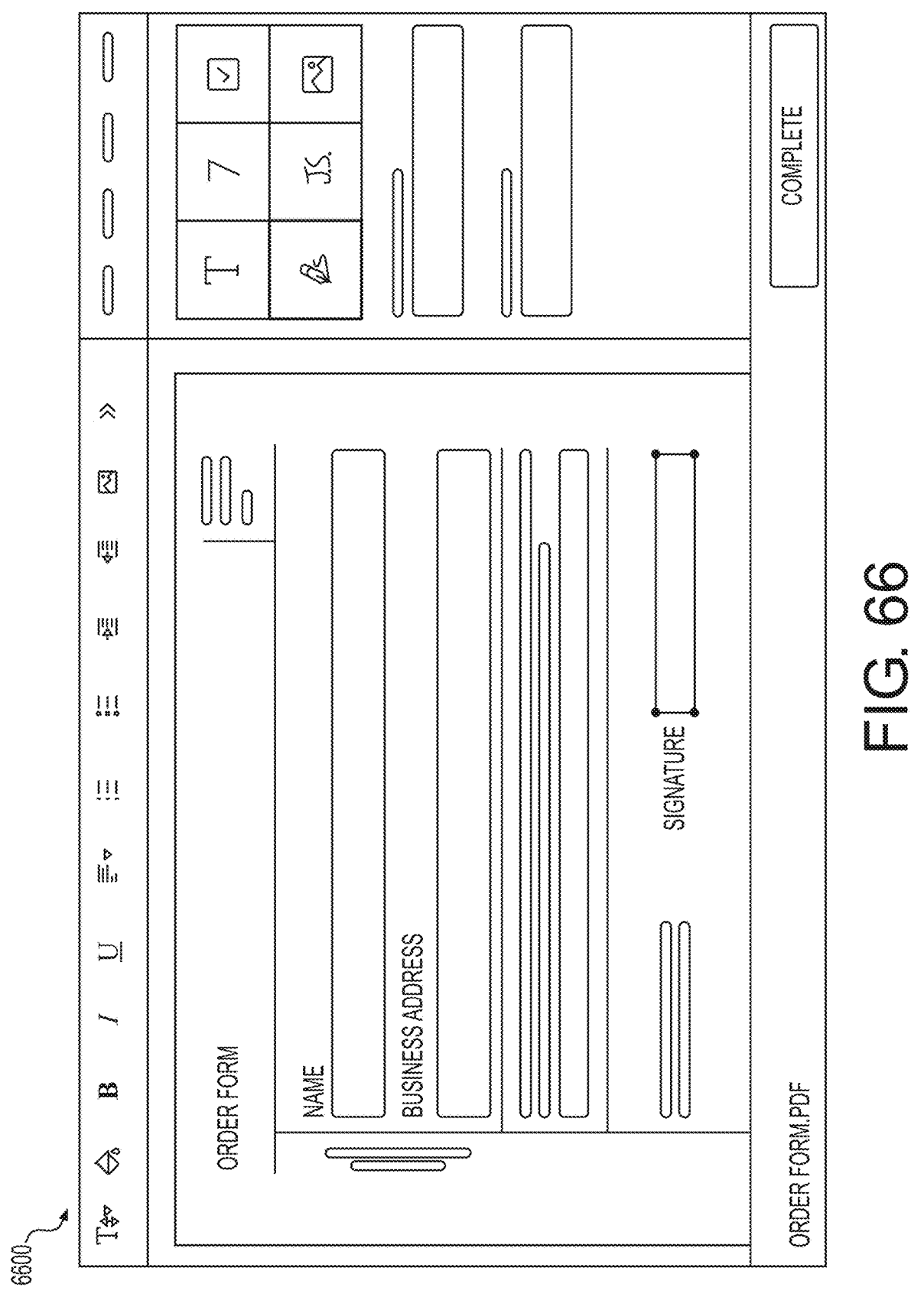

The workflow server is configured to present a GUI for a user to create a workflow document. An editing application may be used to edit a pre-filled workflow template from the slate library. For example, as illustrated in example GUI 3100 of FIG. 31, the user may load and edit a workflow template stored in a template library stored in a database 218 coupled to the workflow server 200. An editing application may be used to create a new workflow slate and define the fillable areas with different functionality based on a blank workflow template. In one embodiment, as shown in example GUI 6600 of FIG. 66, the user may use the editing application to author a workflow template by adding and editing fillable areas and signature areas based on a client's particular needs using an online or add-on editing application. Example GUI 6600 of FIG. 66 may be configured to define fillable fields of the workflow document by setting up conditions and/or number ranges for respective fillable fields in the workflow document. Some fields may be required and other fields may be conditional. In reference to example GUI 3100 of FIG. 31, the field functionality may be configured to associate with text, signature, numbers, date, formula, etc.

Figure 67:
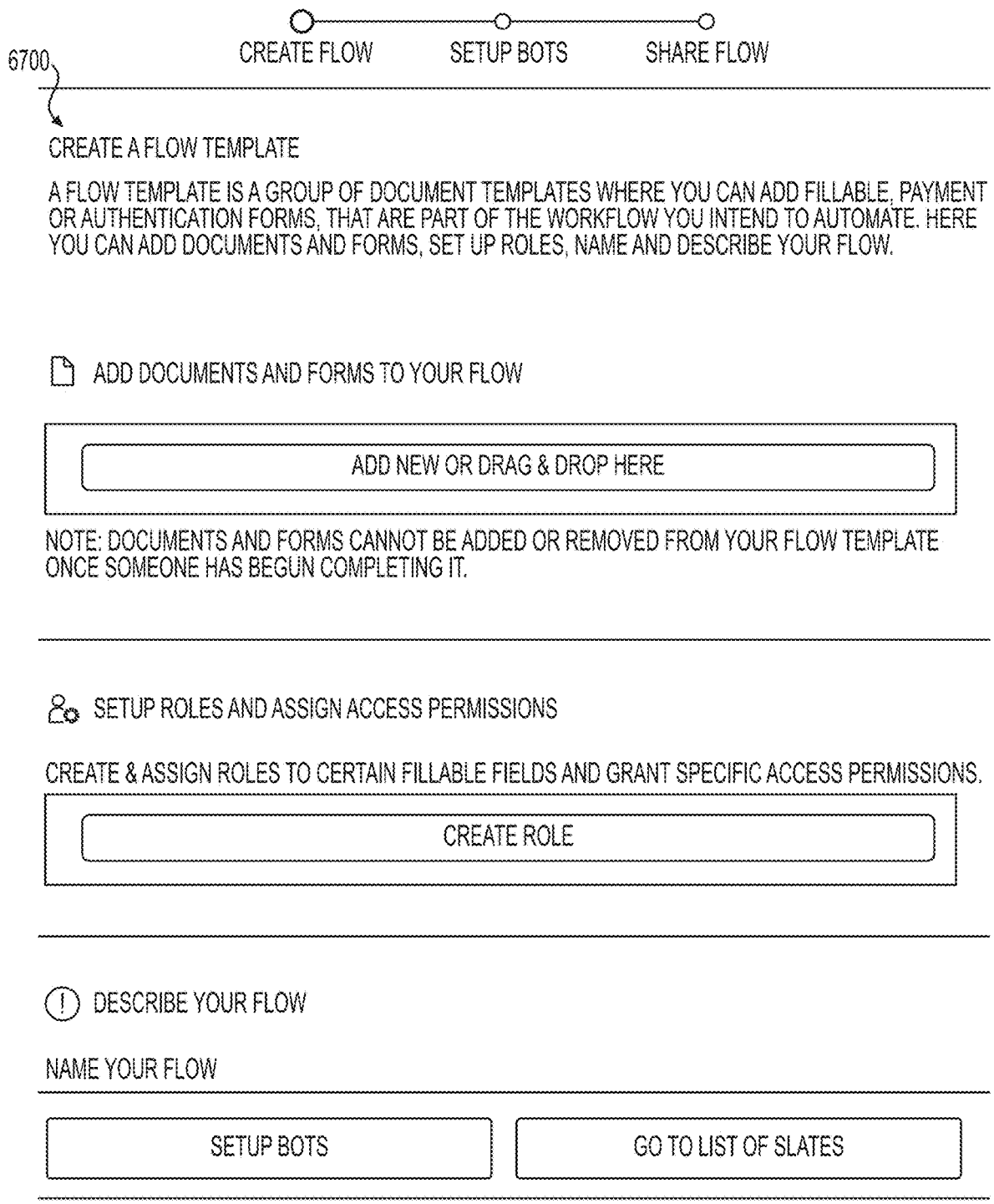
Figure 68:
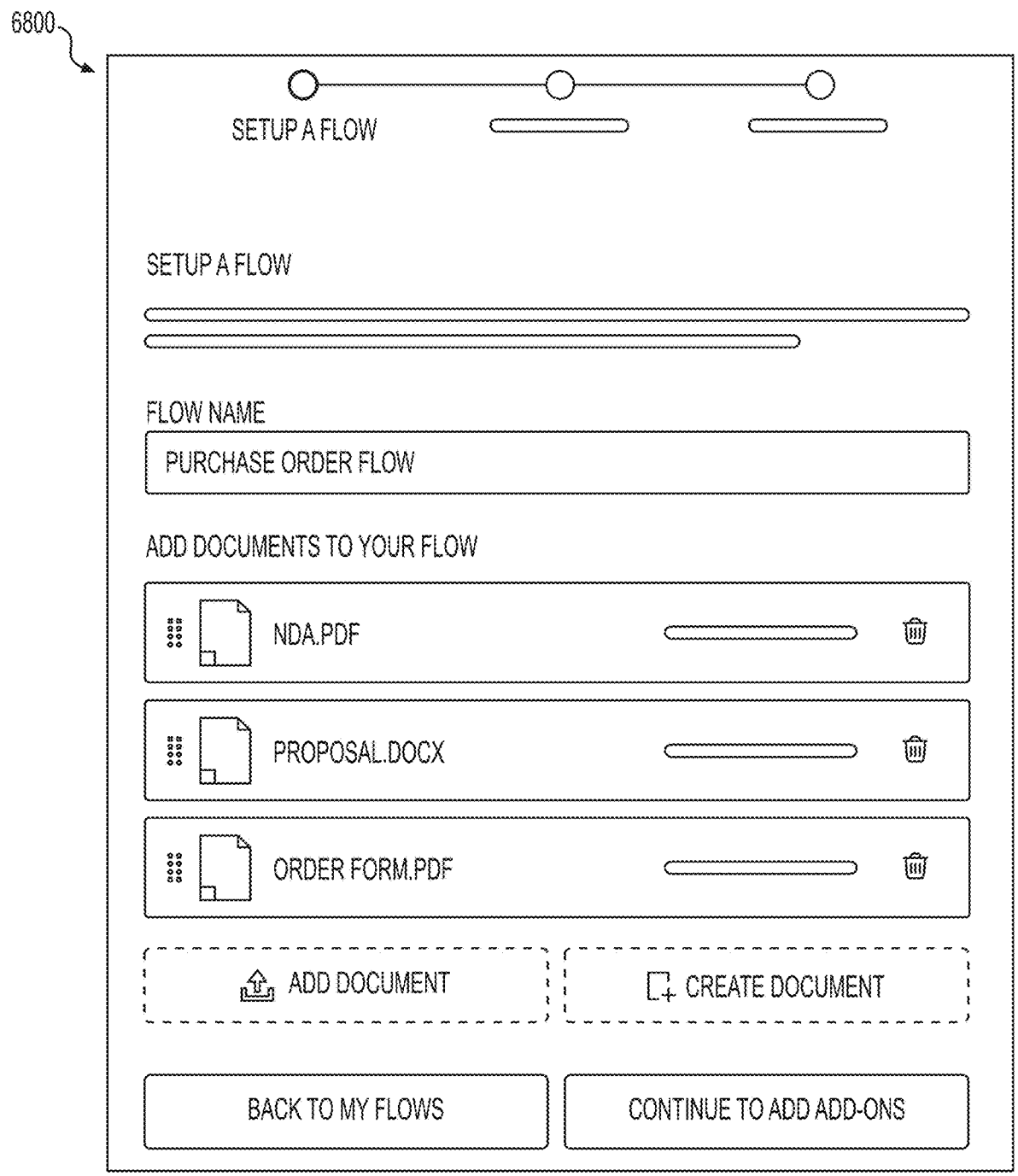

FIG. 67 shows another example GUI 6700 configured to setup or create a new workflow. A presented GUI may be enabled to set up a workflow with a workflow name and one or more fillable documents uploaded for the workflow based on a client's request and a user interaction with the GUI. In one embodiment, a user may add and/or upload one or more stored workflow documents or pre-built into the workflow. The one or more fillable documents may be uploaded from workflow templates or imported from the user's local device or a cloud storage service via network 110. FIG. 68 illustrates an example GUI 6800 for adding documents to the workflow.

Figure 69:
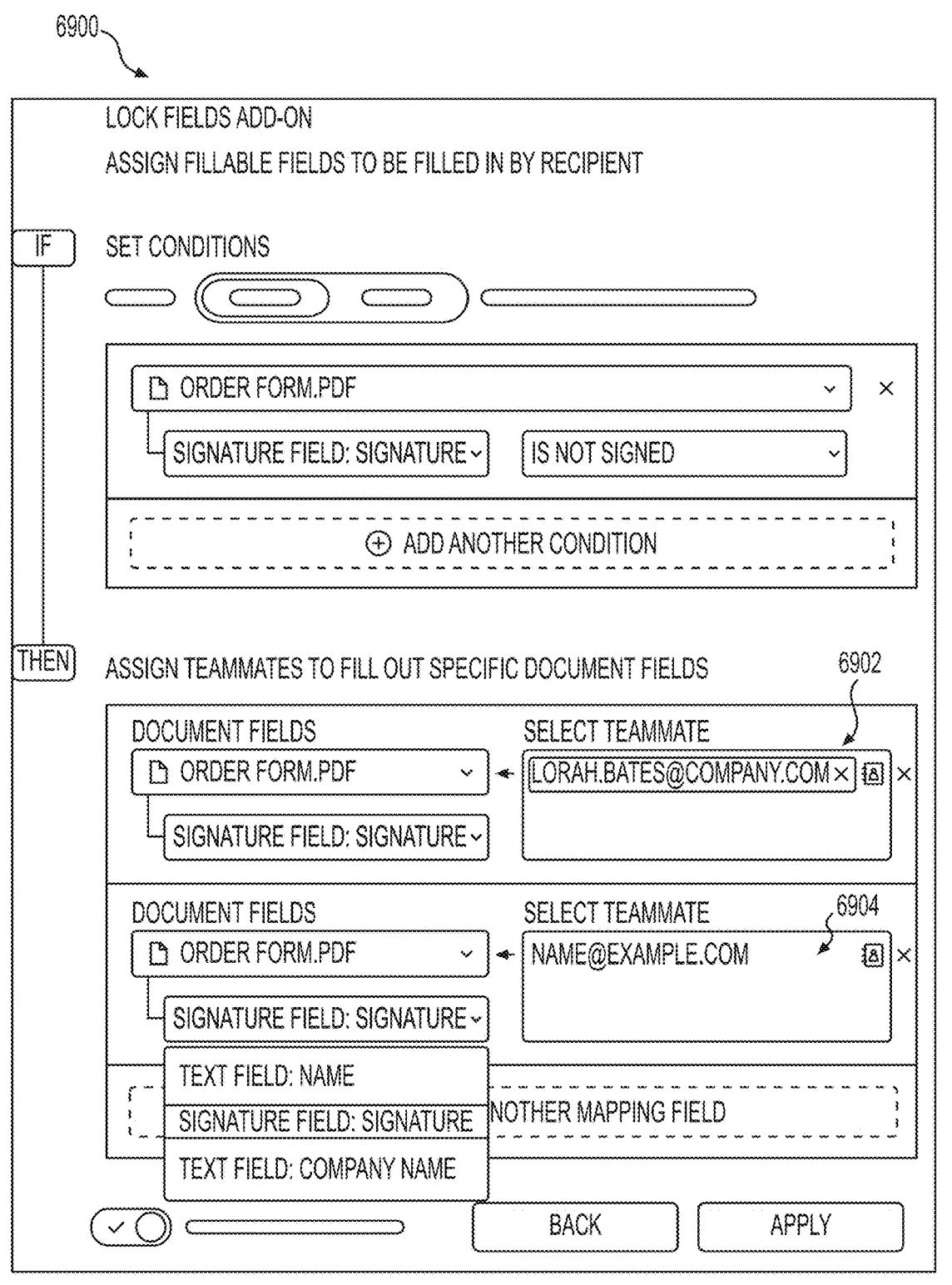
Figures 70A, 70B:
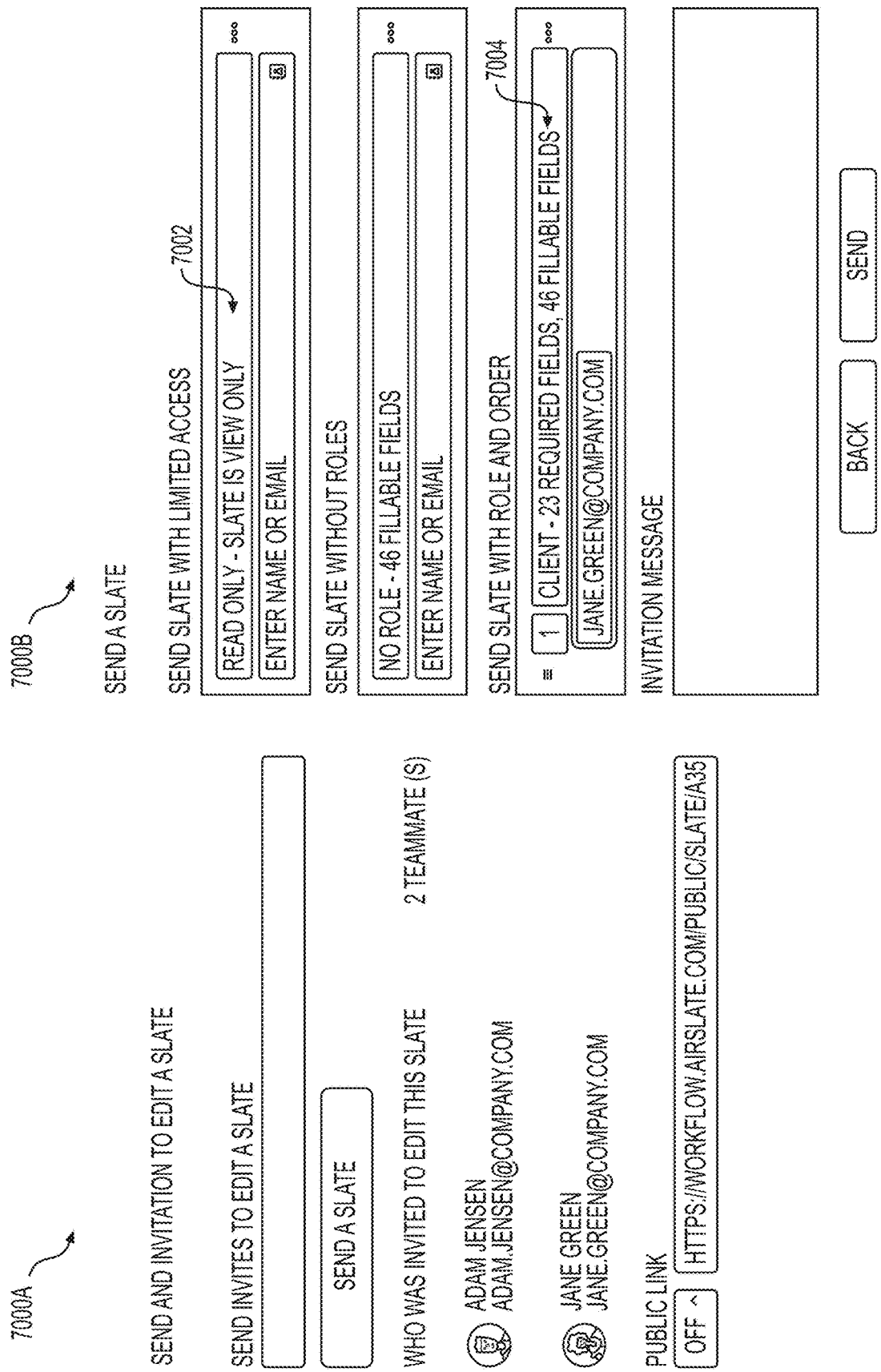

Example GUI 6700 of FIG. 67 may include suitable controls or user interface objects that allow the user to setup roles and assign access permissions. The suitable controls may be configured to create and/or assign roles to certain fillable fields and grant specific access permissions based on certain user interactions. For example, FIG. 69 shows an example GUI 6900 in which different teammates are assigned to fill out specific document fields in one workflow document. The one or more fillable fields in one document may be determined and assigned to be filled in by one or more recipients based on a user interaction with a GUI. In one embodiment, multiple fillable fields in one document may be assigned to be filled in by different recipients or teammates (e.g., recipients or teammates 6902, 6904) via respective emails. Each workflow document may be configured to be edited by different teammates and/or outside users. FIG. 70A illustrates an example GUI 7000A in which a user may send email invitations with a public link to teammates or outside users to invite them to edit a particular workflow document and/or multiple documents associated with the workflow. FIG. 70B illustrates an example GUI 7000B in which permission information and/or limited access (e.g., access 7002) may be set up for the workflow by workflow server 104 based on a user interaction with a GUI. In some embodiments, the workflow may be set up based on permission information such as "Read only," "Can Fill," "Can Use," and "Can Share." As shown in example GUI 7000B of FIG. 70B, workflow server 102 may be configured to distribute the workflow based on the role and order (e.g., role and order 7004) of multiple recipients.

Figure 71:
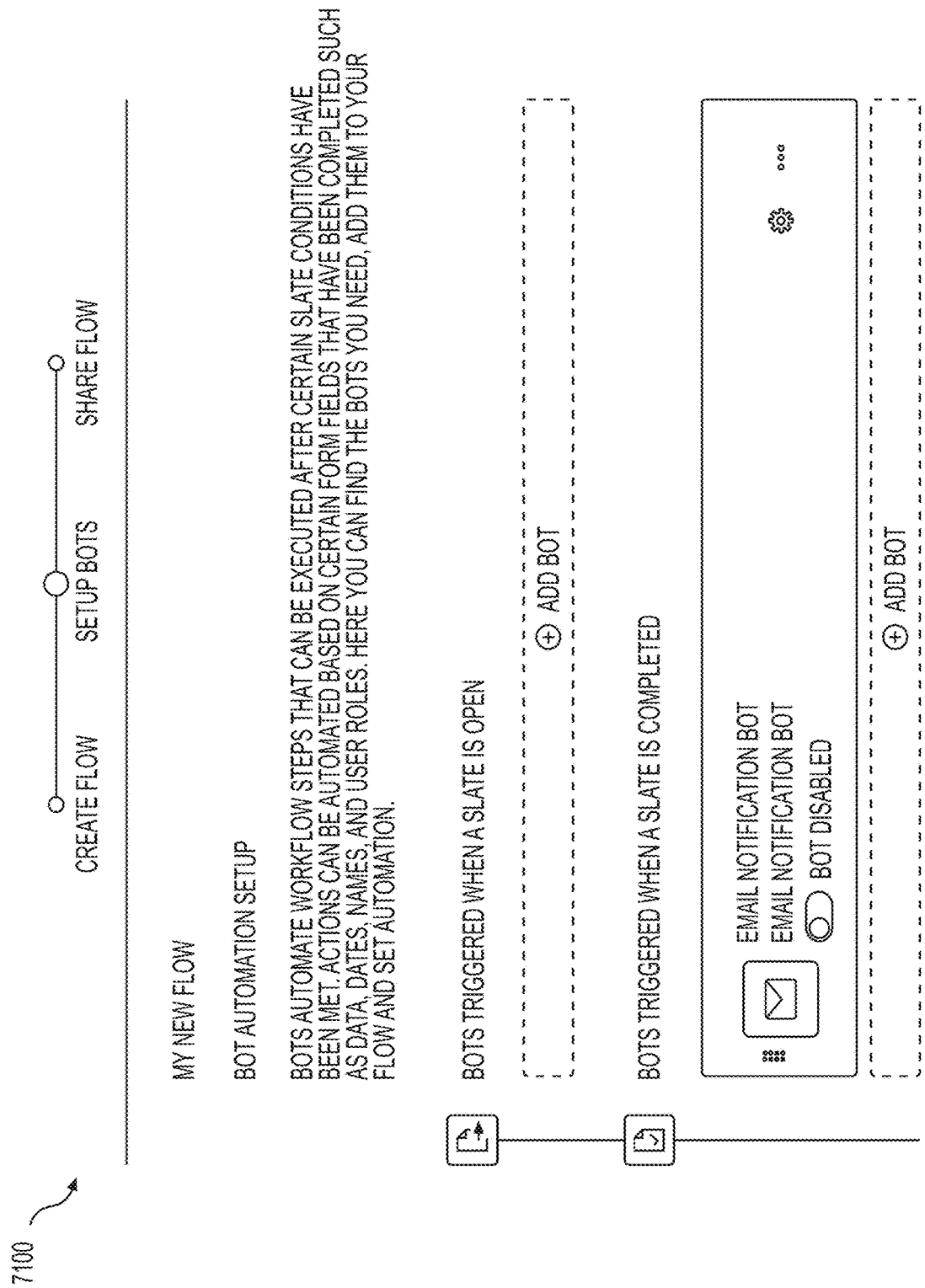

FIG. 71 shows an example GUI 7100 which allows for Bot automation setup. Bots may be represented as add-on apps. A user may work with a workflow application (e.g., "airSlate" in FIG. 4) to setup a Bot to automate workflow steps. Bots may be executed after certain slate conditions have been met. Actions can be automated based on certain form fields that haven't been completed such as data, dates, names, and user roles. A user may access a "Bot Library" to install bots to automate workflow documents. For example, FIG. 72 shows an example GUI 7200 with a "Bot Library," which provides quick access to add-on applications. As described above, FIGS. 60-65 show example GUIs that allow a user to pre-fill a slate with data from a spreadsheet or to export data from a slate to a spreadsheet. Bots may be used to automate this process.

Figure 73:
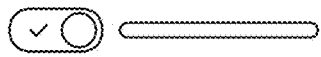

FIG. 73 illustrates an example GUI 7300 in which a workflow may be configured for workflow server 102 to send a reminder to one or more recipients who can access the workflow based on the permission information. A reminder may be set up for a recipient with access to the workflow after a period of time to indicate that the associated workflow documents need to be signed. In one embodiment, a reminder may be sent to one or more recipients once the information in the workflow is updated. After a workflow document is signed, the user may receive a corresponding notification.

FIG. 74 illustrates an example GUI 7400 which enables the user to share a workflow with teammates or anyone outside the user's organization. A user may copy and send a public link or adjust sharing permissions and send email invitations that grant access to a workflow. By interacting with example GUI 7400 of FIG. 74, a workflow access may be set within the user workspace such that only the workflow owner, administrators, and/or recipients within the workplace can access this workflow. A workflow may be shared and/or distributed via a public URL link.

Embodiments described herein may be implemented in the computing environment 100 of FIG. 1 and utilized in different industry areas, such as in an onboarding process, filling out a tax return, or in filling out a vacation request, to provide practical solutions for automating organization workflow management. The embodiments address a computer-centric and Internet-centric problem of automating electronic workflow process and allows an organization to easily create and distribute end-to-end automated electronic document workflows through a workflow server.

Figure 75:
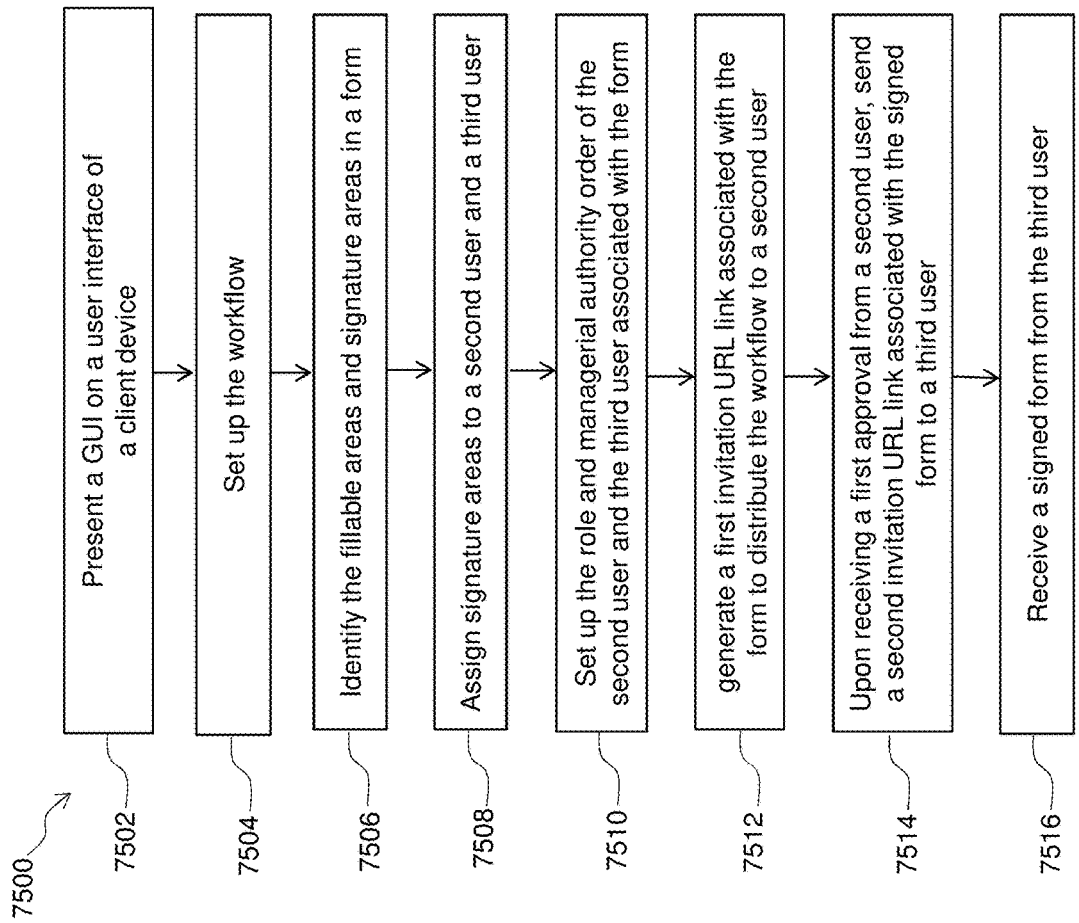
FIG. 75 is a flow diagram illustrating an example process configured to create and distribute a workflow, according to some embodiments of the present disclosure.

FIG. 75 illustrates a flow diagram of an example process 7500 of creating and distributing a workflow based on a role and order of multiple recipients in a practical application, according to one embodiment of the present disclosure. For example, the automatic workflow application executed on a workflow server 102 for automated electronic document workflows may be used in an organization to create and track an employee vacation request in minutes. For example, an employee may want to request vacation from a department manager and a hiring manager. If approved, the hiring manager may have to make sure that the employee's hours are properly tracked and that the company is staffed while the employee is absent. The workflow server may be set up for the organization to include all employees in a team.

At step 7502, a first user (e.g., an employee) may access the automatic workflow application via a browser of a client device 104 and log into workflow server 102 via network 110. The workflow server 102 may present a GUI for the first user to interact with user interface objects displayed on the user interface of the client device 104. Via the present GUI, the first user may access a "Slate Library" (e.g., "Slate Library" in FIG. 7) to obtain and pre-fill a publicly available vacation request form.

At step 7504, a workflow may be set up with a workflow name and the fillable publicly available vacation request form based on a user interaction within a presented GUI (e.g., GUI 6700 of FIG. 67). The form may be uploaded for the workflow based on the user interaction with the GUI.

At step 7506, the fillable areas and signature areas in the form may be automatically identified by the workflow server 102. A workflow may be generated by workflow server 102 by setting up permission information for distributing the employee vacation request form.

At step 7508, the workflow may be configured to enable a second user and a third user to edit, share and/or distribute the form in an order based on user roles within a team or an organization. The corresponding signature areas (e.g., signature areas 6902, 6904) in the form may be assigned to be signed by a second user (e.g., a department manager) and a third user (e.g., a hiring manager) for approval via respective emails with the GUI (e.g., GUI 6900 of FIG. 69).

At step 7510, the role and managerial authority order (e.g., role and managemerial order 7004) of the second user and the third user associated with the form may be set up for the form by workflow server 104 based on a user interaction with a GUI (e.g., GUI 7000 of FIG. 70). A workflow may be configured to be distributed to the second user and the third user for signing the form in an order of the roles of the second user and the third user based on a first user interaction with the GUI.

At step 7512, workflow server 102 may generate a first invitation URL link associated with the form to distribute the workflow to a second user for an approval.

At step 7514, upon receiving a first notification of an approval from a second user ("department manager"), workflow server 102 may automatically send a second invitation URL link associated with the updated and signed form to a third user ("hiring manager").

At step 7516, workflow server 102 may receive a second notification of a second or final approval for the first user from a third user. After the third user signed the form and approves the vacation dates, the data may be automatically sent to an add-on application which tracks all other employee's vacations. The signed documents may be automatically archived in a cloud storage, such as Google Drive, Dropbox or other assigned cloud storages. The system may automatically notify the first user of both approvals from the second user and the third user. The corresponding workflow may then be completed so the employee can go on vacation.

In some embodiments, the described automatic workflow application executed on a workflow server 102 may be used in an automated onboarding process for automated electronic document workflows. Computing environment 100 of FIG. 1 may help an organization to manage onboarding processes for a plurality of new employees associated with different departments of the organization such that the system can organize the organization's hiring process in a proper and convenient way. For example, the workflow documents may be associated with a new employee's onboarding documents such in completing an application form, W-9 form, employee contact information, etc. A hiring manager (e.g., a first user) may share a workflow including the onboarding documents with corresponding department managers (one or more second users) and may send out the workflow including onboarding documents (e.g., I-9 and W-4 form) to the new employees (e.g., a plurality of document recipients). The workflow may be sent as an invite with a share link to respective emails of the new employees. The new employees may edit and electrically sign their respective onboarding documents. The respective signed onboarding documents can be automatically stored for each employee in the data store 220 or other cloud storages. The signed onboarding documents may be automatically exported to associated add-on apps running in respective remote servers (e.g., servers associated with Google Drive) such that the signed documents are maintained to be visible to the hiring manager and respective hiring managers and new employees. The onboarding workflow system may automatically notify the hiring manager and the department managers that the respective onboarding documents are signed. The hiring manager may populate a CRM system with background check sheets and hiring information based on populated fields. The hiring manager and the department managers in the organization may perform two-way binding on stored records. The new employees may finally get approval via two-way binding on background check sheets from a hiring manager and corresponding department managers.

In some embodiments, the described automatic workflow application executed on a workflow server 102 may be used to automate end-to-end electronic tax workflows. System 100 of FIG. 1 may be configured to create workflow documents including pre-filled tax return forms with client data store in the system, and automatically send the forms as a workflow for signing to a customer. For example, an accountant may receive a request from a customer for preparing a tax return. The accountant may log into the workflow server 102 by accessing the automatic workflow application via a client device 104. The accountant may access a category of "tax form" in a slate template library to obtain the fillable tax related forms. The pre-filled tax return forms may be edited by the accountant using a workflow editing app to add fillable fields and signature fields. The accountant may create, share and/or distribute a workflow including filled tax return forms to the customer for signature. Once the customer digitally signs the legally binding contract, the contract may be stored for long term recordkeeping and audit. The accountant may maintain visibility and act on information by exporting submitted data to third party add-on apps, such as apps associated with cloud storage (e.g., Google Drive), or their customer relationship management (CRM) systems or cloud service and receive payments. The automatic workflow management system may enable an accountant to automatically transfer data to tax forms, keep track of payments, and/or store tax return for record keeping.

Methods described herein may represent processing that occurs within a system, such as within computing environment 100 of FIG. 1. The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, such as EPROM, EEPROM, flash memory device, or magnetic disks. The processor and the memory can be supplemented by, or incorporated in, special purpose logic circuitry.

Figure 76:
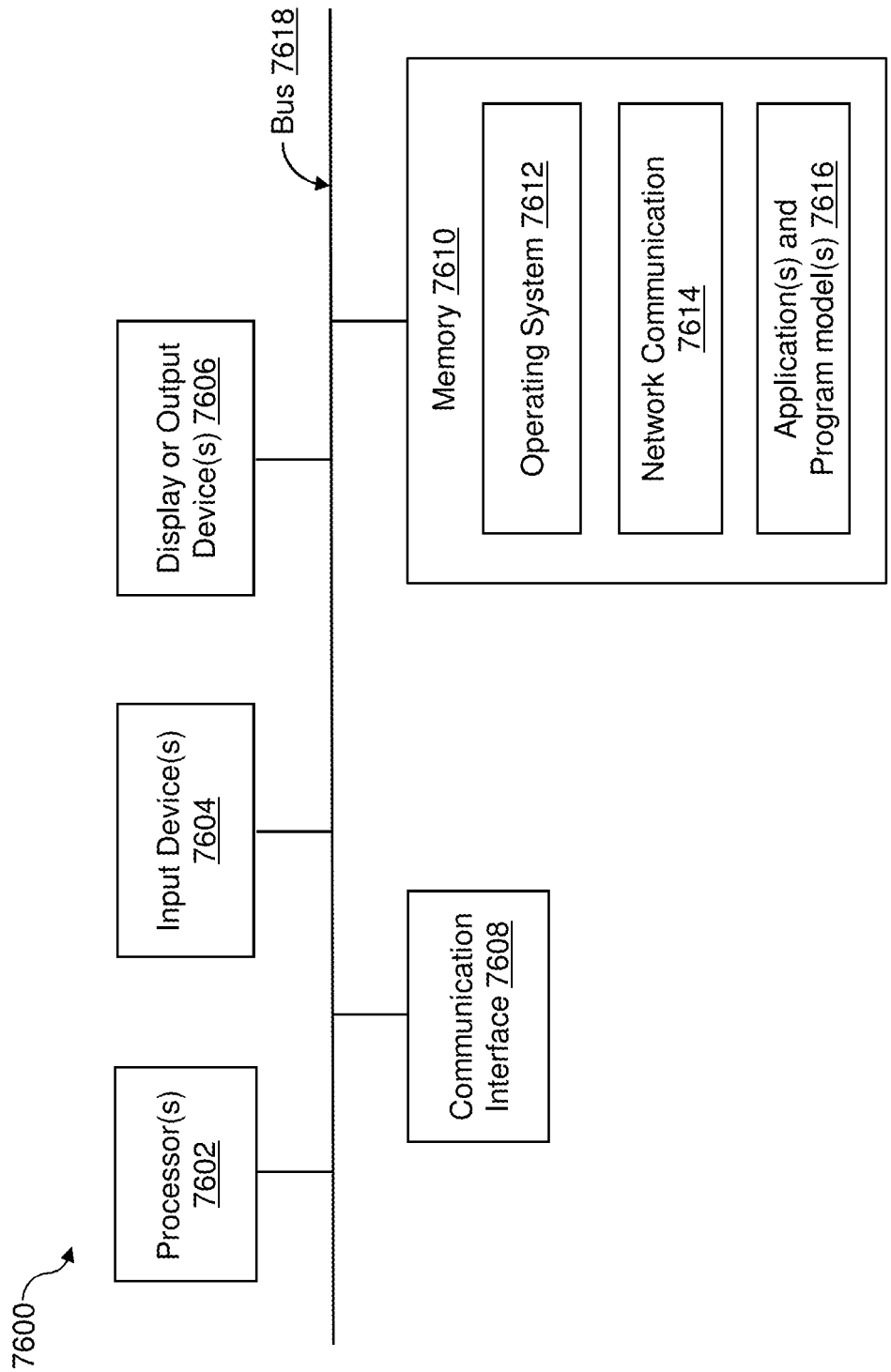
FIG. 76 is a block diagram of an example computing device, according to some embodiments of the present disclosure.

FIG. 76 is a block diagram of an example computing device 7600 that may be utilized to execute embodiments to implement processes including various features and functional operations as described herein. For example, computing device 7600 may function as workflow server 102, 200, user/client devices 104 or a portion or combination thereof in some embodiments. The computing device 7600 may be implemented on any electronic device to execute software applications derived from program instructions, and may include but is not limited to personal computers, servers, smart phones, media players, electronic tablets, game consoles, email devices, etc. In some implementations, the computing device 7600 may include one or more processors 7602, one or more input devices 7604, one or more display or output devices 7606, one or more communication interfaces 7608, and memory 7610. Each of these components may be coupled by bus 7618, or in the case of distributed computer systems, one or more of these components may be located remotely and accessed via a network.

Processor(s) 7602 may use any known processor technology, including but not limited to graphics processors and multi-core processors. Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

Input device 7604 may be any known input device technology, including but not limited to a keyboard (including a virtual keyboard), mouse, track ball, and touch-sensitive pad or display. To provide for interaction with a user, the features and functional operations described in the disclosed embodiments may be implemented on a computer having a display device 1306 such as a CRT (cathode ray tube) or LCD (liquid crystal display) monitor for displaying information to the user and a keyboard and a pointing device such as a mouse or a trackball by which the user can provide input to the computer. Display device 7606 may be any known display technology, including but not limited to display devices using Liquid Crystal Display (LCD) or Light Emitting Diode (LED) technology.

Communication interfaces 7608 may be configured to enable computing device 7600 to communicate with another computing or network device across a network, such as via a wired connection, a wireless connection, or a combination of wired and wireless connections. For example, communication interfaces 7608 may include an Ethernet interface, an optical interface, a coaxial interface, an infrared interface, a radio frequency (RF) interface, a universal serial bus (USB) interface, a Wi-Fi interface, a cellular network interface, or the like.

Memory 7610 may be any computer-readable medium that participates in providing computer program instructions and data to processor(s) 7602 for execution, including without limitation, non-volatile storage media (e.g., optical disks, magnetic disks, flash drives, etc.), or volatile storage media (e.g., SDRAM, ROM, etc.). Memory 7610 may include various non-transitory computer-readable instructions for implementing an operating system 7612 (e.g., Mac OS®, Windows®, Linux), network communication 7614, and Application(s) and program modules 7616, etc. The operating system may be multi-user, multiprocessing, multitasking, multithreading, real-time, and the like. The operating system may perform basic tasks, including but not limited to: recognizing input from input device 7604; sending output to display device 7606; keeping track of files and directories on memory 7610; controlling peripheral devices (e.g., disk drives, printers, etc.) which can be controlled directly or through an I/O controller; and managing traffic on bus 7618. Bus 7618 may be any known internal or external bus technology, including but not limited to ISA, EISA, PCI, PCI Express, NuBus, USB, Serial ATA or FireWire.

Network communications instructions 7614 may establish and maintain network connections (e.g., software applications for implementing communication protocols, such as TCP/IP, HTTP, Ethernet, telephony, etc.).

Application(s) and program modules 7616 may include software application(s) and different functional program modules which are executed by processor(s) 7602 to implement the processes described herein and/or other processes. The program modules may include but not limited to software programs, objects, components, data structures that are configured to perform particular tasks or implement particular data types. The processes described herein may also be implemented in operating system 7612.

Communication between various network and computing devices may be facilitated by one or more application programming interfaces (APIs). APIs of system 7600 may be proprietary and/or may be examples available to those of ordinary skill in the art such as Amazon® Web Services (AWS) APIs or the like. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call.

The features and functional operations described in the disclosed embodiments may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

The described features and functional operations described in the disclosed embodiments may be implemented in a computer system that includes a back-end component, such as a data server, or that includes a middleware component, such as an application server or an Internet server, or that includes a front-end component, such as a user computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include user or client computing devices and workflow server. A user or client computing device and server may generally be remote from each other and may typically interact through a network. The relationship of client computing devices and server may arise by virtue of computer programs running on the respective computers and having a client-server relationship to each other.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

What is claimed is:

1. A computer-implemented method for creating workflows, comprising:
   receiving, by a computer system comprising at least one processor, from a client device operated by a first user, a request to create a workflow, the request comprising a workflow name;
   receiving, by the computer system, one or more documents for the workflow;
   analyzing, by the computer system, each of the one or more documents to determine one or more fillable fields for the one or more documents;
   receiving, by the computer system, workflow permission information, the workflow permission information indicating at least one of:
      users who are permitted to fill in the one or more fillable fields;
      users who are permitted to edit the one or more documents of the workflow,
      users who are permitted to share the workflow, or
      users who are permitted to distribute the workflow;
   creating, by the computer system, the workflow, the workflow comprising the workflow name, the one or more documents, the one or more fillable fields, and the workflow permission information;
   storing, by the computer system, the workflow;
   providing, by the computer system, the workflow in accordance with the workflow permission information;
   creating a workspace for an organization;
   inviting a plurality of users to join the workspace by sending a first universal resource locator (URL) link associated with the workspace via email;
   assigning each of the plurality of users with a respective role;
   generating a second URL link associated with the workflow;
   sending the second URL link to a second user via a second user's email based on the workflow permission information;
   generating a first notification that the one or more documents of the workflow are signed by the second user;
   upon receiving a confirmation of the first notification by the first user, sending a third URL link associated with the workflow to a third user via a third user's email based on the workflow permission information;
   generating a second notification that the one or more documents of the workflow are signed by the third user; and
   archiving signed documents of the workflow, wherein the workflow is assigned with a role and an order of the second user and the third user.

2. The method of claim 1, wherein the one or more documents for the workflow comprises a workflow template loaded from a stored template library.

3. The method of claim 1, wherein the one or more documents for the workflow comprises a workflow template created by a workflow application.

4. The method of claim 1, further comprising executing an application associated with the workflow to present a plurality of graphical user interfaces (GUIs) within a user interface of a client device operated by the first user.

5. The method of claim 4, wherein the application is configured to define a plurality of fillable fields in a document with a plurality of functions in a GUI, and wherein the plurality of functions comprise a text field, a signature field, a number field, and a date field.

6. The method of claim 1, wherein the workflow is shared to a group of users each having an email address within a verified domain.

7. The method of claim 1, wherein the users do not use coding when interacting with workflows.

8. The method of claim 1, wherein the workflow is accessible to one organization.

9. The method of claim 1, wherein the computer system further comprises one or more client devices, one or more application services, or combinations thereof coupled via a plurality of computer networks, wherein the plurality of computer networks can be a wireless computer network, a wired computer network, or combinations thereof.

10. The method of claim 1, wherein the method further comprises an organization configuration module configured to manage information stored about one or more organizations, the organization configuration module;
   retrieving, from a workflow server, data about the one or more organizations; and
   presenting one or more GUIs for modulating the data about the one or more organizations.

11. The method of claim 1, further comprising a document import module configured to modulate template documents for a workflow, the document import module:
   detecting a template;
   analyzing the template; and
   identifying form fields.

12. The method of claim 1, further comprising an automatic workflow application configured to collect data, fill forms, e-sign documents, or automate the workflow, or combinations thereof.

13. The method of claim 1, further comprising a workflow creator application configured to define a workflow template, assign add-ons to the workflow to automate certain tasks in response to workflow triggers, or distribute the workflow template and workflow to other users, or combinations thereof.

14. The method of claim 1, further comprising a signature application comprising a web application configured to add an electronic signature to a document of the workflow.

15. The method of claim 1, further comprising a document filler application comprising a web application configured to fill out a document of the workflow.

16. The method of claim 1, further comprising selecting an add on application from a plurality of add-on applications.

17. The method of claim 16, wherein a workflow condition triggers an add-on application.

18. A computer-implemented method for creating workflows, comprising:
   receiving, by a computer system comprising at least one processor, from a client device operated by a first user, a request to create a workflow, the request comprising a workflow name;
   receiving, by the computer system, one or more documents for the workflow;
   analyzing, by the computer system, each of the one or more documents to determine one or more fillable fields for the one or more documents;
   receiving, by the computer system, workflow permission information, the workflow permission information indicating at least one of:
      users who are permitted to fill in the one or more fillable fields;
      users who are permitted to edit the one or more documents of the workflow,
      users who are permitted to share the workflow, or
      users who are permitted to distribute the workflow;
   creating, by the computer system, the workflow, the workflow comprising the workflow name, the one or more documents, the one or more fillable fields, and the workflow permission information;
   storing, by the computer system, the workflow;
   providing, by the computer system, the workflow in accordance with the permission information for the workflow;
   accessing a bot library to install one or more bots to automate the workflow, the one or more bots being indicative of one or more add-on applications; and
   linking the one or more add-on applications to the workflow by invoking associated callback URLs;
   wherein the computer system includes an application programming interface (API) via which the one or more add-ons applications are used to read and write information for the workflow.

19. The method of claim 18, further comprising prefilling a document with data from a spreadsheet via an add-on, the prefilling comprising:
   setting up one or more conditions for one or more fillable fields;
   determining whether the one or more fillable fields in the document match values of one or more columns in the spreadsheet; and
   in response to determining that the one or more fillable fields in the document match the values of the one or more columns in the spreadsheet, populating data from the one or more columns in the spreadsheet into corresponding one or more fillable fields in the document.

20. The method of claim 18, further comprising exporting data from a document to a spreadsheet for storage in a cloud storage, the exporting comprising:
   setting up one or more conditions for one or more fillable fields of the document; connecting a user account associated with the cloud storage to locate the spreadsheet for updating;
   determining whether the one or more fillable fields in the document match one or more values of one or more columns in the spreadsheet; and
   in response to determining a match between the one or more fillable fields and the one or more columns in the spreadsheet, populating data from the one or more fillable fields into corresponding columns of the spreadsheet.

21. The method of claim 18, further comprising implementing, by the computer system, the one or more add-on applications.

22. The method of claim 18, further comprising implementing, by an external application service, the one or more add-on applications.

23. The method of claim 18, further comprising triggering, by workflow parameters, the one or more add-on applications to run for the workflow, the workflow parameters comprising one or more of date, time, form values, or user input.

24. The method of claim 18, wherein the users do not use coding when interacting with workflows.

25. The method of claim 18, wherein the workflow is accessible to one organization.

26. The method of claim 18, wherein the computer system further comprises one or more client devices, one or more application services, or combinations thereof coupled via a plurality of computer networks, wherein the plurality of computer networks can be a wireless computer network, a wired computer network, or combinations thereof.

27. The method of claim 18, wherein the method further comprises an organization configuration module configured to manage information stored about one or more organizations, the organization configuration module;
   retrieving, from a workflow server, data about the one or more organizations; and
   presenting one or more GUIs for modulating the data about the one or more organizations.

28. The method of claim 18, further comprising a document import module configured to modulate template documents for a workflow, the document import module:
   detecting a template;

analyzing the template; and
identifying form fields.

29. The method of claim 18, further comprising an automatic workflow application configured to collect data, fill forms, e-sign documents, or automate the workflow, or combinations thereof.

30. The method of claim 18, further comprising a workflow creator application configured to define a workflow template, assign add-ons to the workflow to automate certain tasks in response to workflow triggers, or distribute the workflow template and the workflow to other users, or combinations thereof.

31. The method of claim 18, further comprising a signature application comprising a web application configured to add an electronic signature to a document of the workflow.

32. The method of claim 18, further comprising a document filler application comprising a web application configured to fill out a document of the workflow.

33. The method of claim 18, further comprising selecting an add on application from a plurality of add-on applications.

34. The method of claim 33, wherein a workflow condition triggers an add-on application.

35. A computer system for creating workflows, comprising:
one or more memories storing instructions; and
one or more processors that, when executing the instructions, are configured to:
receive, from a client device operated by a first user, a request to create a workflow, the request comprising a workflow name;
receive one or more documents for the workflow;
analyze each of the one or more documents to determine one or more fillable fields for each of the one or more documents;
receive workflow permission information, the workflow permission information indicating at least one of:
users who are permitted to fill in the one or more fillable fields;
users who are permitted to edit the one or more documents of the workflow,
users who are permitted to share the workflow, or
users who are permitted to distribute the workflow;
create the workflow, the workflow comprising the workflow name, the one or more documents, the one or more fillable fields, and the workflow permission information for the workflow;
store the workflow;
provide the workflow in accordance with the workflow permission information for the workflow;
create a workspace for an organization;
invite a plurality of users to join the workspace by sending a first universal resource locator (URL) link associated with the workspace via email;
assign each of the plurality of users with a respective role;
generate a second URL link associated with the workflow;
send the second URL link to a second user via a second user's email based on the workflow permission information;
generate a first notification that the one or more documents of the workflow are signed by the second user;
upon a confirmation of the first notification, send a third URL link associated with the workflow to a third user via a third user's email based on the workflow permission information;
generate a second notification that the one or more documents of the workflow are signed by the third user; and
archive signed documents of the workflow, wherein the workflow is assigned with a role and an order of the second user and the third user.

36. The system of claim 35, wherein the one or more documents for the workflow comprise a workflow template created by a workflow application.

37. The system of claim 35, wherein the one or more processors, when executing the instructions, are further configured to execute a workflow application to cause presentation of a plurality of graphical user interfaces (GUIs) within a user interface of the client device operated by the first user.

38. The system of claim 35, wherein a workflow application is configured to define a plurality of fillable fields in a document with a plurality of functions in a GUI, and wherein the plurality of functions comprise a text field, a signature field, a number field, and a date field.

39. The system of claim 35, wherein the one or more documents for the workflow comprises a workflow template loaded from a stored template library.

40. The system of claim 35, wherein the workflow is shared to a group of users each having an email address within a verified domain.

41. A computer system for creating workflows, comprising:
one or more memories storing instructions; and
one or more processors that, when executing the instructions, are configured to:
receive, by the computer system comprising at least one processor, from a client device operated by a first user, a request to create a workflow, the request comprising a workflow name;
receive, by the computer system, one or more documents for the workflow;
analyze, by the computer system, each of the one or more documents to determine one or more fillable fields for the one or more documents;
receive, by the computer system, workflow permission information, the workflow permission information indicating at least one of:
users who are permitted to fill in the one or more fillable fields;
users who are permitted to edit the one or more documents of the workflow,
users who are permitted to share the workflow, or
users who are permitted to distribute the workflow;
create, by the computer system, the workflow, the workflow comprising the workflow name, the one or more documents, the one or more fillable fields, and the workflow permission information;
store, by the computer system, the workflow;
provide, by the computer system, the workflow in accordance with the workflow permission information;
access a bot library to install one or more bots to automate the workflow, the one or more bots being indicative of one or more add-on applications; and
link the one or more add-on applications to the workflow by invoking associated callback URLs;
wherein the computer system includes an application programming interface (API) via which the one or more add-on applications are used to read and write information for the workflow.

42. The system of claim 41, wherein the one or more processors are further configured for:

prefilling one or more documents with data from a stored spreadsheet via an add-on, the prefilling comprising:

setting up one or more conditions for one or more fillable fields;

determining whether the one or more fillable fields in the one or more documents match values of one or more columns in the spreadsheet; and in response to determining that the one or more fillable fields in the one or more documents match values of one or more columns in the spreadsheet, populating data from the columns in the spreadsheet into corresponding fillable fields in the one or more documents.

43. The system of claim 41, wherein the one or more processors are further configured for exporting data from one or more documents to a spreadsheet for storage in a cloud storage, the exporting comprising:

setting up one or more conditions for one or more fillable fields of the one or more documents;

connecting a user account associated with the cloud storage to locate a spreadsheet for updating;

determining whether the one or more fillable fields in the one or more documents match values of one or more columns in the spreadsheet; and in response to determining a match between the one or more fillable fields and the one or more columns in the spreadsheet, populating data from the one or more fillable fields into corresponding columns of the spreadsheet.

* * * * *